(12) United States Patent
Di Dio et al.

(10) Patent No.: US 11,785,523 B1
(45) Date of Patent: *Oct. 10, 2023

(54) SYSTEMS AND METHODS FOR INTERFACING ONE OR MORE INFORMATION TECHNOLOGY DEVICES WITH AN APPLICATION SERVER

(71) Applicant: Cable Television Laboratories, Inc., Louisville, CO (US)

(72) Inventors: Mario Di Dio, Longmont, CO (US); Daryl William Malas, Broomfield, CO (US); Eric Winkelman, Boulder, CO (US); Gregory C. White, Louisville, CO (US); Richard D. Terpstra, Superior, CO (US); Steve Higgins, Mead, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/397,753

(22) Filed: Aug. 9, 2021

Related U.S. Application Data

(63) Continuation-in-part of application No. 16/886,206, filed on May 28, 2020, now Pat. No. 11,290,916.

(60) Provisional application No. 63/164,232, filed on Mar. 22, 2021, provisional application No. 62/931,254, filed on Nov. 6, 2019, provisional application No. 62/864,267, filed on Jun. 20, 2019, provisional application No. 62/853,598, filed on May 28, 2019.

(51) Int. Cl.
*H04L 41/5054* (2022.01)
*H04W 40/02* (2009.01)
*H04W 28/02* (2009.01)
*H04L 45/24* (2022.01)
*H04L 67/563* (2022.01)

(52) U.S. Cl.
CPC ............ *H04W 40/02* (2013.01); *H04L 45/24* (2013.01); *H04L 67/563* (2022.05); *H04W 28/0252* (2013.01)

(58) Field of Classification Search
CPC ... H04W 40/02; H04W 67/563; H04W 45/24; H04W 28/0252
See application file for complete search history.

(56) References Cited

U.S. PATENT DOCUMENTS

| | | | |
|---|---|---|---|
| 10,057,420 B2 * | 8/2018 | Paiement | H04M 3/4872 |
| 11,290,916 B1 | 3/2022 | Malas et al. | |
| 2008/0140767 A1 | 6/2008 | Rao et al. | |
| 2008/0317241 A1 | 12/2008 | Wang et al. | |
| 2012/0002583 A1 * | 1/2012 | Kong | H04W 92/045 |
| | | | 370/312 |
| 2014/0153392 A1 * | 6/2014 | Gell | H04W 28/0236 |
| | | | 370/230 |
| 2014/0365631 A1 * | 12/2014 | Luna | H04W 76/25 |
| | | | 709/223 |

(Continued)

*Primary Examiner* — Abdelnabi O Musa
(74) *Attorney, Agent, or Firm* — PdZ Patent Law, PLLC

(57) ABSTRACT

A method for interfacing one or more information technology (IT) devices with an application server includes (1) receiving, at a control system, first downlink data from the application server, and (2) steering the first downlink data from the control system to a first IT device via at least one of a first plurality of parallel data communication links between the first IT device and the control system, according to a first steering policy.

20 Claims, 35 Drawing Sheets

(56) References Cited

U.S. PATENT DOCUMENTS

| | | | |
|---|---|---|---|
| 2015/0312385 A1 | 10/2015 | Tapia | |
| 2015/0363423 A1* | 12/2015 | Utgikar | H04L 45/125 |
| | | | 707/827 |
| 2019/0116531 A1* | 4/2019 | Ryu | H04W 36/0022 |
| 2020/0106815 A1 | 4/2020 | Wang et al. | |
| 2020/0252270 A1 | 8/2020 | Cung | |
| 2020/0367155 A1* | 11/2020 | Kanugovi | H04W 48/20 |
| 2021/0360480 A1* | 11/2021 | Oyman | H04L 65/1104 |
| 2021/0409173 A1* | 12/2021 | Chatterjee | H04L 1/1812 |
| 2021/0410086 A1 | 12/2021 | Davydov et al. | |
| 2022/0103973 A1* | 3/2022 | Sirotkin | H04W 4/02 |
| 2022/0141708 A1 | 5/2022 | Vidal et al. | |
| 2022/0150740 A1* | 5/2022 | Yao | H04W 76/10 |
| 2022/0174521 A1 | 6/2022 | Yao et al. | |
| 2022/0183003 A1* | 6/2022 | Wei | H04W 72/0446 |

* cited by examiner

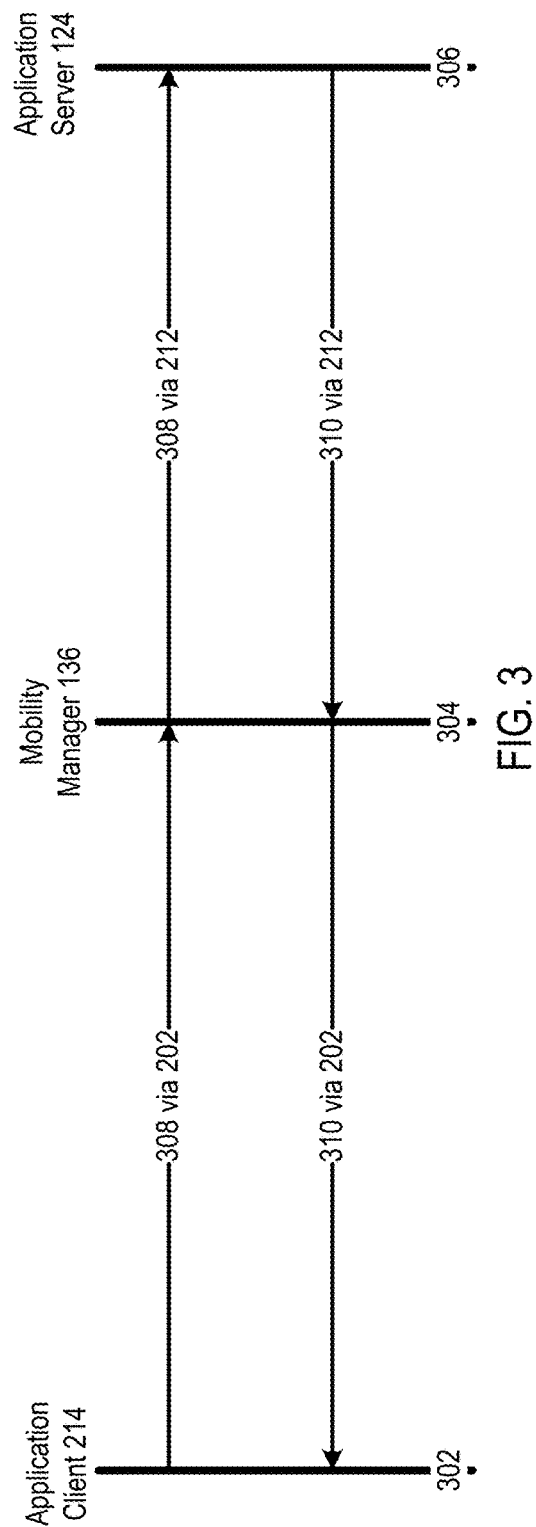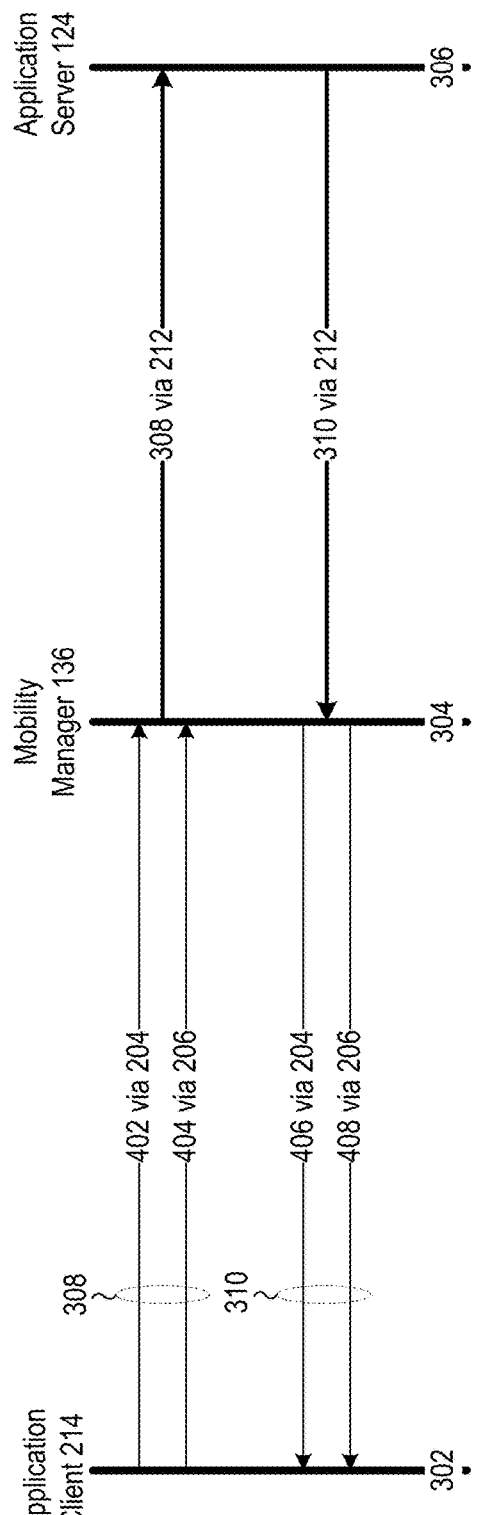

SYSTEMS AND METHODS FOR INTERFACING ONE OR MORE INFORMATION TECHNOLOGY DEVICES WITH AN APPLICATION SERVER

RELATED APPLICATIONS

This application is a continuation-in-part of U.S. patent application Ser. No. 16/886,206, filed on May 28, 2020, which claims benefit of priority to (a) U.S. Provisional Patent Application Ser. No. 62/853,598, filed on May 28, 2019, (b) U.S. Provisional Patent Application Ser. No. 62/864,267, filed on Jun. 20, 2019, and (c) U.S. Provisional Patent Application Ser. No. 62/931,254, filed on Nov. 6, 2019. Each of the aforementioned patent applications is incorporated herein by reference.

BACKGROUND

Information technology (IT) devices, such as mobile telephones, computers, and Internet of Things (IoT) devices, commonly use a wireless communication link, such as a Wi-Fi wireless communication link or a cellular wireless communication link, to communicate with external resources, such as the Internet. Two or more wireless communication links may be available at a given time, and a user typically selects a desired wireless communication link from the available wireless communication links. For example, a user may select between an available Wi-Fi wireless communication link and an available cellular wireless communication link. In some cases, an IT device automatically selects a wireless communication link having a strongest received signal strength, for use by the IT device. A wireline communication link, such as an electrical cable wireline communication link or an optical cable wireline communication link, may also be available to an IT device.

BRIEF DESCRIPTION OF THE DRAWINGS

FIG. 3 is a dataflow diagram illustrating one example of operation of a mobility manager of FIGS. 1 and 2, according to an embodiment.

FIG. 4 is a dataflow diagram illustrating another example of operation of the mobility manager of FIGS. 1 and 2, according to an embodiment.

DETAILED DESCRIPTION OF THE EMBODIMENTS

As discussed above, an IT device conventionally automatically selects a wireless communication link based on whichever wireless communication link has a strongest received signal strength, or based on predetermined connection polices resident inside the IT device. This selection criteria may result in sub-optimal performance. For example, an IT device may automatically select a first wireless communication link which has a strongest received signal strength, but the first wireless communication link may have insufficient bandwidth or throughput to adequately support an application on the IT device. A second wireless communication link, on the other hand, may have a lower received signal strength, but the second wireless communication link may have sufficient received signal strength, bandwidth, and throughput, to support the application. Thus, while the IT device automatically selects the first wireless communication link due to its strong received signal strength, the IT device may be better-served by the second wireless communication link.

Additionally, an application on an IT device conventionally has no control over a user's network experience. Once an IT device connects to a network via a wireless communication link, the application must use the wireless communication link, even if a better-performing wireless communication link is available. A user's only recourse to poor wireless communication link performance is to manually select a different wireless communication link, in hopes of realizing improved performance.

Disclosed herein are systems and methods for communication network control which at least partially overcome one or more of the above-discussed drawbacks. For example, some embodiments of the new systems and methods implement application awareness, where one or more network elements are aware of an application's communication resource requirements, thereby enabling the network elements to allocate the required communication resources to the application. Application awareness promotes high performance by helping ensure that the application receives needed communication resources, while promoting efficient resource use by not allocating more resources to the application than it needs. As another example, some embodiments of the new systems and methods implement network awareness, where one or more network elements are aware of performance characteristics of various communication links in the network, thereby enabling network elements to allocate data transmission among the communication links in a manner which promotes high performance, efficient use of communication links, and/or desired use of communication links.

Figure 1:
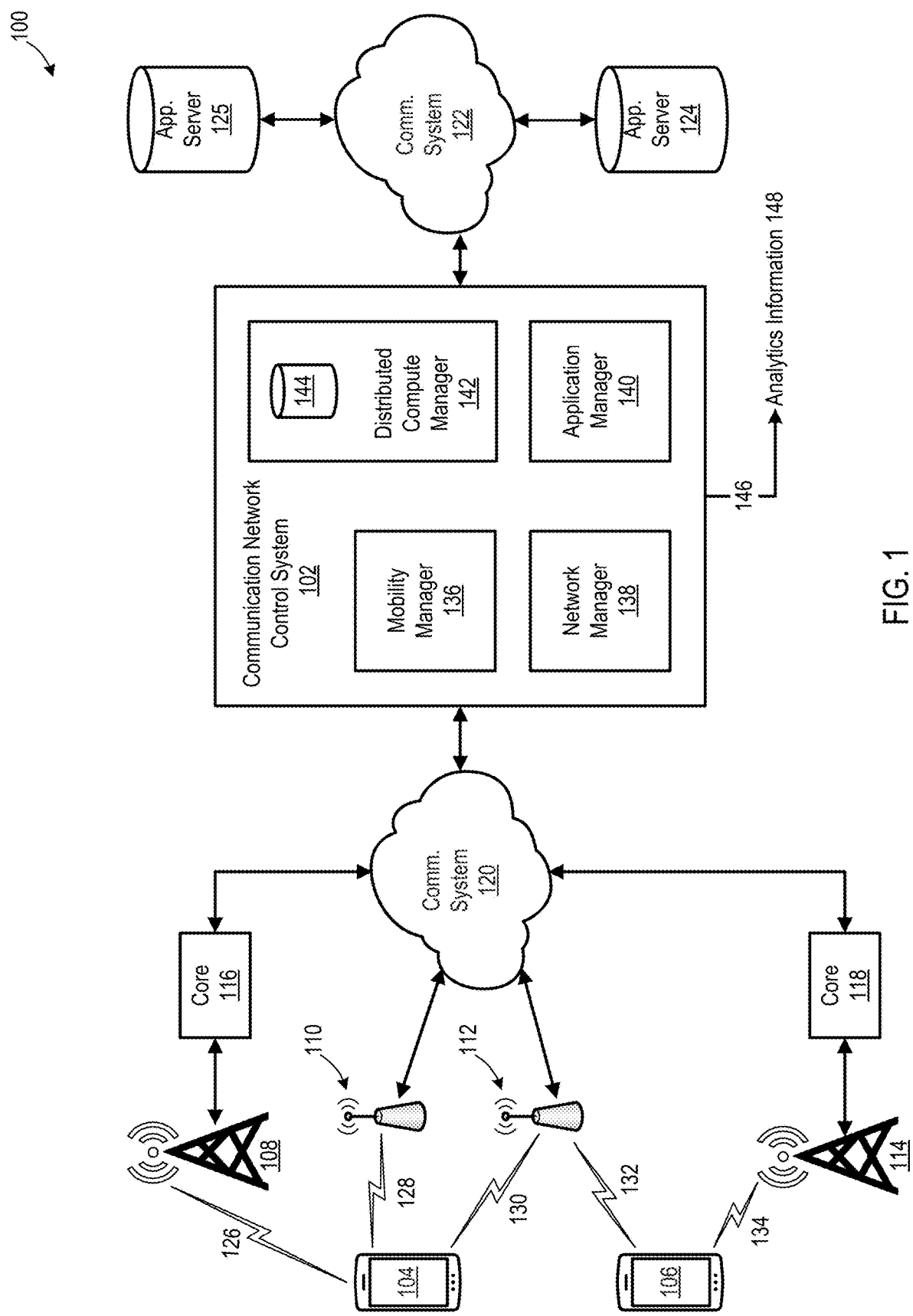
FIG. 1 is a block diagram of a communication network including a communication network control system, according to an embodiment.

FIG. 1 is a block diagram of a communication network 100 including a communication network control system 102, where communication network control system 102 is one embodiment of the new systems for communication network control. Communication network control system 102 may henceforth be referred to as "control system 102" for brevity. Communication network control system 102 may also be referred to as an IWiNS server. Communication network 100 further includes IT devices 104 and 106, wireless access points 108-114, wireless core networks 116 and 118, communication systems 120 and 122, and application servers 124 and 125. Communication network 100 may include additional, fewer, and/or alternative elements without departing from the scope hereof. For example, some embodiments include additional IT devices, additional wireless access points, and/or additional application servers.

IT devices 104 and 106 are each depicted as being a mobile telephone. However, IT devices 104 and 106 could take alternative forms without departing from the scope hereof. For example, in some alternate embodiments, one or more of IT devices 104 and 106 is instead a computer, a set-top device, a data storage device, an IoT device, an entertainment device, a computer networking device, a smartwatch, a wearable device with wireless capability, a medical device, a security device, a monitoring device, etc. IT device 104 is in range of wireless access points 108, 110, and 112, and IT device 104 can therefore connect to wireless access points 108, 110, and 112 via respective wireless communication signals 126, 128, and 130. IT device 106 is in range of wireless access points 112 and 114, and IT device 106 can therefore connect to wireless access points 112 and 114 via respective wireless communication signals 132 and 134.

In some embodiments, one or more of IT devices 104 and 106 includes a client (not shown) configured to communicate with control system 102 and apply steering policies (discussed below) from control system 102, such as discussed below with respect to FIG. 15. In some embodiments, an operating system of one or more of IT devices 104 and 106 is configured to communicate with control system 102 and apply steering policies, such as discussed below with respect to FIG. 16.

Each of wireless access points 108 and 114 is a cellular wireless access point, such as a long-term evolution (LTE) wireless access point, a fifth generation (5G) new radio (NR) wireless access point (using licensed or unlicensed spectrum, including but not limited to low-band spectrum, mid-band spectrum (including Citizens Broadband Radio Service (CBRS) spectrum), and/or millimeter wave spectrum), a sixth generation (6G) wireless access point, and/or extensions, modifications, or successors thereof. In particular embodiments, one or more of wireless access points 108 and 114 is a macro cell or a small cell (e.g., a femtocell or a picocell). Each of wireless access points 108 and 114 is supported by a core controller 116 and 118, respectively. In some embodiments, core controllers 116 and 118 include an evolved packet core (EPC), 5G core, a 6G core, and/or extensions, modifications, or successors thereof. Although each of core controllers 116 and 118 is illustrated as supporting only a single cellular wireless access point, core controllers 116 and 118 optionally can, and often will, support a plurality of wireless access points. Each of wireless access points 110 and 112 includes, for example, a Wi-Fi wireless access point, such as a wireless access point configured to operate according to an Institute of Electrical and Electronics Engineers (IEEE) 802.11-based standard, a Bluetooth wireless access point, a LoRa wireless access point, a satellite wireless access point, and/or extensions, modifications, or successors thereof.

Communication system 120 communicatively couples wireless access points 110 and 112 to control system 102. Additionally, communication system 120 communicatively couples wireless access points 108 and 114 to control system 102 via core controllers 116 and 118, respectively. Furthermore, communication system 122 communicatively couples application servers 124 and 125 to control system 102. Each of communication systems 120 and 122 includes, for example, the Internet and/or a private network such as a wide area network (WAN), a metropolitan area network (MAN), or a local area network (LAN). Although communication systems 120 and 122 are depicted as being separate communication systems, in some embodiments, communication systems 120 and 122 are partially or fully combined.

Application servers 124 and 125 are, for example, configured to provide one or more of content and services to IT devices 104 and 106. For example, in some embodiments, application servers 124 and 125 are configured to provide one or more of the following resources to IT devices 104 and 106: audio content, video content, communication services, financial services, entertainment services, productivity services, remote control services, navigation services, etc. Although application servers 124 and 125 are depicted as being discrete elements, in some embodiments, one or more of application servers 124 and 125 are part of another element. For example, application servers 124 and 125 could be virtual servers running a computing device.

Control system 102 includes a mobility manager 136, a network manager 138, an application manager 140, and a distributed compute manager 142. Control system 102 could include additional elements, alternative elements, and/or fewer elements without departing from the scope hereof. For example, in some alternate embodiments not supporting distributed computing, distributed compute manager 142 is omitted. Additionally, although mobility manager 136, network manager 138, application manager 140, and distributed compute manager 142 are depicted as being separate elements, at least two of these elements could be partially or fully combined. Mobility manager 136, network manager 138, application manager 140, and distributed compute manager 142 are implemented, for example, by analog electronics and/or digital electronics. In some embodiments, mobility manager 136, network manager 138, application manager 140, and distributed compute manager 142 are at least partially implemented by one or more processing subsystems (not shown) executing instructions in the form of software and/or firmware stored in one or more storage subsystems (not shown). Interconnections between mobility manager 136, network manager 138, application manager 140, and distributed compute manager 142 are not shown in FIG. 1 for illustrative clarity. Such interconnections may be physical interconnections (e.g. in the form of electrical or optical cables, and/or in the form of radio or optical transceivers) and/or virtual interconnections (e.g. in the form of an application program interface (API) that allows for communication among elements of control system 102).

While not required, the elements of control system 102 are typically remote from IT devices 104 and 106. Possible locations of control system 102 include, but are not limited to, a cable headend or a telecommunications central office. Control system 102 could also be implemented by a distributed computing system including a plurality of constituent components at different locations, e.g. in a "cloud" computing environment. Not all elements of control system 102 need be in a common physical location. Multiple instances of control system 102 which are logically separate could be supported by common hardware.

Figure 2:
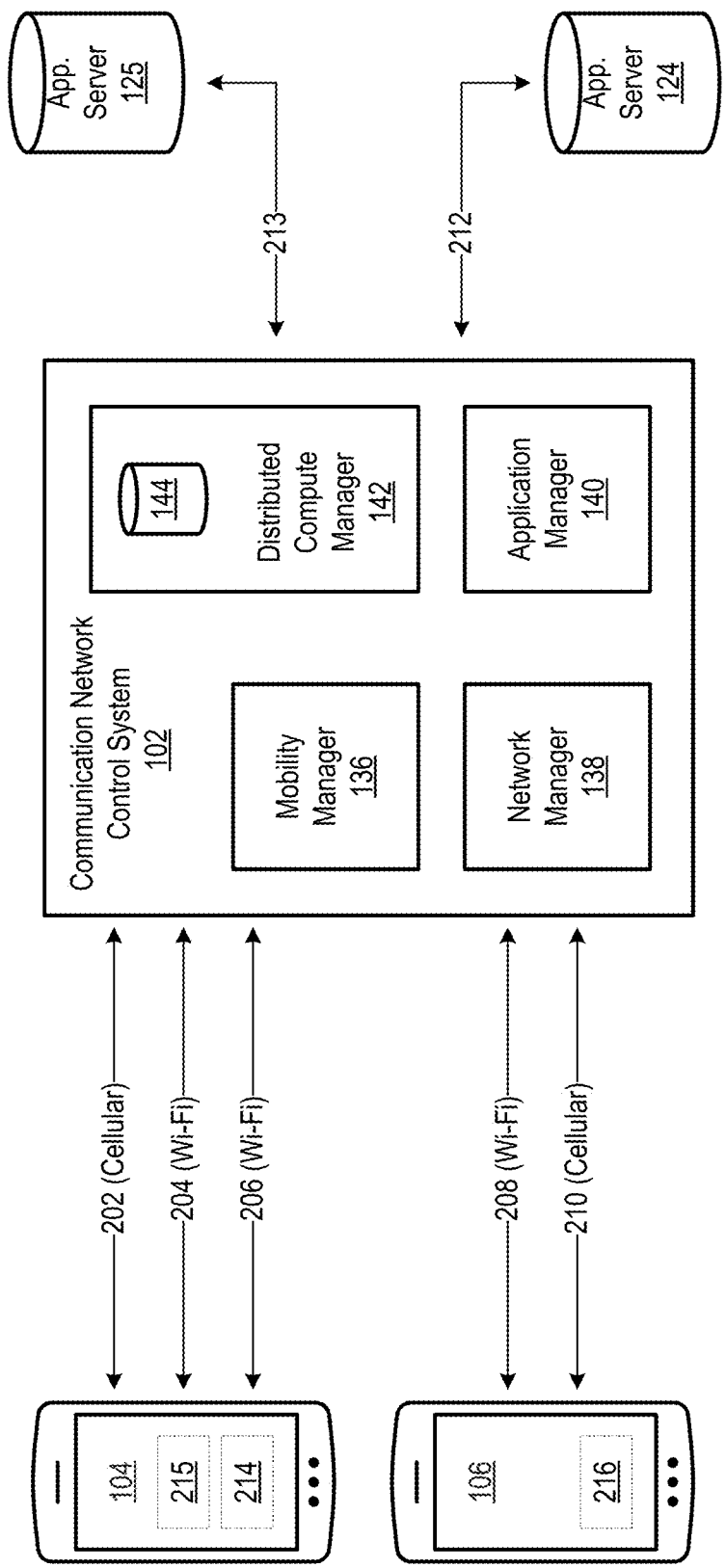
FIG. 2 is a block diagram illustrating one example of logical communication links in the FIG. 1 communication network.

FIG. 2 is a block diagram illustrating one example of logical communication links in communication network 100. In the FIG. 2 example, three parallel wireless communication links 202-206 are available to IT device 104, and two parallel wireless communication links 208 and 210 are available to wireless communication device 106. Each of wireless communication links 202-206 is a logical communication link between IT device 104 and control system 102, and each of wireless communication links 208 and 210 is a logical communication link between IT device 106 and control system 102. Wireless communication link 202 is a cellular wireless communication link implemented by wireless access point 108, core controller 116, and communication system 120. Wireless communication link 204 is a Wi-Fi wireless communication link implemented by wireless access point 110 and communication system 120. Wireless communication links 206 and 208 are each Wi-Fi communication links implemented by wireless access point 112 and communication system 120. Wireless communication link 210 is a cellular wireless communication link implemented by wireless access point 114, core controller 118, and communication system 120. In some embodiments, one or more of wireless communication links 202-210 are respective data tunnels between IT device 104 or 106 and control system 102. A logical communication link 212, which is implemented by communication system 122, connects application server 124 to control system 102. Additionally, communication system 122 implements a logical communication link 213 connecting application server 125 to control system 102.

Communication network 100 could be configured to support a different number of communication links without departing from the scope hereof. For example, communication network 100 could be modified to include an additional wireless access point and thereby support one or more additional wireless communication links associated with the additional wireless access point. As another example, communication network 100 could be modified to include additional IT devices in range of one or more of wireless access points 108-114, such that communication network 100 supports one or more additional communication links associated with the additional IT device.

FIG. 2 further illustrates an application client 214 on IT device 104, an application client 215 on IT device 104, and an application client 216 on IT device 106. Each of application clients 214 and 216 is a client of application server 124, and application client 215 is a client of application server 125. Application client 214 and application server 124 work together in a client-server relationship. Similarly, application client 215 and application server 125 work together in a client-server relationship, and application client 216 and application server 124 work together in a client-server relationship. IT devices 104 and 106 may each include additional or fewer application clients without departing from the scope hereof.

Mobility manager 136, network manager 138, application manager 140, and distributed compute manager 142 are discussed below. FIGS. 1 and 2 are best viewed together in the following discussion.

Mobility Manager 136

Mobility manager 136 is configured to relay data between IT devices and external resources. For example, mobility manager 136 is configured to (a) relay data between IT device 104 and application servers 124 and 125, and (b) relay data between IT device 106 and application server 124. Additionally, mobility manager 136 is configured to cooperate with IT devices to support communication links between IT devices and control system 102. For example, mobility manager 136 is configured to cooperate with IT devices 104 and 106 to support wireless communication links 202-210.

FIG. 3 is a dataflow diagram illustrating one example of operation of mobility manager 136. The FIG. 3 diagram includes vertical lines 302, 304, and 306, which logically correspond to application client 214, mobility manager 136, and application server 124, respectively. Application client 214 sends uplink data 308 to mobility manager 136 via cellular wireless communication link 202, and mobility manager 136, in turn, sends the received uplink data 308 to application server 124 via communication link 212. Mobility manager 136 also receives downlink data 310 from application server 124 via communication link 212, and mobility manager 136 sends received downlink data 310 to application client 214 via cellular wireless communication link 202.

While cellular wireless communication link 202 is used to transfer data between application client 214 and mobility manager 136 in the FIG. 3 example, wireless communication link 204 or 206 could be used in place of wireless communication link 202. Additionally, the same wireless communication link need not be used for transmitting both uplink and downlink data. For example, cellular wireless communication link 202 could be used to transmit uplink data 308, and Wi-Fi wireless communication link 204 could be used to transmit downlink data 310.

In some embodiments, mobility manager 136 and one or more of IT devices 104 and 106 are configured to support simultaneous data transmission using at least two wireless communication links, thereby promoting high throughput. For example, FIG. 4 is a dataflow diagram illustrating one example of operation of mobility manager 136 where data is simultaneously transmitted between application client 214 and mobility manager 136 using two wireless communication links. Specifically, IT device 104 splits uplink data 308 into a first subset 402 and a second subset 404, and IT device 104 sends first and second subsets 402 and 404 to mobility manager 136 via Wi-Fi wireless communication links 204 and 206, respectively. Mobility manager 136 combines first and second subsets 402 and 404, and mobility manager 136 then sends uplink data 308 to application server 124 via communication link 212.

Packets of first and second subsets 402 and 404 are not necessarily received in proper order by mobility manager 136. For example, Wi-Fi wireless communication link 204 may have a lower latency than Wi-Fi wireless communication link 206, which causes at least some packets of second subset 404 to be received out-of-order, i.e. later than they should be received, by mobility manager 136. Accordingly, some embodiments of mobility manager 136 are configured to reorder packets of first and second subsets 402 and 404 into a correct order before sending uplink data 308 to application server 124. However, other embodiments of mobility manager 136 do not have reordering capability, and these embodiments of mobility manger 136 forwards packets of first and second subsets 402 and 404 in order received. Accordingly, some embodiments of application server 124 are configured to reorder packets received from mobility manager 136 into a correct order, such as by using a jitter buffer.

Mobility manager 136 receives downlink data 310 from application server 124 via communication link 212, and mobility manager 136 splits downlink data 310 into a first subset 406 and a second subset 408. Mobility manager 136 sends first subset 406 to application client 214 via Wi-Fi wireless communication link 204, and mobility manager 136 sends second subset 408 to application client 214 via Wi-Fi wireless communication link 206.

While Wi-Fi wireless communication links 204 and 206 are used to transfer data between application client 214 and mobility manager 136 in the FIG. 4 example, one or more alternative or additional wireless communication links could be used to transfer data between application client 214 and mobility manager 136. For example, IT device 104 could be configured to split uplink data 308 into three subsets, and wireless communication links 202, 204, and 206 could be respectively used to transmit the three subsets from application client 214 to mobility manager 136. Additionally, the same wireless communication link need not be used for transmitting both uplink and downlink data between application client 214 and mobility manager 136. For example, wireless communication links 202 and 204 could be used to transmit uplink data 308, and wireless communication links 204 and 206 could be used to transmit downlink data 310.

With reference again to FIGS. 1 and 2, in certain embodiments, mobility manager 136 supports at least some features of a cellular core controller, e.g. an EPC core, a 5G core, an Internet Protocol Multimedia Subsystem (IMS) core, and/or a 6G core, to enable non-cellular access points, e.g. Wi-Fi wireless access points 110 and 112, to provide wireless communication service that is comparable to that provided by a cellular wireless access point. Consequently, in these embodiments, mobility manager 136 advantageously helps achieve optimal service parity for wireless access points operating in both licensed and unlicensed radio frequency (RF) spectrum. In some embodiments, mobility manager 136 is configured to simultaneously support wireless communication links implemented by both wireless access points using licensed RF spectrum and wireless access points using unlicensed RF spectrum.

In certain embodiments, mobility manager 136 is configured to serve as a proxy for application clients, e.g. application clients 214, 215, and 216, with respect to application servers 124 and 125, so that application servers 124 and 125 directly interact with mobility manager 136, instead of directly interacting with application clients. Accordingly, in these embodiments, application servers 124 and 125 see an Internet Protocol (IP) address of mobility manager 136, in place of IP addresses of IT devices 104 and 106, and mobility manager 136 instantiates and keeps alive connections to application clients. This configuration helps promote stability of application clients 214-216 and servers 124 and 125 because temporary interruption of communication between an IT device and control system 102 does not affect connections between mobility manager 136 and application servers 124 and 125, such that application servers 124 and 125 may maintain sessions during this temporary communication interruption. In some embodiments, mobility manager 136 at least partially implements one or more of a multipath transmission control protocol (MPTCP) and a multiplexed application substrate over quick user datagram protocol (UDP) Internet connections (QUIC) encryption (MASQUE) protocol.

Some embodiments of mobility manager 136 are configured to support handoff of an IT device from one wireless access point to another wireless access point, such as to provide continuous coverage during movement of the IT device and/or to enable the IT device to roam among wireless access points owned by different operators and/or using different protocols. For example, some embodiments of mobility manager 136 are configured to support handoff of IT devices 104 and 106 from one type of wireless access point to a different type of wireless access point, e.g. handoff of IT device 106 from cellular wireless access point 114 to Wi-Fi wireless access point 112 and vice versa.

Additionally, some embodiments of mobility manager 136 are configured to receive performance metrics from IT devices 104 and 106. For example, mobility manager 136 may be configured to receive application performance metrics (discussed below) from IT devices 104 and 106, and send the application performance metrics to network manager 138.

Network Manager 138

Network manager 138, sometimes referred to as netstats manager 138, is configured to provide applications and devices with intelligence for improving connectivity performance, such as by providing more information than just signal strength to applications and devices. For example, particular embodiments of network manager 138 are configured to collect network performance metrics for active wireless access points and connectivity related to the wireless access points. Examples of possible network performance metrics collected by network manager 138 include, but are not limited to, one or more of number of IT devices connected to a wireless access point, number of unconnected IT devices in range of a wireless access point, bandwidth capacity of a wireless access point, bandwidth throughput available at a wireless access point, congestion level of a wireless point, proactive network management (PNM) data from a wireless access point, wireless communication link utilization, wireless communication link latency, IT device moving speed, and core controller statistics. Certain embodiments of network manager 138 are configured to transform data received from multiple sources, such as from multiple wireless access points and/or multiple application clients, into a form that enables comparison of network element performance. Network manager 138 receives network performance metrics, for example, from IT devices 104 and 106.

Additionally, some embodiments of network manager 138 are configured to collect application performance metrics. Application performance metrics may indicate, at least in part, communication link performance experienced by application client 214, application client 215, application client 216, application server 124, and/or application server 125. Stated differently, application performance metrics indicate an application's perception of communication network 100's performance. Examples of possible data included in application performance metrics include, but are not limited to, one or more of data transmission latency, data transmission jitter, data transmission packet loss, and number of retransmissions required to transmit data between an application server and an application client. Network manager 138 receives the application performance metrics, for example, from an application on an IT device and/or an operating system of an IT device, via mobility manager 136.

Figure 5:
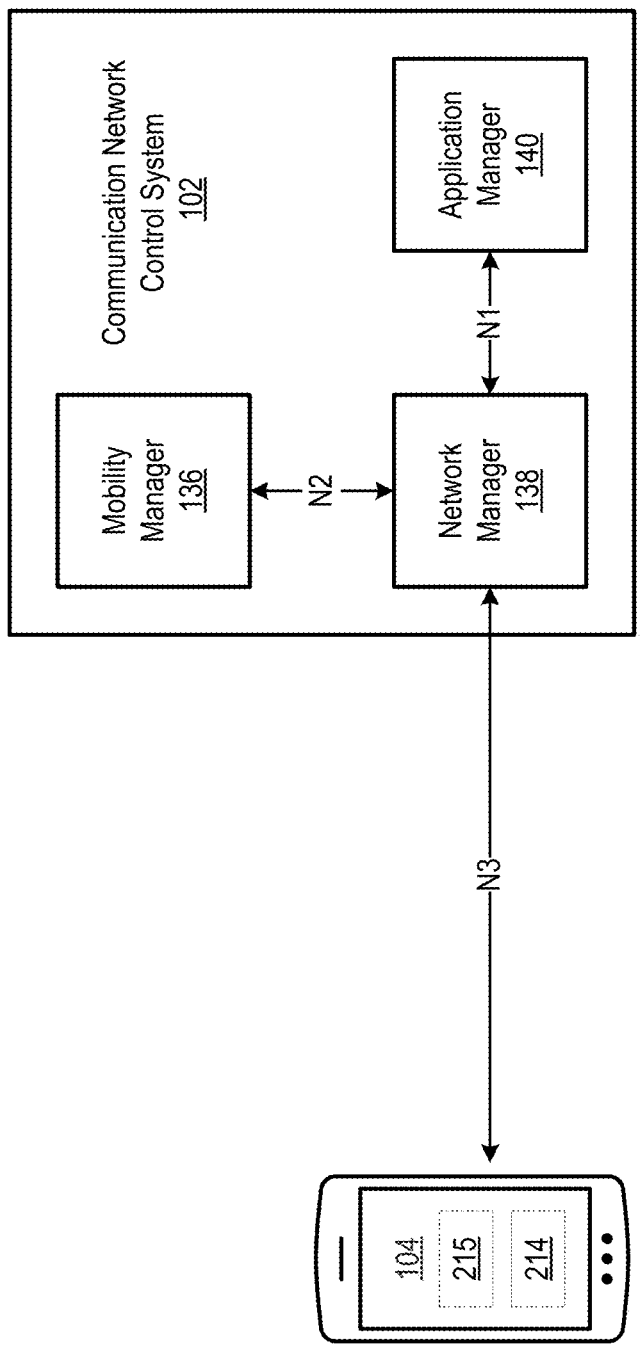
FIG. 5 is a block diagram illustrating one example of logical communication links associated with a network manager of FIGS. 1 and 2, according to an embodiment.

FIG. 5 is a block diagram illustrating one example of logical communication links associated with network manager 138. FIG. 5 illustrates logical communication link N1 from network manager 138 to application manager 140, logical communication link N2 from network manager 138 to mobility manager 136, and logical communication link N3 from network manager 138 to IT device 104. Application manager 140 uses logical communication link N1, for example, to retrieve application performance metrics and network performance metrics from network manager 138. In some embodiments, mobility manager 136 is configured to send application performance metrics to network manager 138 via logical communication link N2, and IT device 104 is configured to send network performance metrics to network manager 138 via logical communication link N3. Although IT device 106 is not depicted in FIG. 5, an additional logical communication link (not shown) that is analogous to logical communication link N3 may be present between network manager 138 and IT device 106.

Figure 6:
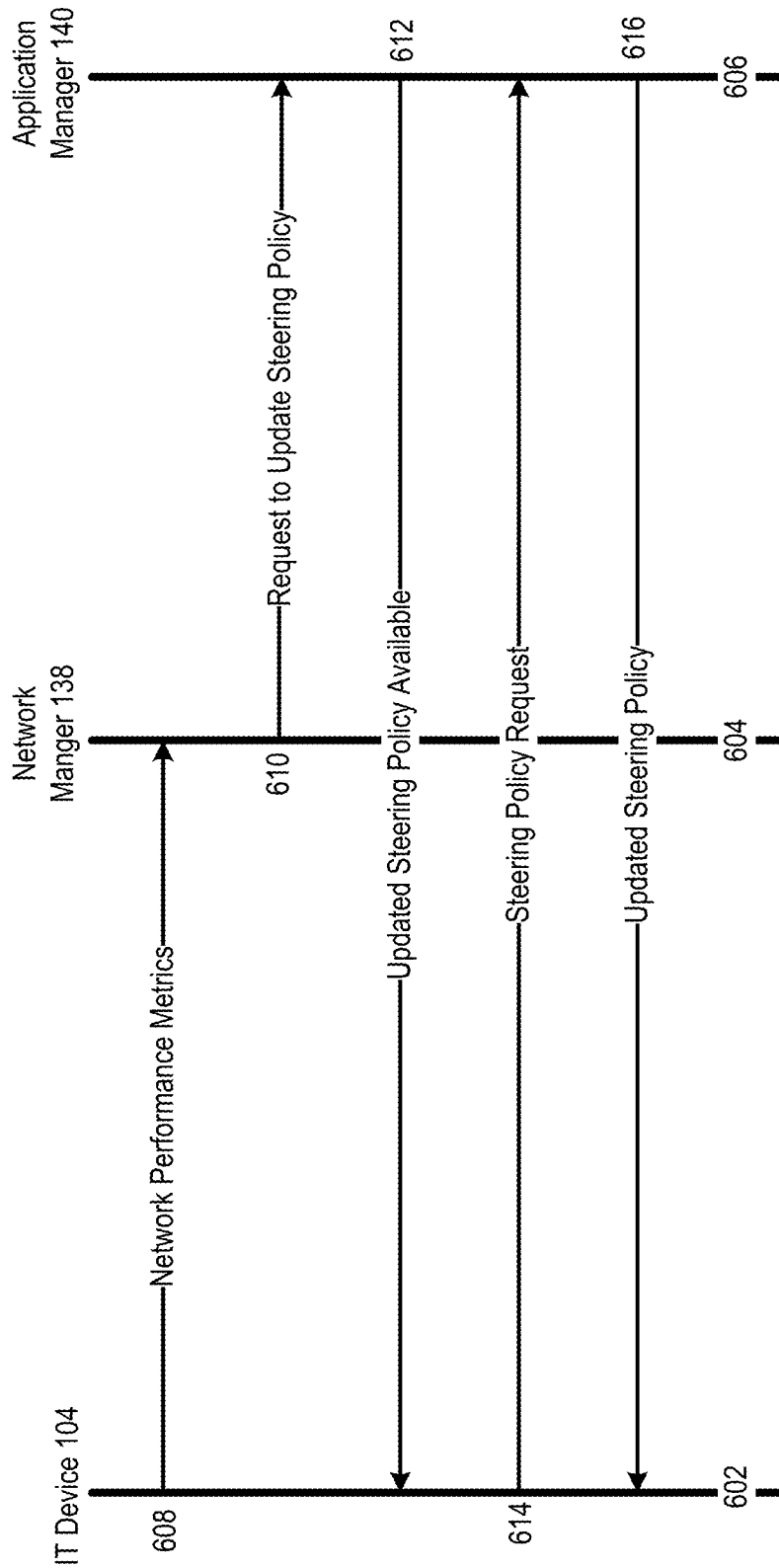
FIG. 6 is a dataflow diagram illustrating one example of operation of the network manager of FIGS. 1 and 2, according to an embodiment.

FIG. 6 is a dataflow diagram illustrating one example of operation of network manager 138. The FIG. 6 diagram includes vertical lines 602, 604, and 606, which logically correspond to IT device 104, network manager 138, and application manager 140, respectively. In a step 608, IT device 104 sends network performance metrics to network manager 138 via logical communication link N3. Network manager 138 determines that a steering policy for IT device 104 should change, such as due to congestion at a wireless access point currently serving IT device 104. Consequently, in a step 610, network manager 138 sends a request to application manager 140 to update the steering policy for IT device 104, via logical communication link N1. Application manager 140 accordingly generates an updated steering policy, and application manager notifies IT device 104, in a step 612, that the updated steering policy is available. IT device 104 responds by requesting the updated steering policy from application manager 140 in a step 614, and application manager 140 sends the updated steering policy to IT device 104 in a step 616. IT device 104 steers data to mobility manager 138 according to the updated steering policy, such as discussed below with respect to application manager 140.

Referring again to FIG. 5, in some embodiments, an IT device is configured to directly communicate with network manager 138, such as by using logical communication link N3. In these embodiments, an IT device communicates with network manager 138, for example, to obtain performance metrics for use in selecting a wireless communication link, thereby enabling the IT device to select a wireless communication link for use based on information in addition to, or in place of, received signal strength.

Application Manager 140

Application manager 140 promotes high performance of applications. Certain embodiments of application manager 140 support an API to enable an application client on an IT device, and/or an application server, to interact with application manager 140, e.g. to improve user experience. For example, in some embodiments, application client 214, application client 215, application client 216, application server 124, and/or application server 125 are configured to send application resource requirements to application manager 140, where the application resource requirements specify communication resources required by an application client and/or an application server. Application resource requirements include, for example, one or more of minimum uplink throughput, minimum downlink throughput, and maximum round-trip latency. Alternately or additionally, application resources requirements may be predetermined, such as on an application basis, an application-class basis, and/or an IT device basis. For example, application manager 140 may specify first application resource requirements for streaming content applications and second application resource requirements for gaming applications, where the first and second application resource requirements are different.

Furthermore, in some embodiments, one or more elements of control system 102, such as mobility manager 136 and/or application manager 140, determine application resource requirements from data flowing through control system 102, e.g. at least partially based on amount of data flowing through control system 102, source and/or destination of data flowing through control system 102, timing of data flowing through control system 102, and/or type of data flowing through control system 102. For example, certain embodiments of mobility manager 136 are configured to learn an application's resource requirements by comparing the application's current throughput to the application's provisioned throughput.

In some embodiments, application manager 140 is configured to provide one or more steering policies, where each steering policy specifies an allocation of data among wireless communication links available to an IT device. For example, a steering policy for IT device 104 may specify an allocation of data among wireless communication links 202-206, and a steering policy for IT device 106 may specify an allocation of data among wireless communication links 208-210. Application manager 140 may be referred to as a policy manager due its role in providing steering policies.

An IT device sends uplink data to mobility manager 136 over at least one of a plurality of communication links available to the IT device, according to an allocation of data specified by a steering policy. For example, if IT device 104 receives a steering policy specifying that uplink data from IT device 104 to mobility manager 136 is evenly allocated among cellular wireless communication link 202 and Wi-Fi wireless communication link 204, IT device 104 would send (a) fifty percent of uplink data to mobility manager 136 via cellular wireless communication link 202 and (b) fifty percent of uplink data to mobility manager 136 via Wi-Fi wireless communication link 204.

Mobility manager 136 sends downlink data to an IT device over at least one of a plurality of communication links available to the IT device, according to an allocation of data specified by a steering policy. For example, if a steering policy species that downlink data from mobility manager 136 to IT device 104 is allocated among cellular wireless communication link 202 and Wi-Fi wireless communication link 204 in a 1:4 ratio, respectively, mobility manager 136 would send (a) twenty five percent of downlink data to IT device 104 via cellular wireless communication link 202 and (b) seventy five percent of downlink data to IT device 104 via Wi-Fi wireless communication link 204. Steering policies for uplink and downlink data need not be the same.

In certain embodiments, application manager 140 is configured to send steering policies to one or more of client devices 104 and 106, mobility manager 136, and application servers 124 and 125. Additionally, in particular embodiments, application manager 140 is configured to send a steering policy in response to a request, such as in response to one or more of a request from an IT device, a request from an application on an IT device, a request from an application server, and a request from mobility manager 136.

In some embodiments, application manager 140 is configured to provide multiple steering policies for a given IT device. For example, in some embodiments, application manager 140 is configured to provide a respective steering policy for each application client, or for each class of application clients. Application manager 140 could even be capable of providing steering policies on a per-dataflow basis. Table 1 lists some possible dataflow characteristics from which a steering policy can be determined. As shown in Table 1, a steering policy can be determined, for example, based on one or more of application type, dataflow information, destination IP address, destination port, data direction (downlink or uplink), protocol type, communication link identification (e.g., Wi-Fi service set identifier (SSID), cellular public land mobile network (PLMN) identifier, or satellite wireless communication network identifier), and communication link accessibility (e.g., private communication link or public communication link). Application manager 140 is optionally configured to provide a default steering policy for dataflows that do not meet particular characteristics warranting a different steering policy.

TABLE 1

| Characteristic | Description |
| --- | --- |
| Application type | Streaming, file downloading, real-time communication, etc. |
| Dataflow Info. | A tuple of source IP, destination IP, and destination port |
| Destination IP | The IP that DNS resolved for an application server |
| Destination port | The port associated with the destination IP address to reach an application server |
| Direction | Downlink or uplink |
| Protocol | TCP (Transfer Control Protocol), UDP (User Datagram Protocol), HTTP (HyperText Transfer Protocol), etc. that an application uses |
| Communication link identification | E.g., Wi-Fi SSID, cellular PLMN identifier, satellite wireless communication network identifier, etc. |
| Communication link accessibility | E.g., private communication link or public communication link |

Application manager 140 provides a steering policy, for example, to satisfy one or more of the following criteria: (a) to provide communication resources required by an application client, (b) to achieve efficient use of communication links available to the IT device, and (c) to achieve a desired use of communication links available to the IT device, e.g. to maximize use of a lowest-cost communication link. For example, one application client may not be latency-sensitive, so a steering policy for this application client may allocate data to a low cost, high latency, wireless communication link, which minimizes operator cost while providing adequate service to the application client. As another example, an application client may require low latency and high throughput, so a steering policy for this application client may allocate data to a high performance wireless communication link that is relatively costly, to provide adequate service to the application client.

In some embodiments, application manager 140 provides steering policies based at least partially on one or more of application performance metrics and network performance metrics. For example, application manager 140 may provide a steering policy which allocates zero data to one wireless communication link in response to application performance metrics indicating that the wireless communication link is congested. As another example, application manager 140 may provide a steering policy which allocates a majority, e.g. eighty percent, of data to a second wireless communication link in response to network performance metrics indicating that the wireless communication link provides high throughput. Application manager 140 is optionally configured to optimize steering policies over time through use of machine learning.

Table 2 below lists some possible steering policies, although it understood that communication network 100 may implement alternative and/or additional steering policies.

TABLE 2

| Policy Name | Description |
| --- | --- |
| Active-Standby | Steer data to an active communication link. Switch to a standby communication link when the active communication link becomes unavailable. Switch back to the active communication link when it becomes available again. |
| Best Performance | Steer data to a best performing communication link based on performance metrics. Switch to another communication link when performance of the best performing communication link falls below a threshold value. |
| Least Cost | Steer data to a least cost communication link. Switch data to another communication link when performance of the best performing communication link falls below a threshold value. |
| Least Loaded | Steer data to a least loaded communication link. Switch data to another communication link when performance of the least loaded communication link falls below a threshold value. |
| Load Balance | Split data in an equal or weighted distribution, across two or more available communication links. |
| Overflow | Send all data that will fit in the available bandwidth across a preferred communication link and send the remaining data to one or more other available communication links. |
| Priority-Based | Assign a priority to each communication link, and send all data across a highest priority communication link, if possible. If a first-priority communication link is congested, send new data flows to a lower-priority communication link. Additionally, if the first-priority communication link is unavailable, send all data to one or more lower priority communication links. |
| Best-Access | Same as the priority-based steering policy, but priority is based on performance. |
| Redundancy Transmission | Send data in a redundant manner across two or more communication links. |
| Smallest Delay First | Select a communication link with smallest delay (i.e. smallest round-trip path) to carry data. |
| Top Up | Steer data to a least cost communication link. Split data across the least cost communication link and one or more additional communication links when performance of the least cost communication link falls below a threshold value. |

The active-standby steering policy requires both an active communication link and a standby communication link. Data is steered to the active communication link when the active communication link is available, and data is steered to the standby communication link when the active communication link is unavailable. For example, assume that (1) Wi-Fi wireless communication link 208 is an active wireless communication link for application client 216 and (2) cellular wireless communication link 210 is a standby wireless communication link for application client 216. In this example, an active-standby steering policy would specify that (1) 100% of data associated with application client 216 is allocated to Wi-Fi wireless communication link 208 when Wi-Fi wireless communication link 208 is available, and (2) 100% of data associated with application client 216 is allocated to cellular wireless communication link 210 when Wi-Fi wireless communication link 208 is unavailable. Thus, Wi-Fi wireless communication link 208 would carry all data associated with application client 216 when Wi-Fi wireless communication link 208 is available, and cellular wireless communication link 210 would carry all data associated with application client 216 when Wi-Fi wireless communication link 208 is unavailable. A communication link is deemed to be unavailable, for example, in response to failure of the communication link or performance of the communication, such as latency and throughput, failing to meet one or more threshold values.

The best performing steering policy steers data to a best performing communication link based on performance metrics, such as application performance metrics and/or network performance metrics. Data is switched to another communication link in response to performance of the best performing communication link falling below a threshold value. For example, assume that Wi-Fi wireless communication link 208 offers best performance to application client 216. In this example, a best performing steering policy would specify that 100% of data associated with application client 216 is allocated to Wi-Fi wireless communication link 208, and if performance of Wi-Fi wireless communication link 208 falls below a threshold value, 100% of data associated with application client 216 is allocated to cellular wireless communication link 210. Thus, Wi-Fi wireless communication link 208 would carry all data associated with application client 216 when Wi-Fi wireless communication link 208 is performing at or above the threshold value, and cellular wireless communication link 210 would carry all data associated with application client 216 when performance of Wi-Fi wireless communication link 208 falls below the threshold value.

The least cost steering policy steers data to a least cost communication link. Cost is determined, for example, by cost incurred by a network operator to lease or operate a communication link. Data is switched to another communication link in response to performance of the least cost communication link falling below a threshold value. For example, assume that Wi-Fi wireless communication link 208 offers a lowest cost to serve application client 216. In this example, a least cost steering policy would specify that 100% of data associated with application client 216 is allocated to Wi-Fi wireless communication link 208, and if performance of Wi-Fi wireless communication link 208 falls below a threshold value, 100% of data associated with application client 216 is allocated to cellular wireless communication link 210. Thus, Wi-Fi wireless communication link 208 would carry all data associated with application client 216 when wireless communication link 208 is performing above at or above the threshold value, and cellular wireless communication link 210 would carry all data associated with application client 216 when performance of Wi-Fi wireless communication link 208 falls below the threshold value.

The least loaded steering policy steers data to a communication link having a smallest load. Communication link load is determined, for example, by network manager 138. Data is switched to another communication link in response to performance of the least cost communication link falling below a threshold value. For example, assume that Wi-Fi wireless communication link 206 has a smallest load of each of wireless communication links 202-206 available to application client 214. In this example, a least loaded steering policy would specify 100% of data associated with application client 214 is allocated to Wi-Fi wireless communication link 206, and if performance of Wi-Fi wireless communication link 206 falls below a threshold value, 100% of data associated with application client 214 is allocated to another available wireless communication link, i.e. to Wi-Fi wireless communication link 204 or cellular wireless communication link 202. Thus, Wi-Fi wireless communication link 206 would carry all data associated with application client 214 when Wi-Fi wireless communication link 206 is performing at or above the threshold value, and wireless communication link 202 or 204 would carry all data associated with application client 214 when performance of Wi-Fi wireless communication link 206 falls below the threshold value.

The load balance steering policy splits data equally, or according to a weighted distribution, across two or more available communication links. For example, one load balance steering policy may specify that data associated with application client 216 is evenly allocated among wireless communication links 208 and 210, i.e., half of the data is carried by Wi-Fi wireless communication link 208 and half of the data is carried by cellular wireless communication link 210. As another example, a load balance steering policy may specify the following allocation associated with application client 215 among wireless communication links 202-206: 20% of data is allocated to cellular wireless communication link 202, 40% of data is allocated to Wi-Fi wireless communication link 204, and 40% of data is allocated to Wi-Fi wireless communication link 206. Thus, wireless communication link 202 would carry 20% of the data associated with application client 215, and each of wireless communication links 204 and 206 would carry a respective 40% of data associated with application client 215.

The overflow steering policy sends all data that will fit in available bandwidth of a preferred communication link across this communication link, and a remaining portion of the data is sent across one or more other available communication links. For example, assume that Wi-Fi wireless communication link 204 is a preferred wireless communication link for application client 214 and that cellular wireless communication link 202 is an alternative wireless communication link for application client 214. An overflow steering policy would specify that as much data associated with application client 214 as possible is allocated to Wi-Fi wireless communication link 204, and remaining data associated with application client 214 is allocated to wireless communication link 202. Thus, Wi-Fi wireless communication link 204 would carry as much data as possible, and cellular wireless communication link 202 would handle overflow data.

The priority-based steering policy assigns a priority to each communication link, and all data is sent across a highest priority communication link, if possible. If the highest priority communication link is congested, new data flows are sent to one or more lower priority communication links. Additionally, if the highest priority communication link is unavailable, all data is sent to one or more lower priority communication links. For example, assume that Wi-Fi wireless communication link 208 is a highest priority wireless communication link for application client 216. A priority-based steering policy would specify that all data associated with application client 216 is allocated to Wi-Fi wireless communication link 208, but the policy would further specify that any new data flows be allocated to cellular wireless communication link 210 if Wi-Fi wireless communication link 208 is congested. The policy would additionally specify that all data associated with application client 216 be allocated to cellular wireless communication link 210 if Wi-Fi wireless communication link 208 is unavailable. The best-access steering policy is the same as the priority-based steering policy but priority is based on performance, such as application performance metrics and/or network performance metrics.

The redundancy transmission steering policy allocates the same data to two or more communication links, such that data is transmitted in a redundant manner. For example, a redundancy transmission steering policy may specify that data associated with application client 216 be allocated to Wi-Fi wireless communication link 208 and cellular wireless communication link 210 in a redundant manner, such that the two wireless communication links carry the same data.

The smallest delay first steering policy allocates data to a communication link having a smallest delay (i.e. smallest round-trip time path). For example, assume that Wi-Fi wireless communication link 206 has a lowest latency of all wireless communication links 202-206 available to application client 215. A smallest delay first steering policy would allocate all data associated with application client 215 to Wi-Fi wireless communication 206, such that Wi-Fi wireless communication 206 carries all data associated with application client 215.

The top up steering policy steers data to a least cost communication link. Data is split across the least cost communication link and one or more additional communication links when performance of the least cost communication link falls below a threshold value. For example, assume that Wi-Fi wireless communication link 204 is a least cost wireless communication link for application client 214. A top up steering policy may specify that (1) a 100% of data associated with application client 214 is allocated to Wi-Fi wireless communication link 204, (2) data is evenly or unevenly allocated among Wi-Fi wireless communication links 204 and 206 if performance of Wi-Fi wireless communication link 204 falls below a threshold value.

Table 3 below shows several examples of possible steering policies for IT device 104, but it is understood that communication system 100 is not limited to the examples of Table 3. In the examples of Table 3, steering policy varies between application clients and data flow directions. Specifically, downlink data to application client 214 is steered according to a top up steering policy, and uplink data from application client 214 is steered according to a least cost steering policy. Additionally, downlink data to application client 215 is steered according to a priority based steering policy, and uplink data from application client 215 is steered according to a smallest delay first steering policy.

TABLE 3

| Application Client | Data Flow Direction | Steering Policy |
|---|---|---|
| 214 | Downlink | Top Up |
| 214 | Uplink | Least Cost |
| 215 | Downlink | Priority Based |
| 215 | Uplink | Smallest Delay First |

In certain embodiments, application manager 140 is configured to send an updated steering policy to an application client or an application server, such as in response to a change in operation of one or more aspects of communication network 100, such as discussed in the FIG. 6 example. The updated steering policy specifies, for example, a different allocation of data among communication links available to an associated IT device, to improve performance or accomplish another objective. For example, consider a scenario where application client 214 is using Wi-Fi wireless communication link 206 to transfer data to and from mobility manager 136. In certain embodiments, application manager 140 is configured to send an updated steering policy to IT device 104 in response to the application client receiving poor service from wireless communication link 206, where the updated steering policy specifies a different allocation of data among wireless communication links 202-206, such as to transfer data using Wi-Fi wireless communication link 204 instead of Wi-Fi wireless communication link 206.

Furthermore, in certain embodiments, application manager 140 is configured to (a) determine that an IT device is moving toward an area including one or more congested wireless access points, and (b) in response to determining that the IT device is moving toward the area including one or more congested wireless access points, send a command to an application client on the IT device to exchange data with mobility manager 136, i.e. to upload data and/or download data. Accordingly, in these embodiments, application manager 140 promotes high performance of the application client by causing data exchange before the IT device is connected to a congested wireless access point. Additionally, in some embodiments, application manager 140 is configured to send an updated steering policy to an IT device moving toward an area including one or more congested wireless access points, where the updated steering policy specifies a different allocation of data among wireless communication links available to the IT devices, to mitigate performance degradation associated with the congested wireless access point.

In some embodiments, application manager 140 shares calculated data among application client instances. For instance, if an application client in a IT device of a vehicle calculates road congestion ahead of it, the application client can send congestion point information to application manager 140, and application manager 140 can share this information with IT devices in other vehicles nearing that same congestion point, such as using application server 124 and/or 125.

Figure 7:
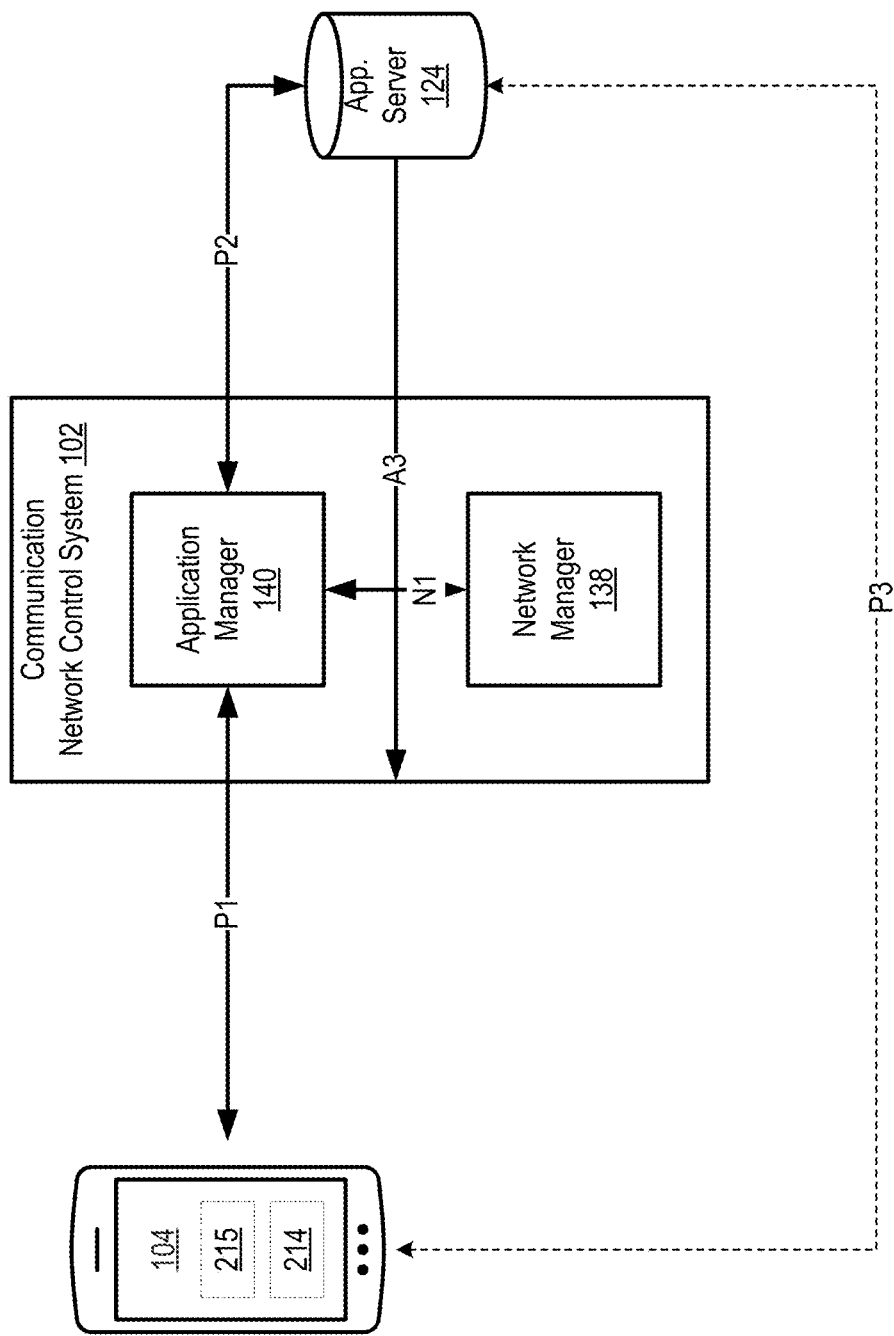
FIG. 7 is a block diagram illustrating one example of logical communication links associated with an application manager of FIGS. 1 and 2, in an embodiment where one or more applications are capable of providing application resource requirements to a control system.

FIG. 7 is a block diagram illustrating one example of logical communication links associated with application manager 140 in an embodiment where one or more applications are capable of providing application resource requirements to control system 102. FIG. 7 illustrates logical links N1, A3, P1 and P2. N1 is the logical communication link between network manager 138 and application manager 140, as discussed above with respect to FIG. 5. A3 is a logical communication link between application server 124 and a logical communication link C1 (not shown in FIG. 7) between IT device 104 and control system 102, as discussed below with respect to FIG. 9. P1 is a logical communication link between IT device 104 and application manager 140. P1 carries, for example, (1) application performance metrics from IT device 104 to application manager 140, (2) application resource requirements from IT device 104 to application manager 140, (3) steering policies from application manager 140 to IT device 104, and/or (4) a command from application manager 140 to IT device 104 for an application client to exchange data with mobility manager 136. P2 is a logical communication link between application manager 140 and application server 124, and P2 carries, for example, (1) application resource requirements from application server 124 to application manager 140, (2) data calculated by application server 124 to application manager 140 for application manager 140 to share with application client instances, and/or (3) a request from application server 124 for data calculated by application clients. P3 is a logical communication link between application server 124 and IT device 104, and in some embodiments, an application client and an application server collectively use logical communication link P3 to determine application performance metrics. Although IT device 106 is not depicted in FIG. 7, additional logical communication links (not shown) that are analogous to logical communication links P1 and P3 may be connected to IT device 106. Additionally, while application server 125 is not shown in FIG. 7, additional logical communication links (not shown) that are analogous to logical communication links A3, P2, and P3 may be connected to application server 125.

Figure 8:
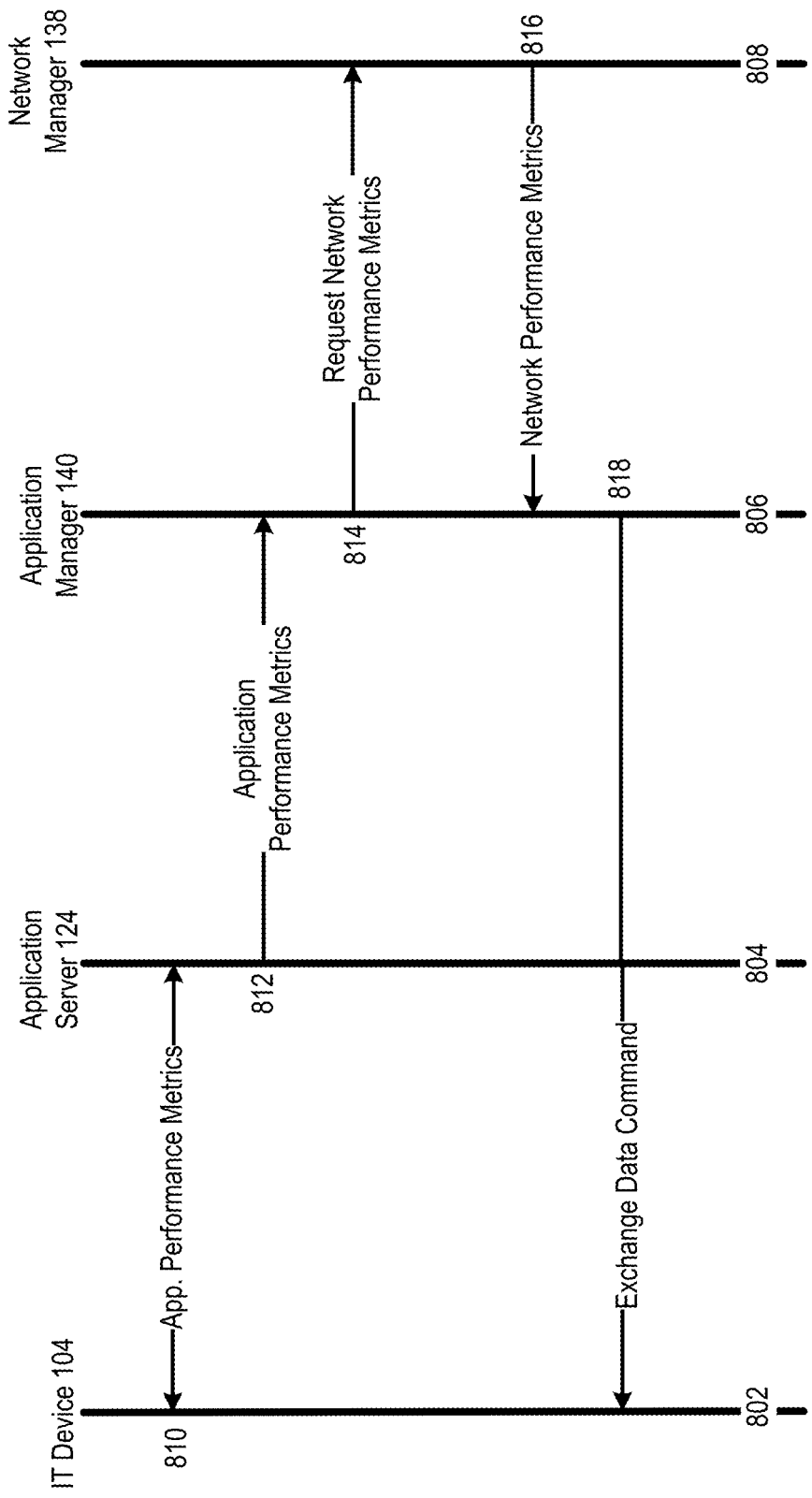
FIG. 8 is a dataflow diagram illustrating one example of the application manager of FIGS. 1 and 2 determining that an IT device is moving towards a congested wireless access point, according to an embodiment.

FIG. 8 is a dataflow diagram illustrating one example of application manager 140 determining that IT device 104 is moving towards a congested wireless access point, in an embodiment where one or more applications are capable of providing application resource requirements to control system 102. The FIG. 8 diagram includes vertical lines 802, 804, 806, and 808, which logically correspond to IT device 104, application server 124, application manager 140, and network manager 138, respectively. IT device 104 and application server 124 exchange application performance metrics via logical communication link P3 in a step 810, where examples of the application performance metrics include, but are not limited to, jitter, packet delay, packet loss, buffering, and/or retransmitted frames, experienced by application client 214 and/or application server 124. The application performance metrics could indicate communication link performance for an entire logical link between application client 214 and application server 124. Alternately, the application performance metrics could indicate communication link performance for one or more portions of the logical link between an application client 214 and application server 124, e.g. between IT device 104 and control system 102, and/or between control system 102 and application server 124.

Application server 124 sends the application performance metrics to application manager 140 via logical link P2 in a step 812, and in an alternate embodiment, application client 214, or a combination of application client 214 and application server 124, send the application performance metrics to application manager 140. In a step 814, application manager 140 sends a request for network performance metrics to network manager 138 via logical communication link N1. Network manager 138 responds to the request in a step 816 by sending network performance metrics to application manager 140. In a step 818, application manager 140 determines from the application performance metrics and/or the network performance metrics that IT device 104 is moving towards a congested wireless access point, and application manager 140 therefore sends a data exchange command to IT device 104 via logical link P1. Application client 214 exchanges data with mobility manager 136 in response to the data exchange command, such that application client 214 downloads and/or uploads data before IT device 104 connects to the congested wireless access point. Application manager 140 could alternately or additionally send a data exchange command to application server 124. Additionally, application manager 140 could alternately or additionally send an updated steering policy to IT device 102 and/or application server 124, where the updated steering policy specifies a different allocation of data among wireless communication links available to IT device 104, to mitigate performance degradation associated with the congested wireless access point.

Referring again to FIG. 1, control system 102 optionally further includes an analytics interface 146 configured to provide analytics information 148 to one or more external systems. Analytics interface 146 includes, for example, a physical interface or an API. Analytics information 148 includes, for example, some or all of the network performance metrics, application performance metrics, and/or application resource requirements, collected or generated by control system 102. Accordingly, analytics information 148 may constitute data from multiple elements in communication network 100, e.g., from data multiple IT devices, multiple applications, multiple application servers, etc., and analytics information 148 may therefore offer deep insight into operation communication network 100.

Analytics information 148 may be used, for example, by a communication network operator to support communication network operation, maintenance, and/or expansion. For example, assume a scenario where wireless access point 108 is frequently congested. Analytics information 148 may indicate such congestion, thereby enabling a network operator to become aware of the congestion and plan upgrades to address the congestion. It should also be appreciated that analytics information 148 is automatically generated, thereby advantageously freeing a network operator from having to collect this information.

Distributed Compute Manager 142

Distributed Compute Manager 142 is configured to interface with application clients and/or application servers to provide local resources for processing data. In some embodiments, distributed compute manager 142 is configured to allow applications to leverage local servers, such as a distributed access server (DAS) 144 established by distributed compute manager 142. These servers are used, for example, for temporary caching of content and/or application image setup. Distribute compute manager 142 is configured, for example, to establish DAS 144 in response to receiving instructions from application server 124 to establish DAS 144, and distributed compute manager 142 is configured to tear-down DAS 144 in response to receiving instructions from application server 124 to tear-down DAS 144. Alternately or additionally, in some embodiments, distributed compute manager 142 is configured to tear-down DAS 144 in response to termination, or other change in operating state, of an application using DAS 144. Distribute compute manager 142 is optionally configured to establish multiple distributed access servers, such as a respective distributed access server for each of a plurality of applications.

Figure 9:
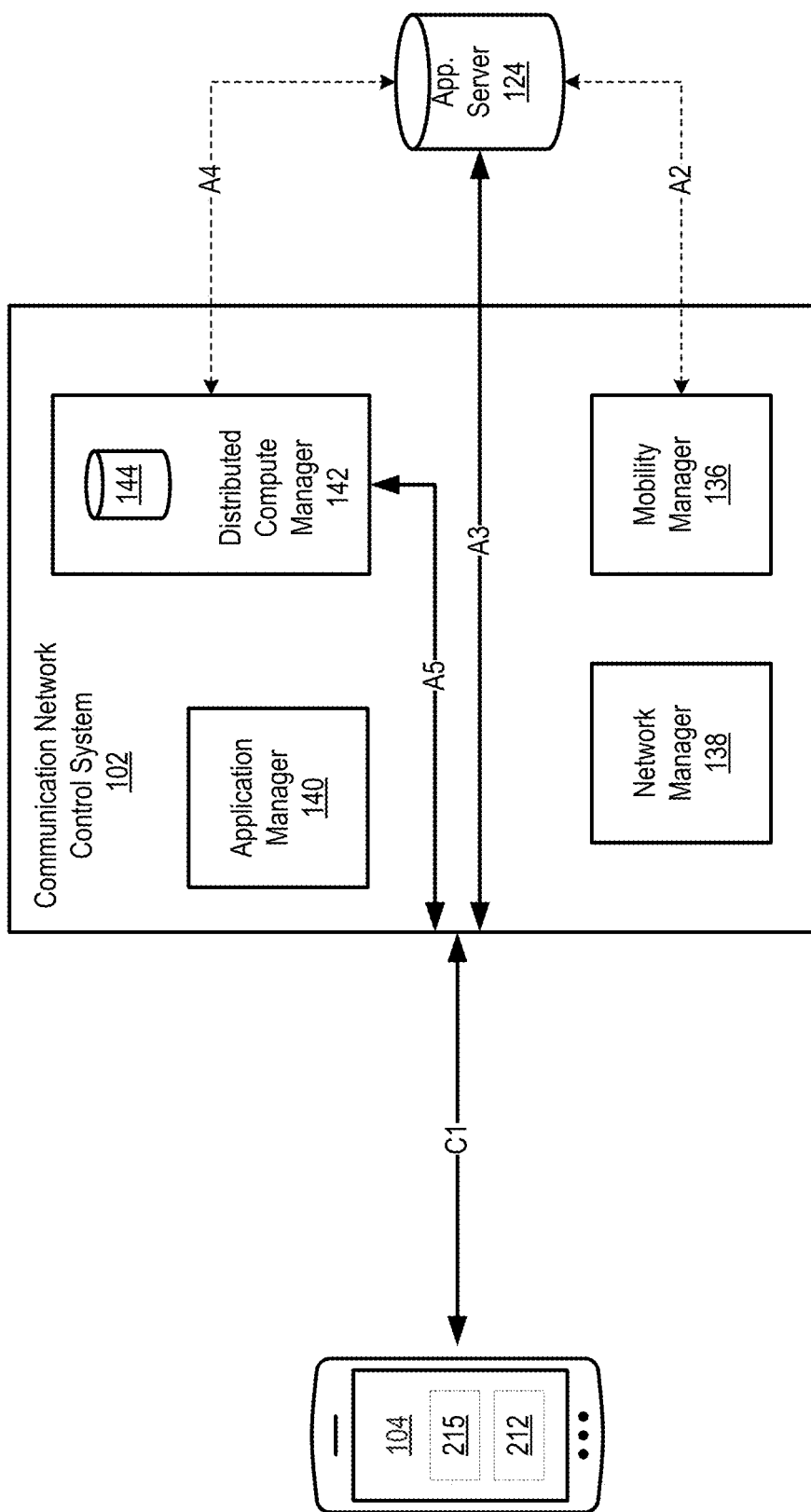
FIG. 9 is a block diagram illustrating one example of logical communication links associated with a distributed compute manager of FIGS. 1 and 2, according to an embodiment.

FIG. 9 is a block diagram illustrating one example of logical communication links associated with distributed compute manager 142. FIG. 9 illustrates logical communication links C1, A2, A3, A4, and A5. C1 is a logical communication link between IT device 104 and control system 102, and in some embodiments, C1 includes one or more of wireless communication links 202-206 of FIG. 2. A2 is a logical communication link between application server 124 and mobility manager 136. A2 carries, for example, resource requests, e.g., hypertext transport protocol secure (HTTPS) requests, to application server 124, as well as distributed compute information to application server 124. The distributed compute information, for example, notifies application server 124 that distributed compute manager 142 can provide distributed computing resources, such as local caching and distribution of data on behalf of application server 124. Alternately or additionally, the distributed compute information carried by A2 may identify network characteristics (e.g., characteristics of communication links available to IT device 104), and/or the distributed compute information may control protocol exchange with application server 124 (e.g., jitter, packet delay, and packet loss).

A3 is a logical communication link between application server 124 and logical communication link C1, and in some embodiments, A3 bypasses mobility manager 136. A3 carries data, e.g. content, from application server 124 to logical link C1, and logical link C1 carries this data to IT device 104. A4 is a logical communication link between application server 124 and distributed compute manager 142, and A4 carries, for example, instructions to establish DAS 144, data to seed DAS 144, and/or data to tear-down DAS 144. A5 is a logical communication link which carries data from DAS 144 to logical communication link C1, and logical communication link C1 conveys this data to IT device 104.

Although IT device 106 is not depicted in FIG. 9, an additional logical communication link (not shown) that is analogous to logical communication link C1 may be connected to IT device 106. Additionally, while application server 125 is not shown in FIG. 9, additional logical communication links (not shown) that are analogous to logical communication links A2 and A4 may be connected to application server 125.

Figure 10:
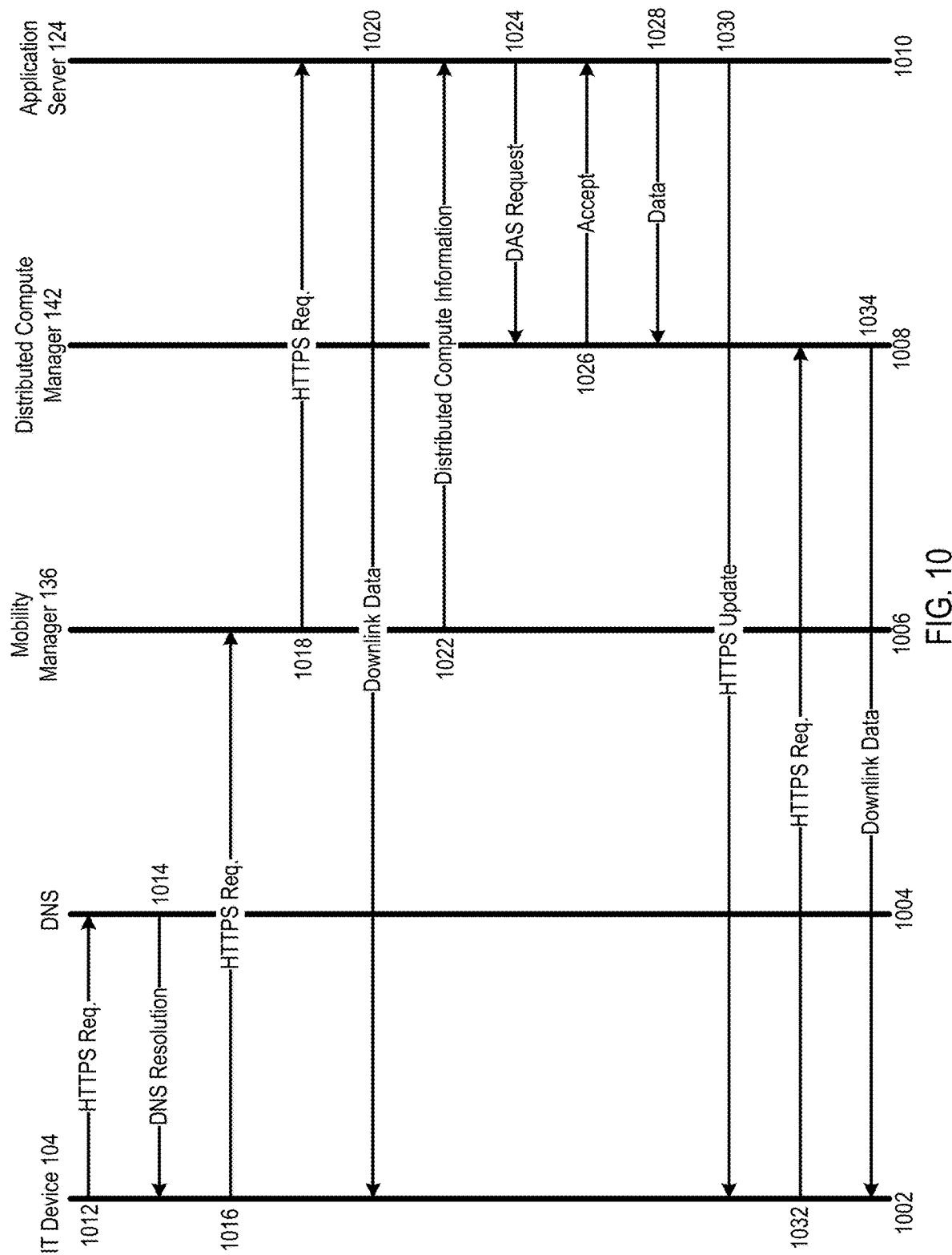
FIG. 10 is a dataflow diagram illustrating one example of operation of the distributed compute manager of FIGS. 1 and 2, according to an embodiment.

FIG. 10 is a dataflow diagram illustrating one example of operation of distributed compute manager 140. The FIG. 10 diagram includes vertical lines 1002, 1004, 1006, 1008, and 1010, which logically correspond to IT device 104, a domain name server (DNS), mobility manager 136, distributed compute manager 142, and application server 124, respectively. In a step 1012, IT device 104 sends the DNS a hypertext transport protocol secure (HTTPS) request, such as in response to application client 214 requiring content from application server 124. The DNS resolves the HTTPS request, and the DNS sends a DNS resolution to IT device 104 in a step 1014. The DNS resolution specifies an Internet Protocol (IP) address associated with the HTTPS request, such as a version 4 IP address and/or a version 6 IP address. In this example, the IP address is associated with mobility manager 136, which as discussed below, will forward the HTTPS request to the appropriate resource. In a step 1016, IT device 104 sends the HTTPS request and associated IP address to mobility manager 136, and mobility manager 136 forwards the HTTPS request to application server 124 using logical communication link A2 of FIG. 9, in a step 1018. Application server 124 responds to the HTTPS request in a step 1020 by sending downlink data, e.g. content required by application client 214, to IT device 104 using logical communication link A3 of FIG. 9.

In a step 1022, mobility manager 136 sends distributed compute information to application server 124, using logical communication link A2. The distributed compute information, for example, notifies application server 124 that distributed compute manager 142 can provide distributed computing resources, such as local caching and distribution of data on behalf of application server 124. Application server 124 responds to the distributed compute information in a step 1024 by sending a DAS request to distributed computer manager 142 using logical communication link A4 of FIG. 9, requesting that distributed compute manager 142 establish a DAS. In response, distributed compute manager 142 establishes DAS 144, and distributed compute manager 142 sends an acceptance of the DAS request to application server 124 using logical communication link A4, in a step 1026.

Application server 124 subsequently seeds DAS 144 by sending downlink data, e.g. content required by application client 214, using logical communication link A4, in a step 1028.

In a step 1030, application server 124 notifies IT device 104 that data associated with the HTTPS request is now available at distribute compute manager 142 by sending an HTTPS update to IT device 104 using logical communication link A2. IT device 104 accordingly sends a subsequent HTTPS request to distributed compute manager 142 in a step 1032, and distributed compute manager 142 responds to the HTTPS request in a step 1034 by sending downlink data, e.g. content required by application client 214, to IT device 104 using logical communication link A5.

Steps 1032 and 1034 do not require use of mobility manager 136, as illustrated in FIG. 10. However, in some alternate embodiments, mobility manager 136 is involved in the transfer of the HTTPS request in step 1032 and/or the transfer of downlink data in step 1034. Additionally, while the example of FIG. 10 includes HTTPS requests, distributed compute manager 142 is not limited to serving HTTPS requests. Instead, distributed compute manager 142 could be configured to serve many other alternative and/or different types of requests without departing from the scope hereof.

Referring again to FIG. 1, in some embodiments of communication network 100, security is user-centric, where access to resources of communication network 100 is available based on identity of a user, instead of based on identity of a device being used by the user. Additionally, some embodiments of communication network 100 support a plurality of identities for a given user, where a user's access to network resources may vary among the plurality identities. For example, a user may have a personal identity and a business identity for communication network 100, and network resources available to the user may vary between these two identities.

Figure 11:
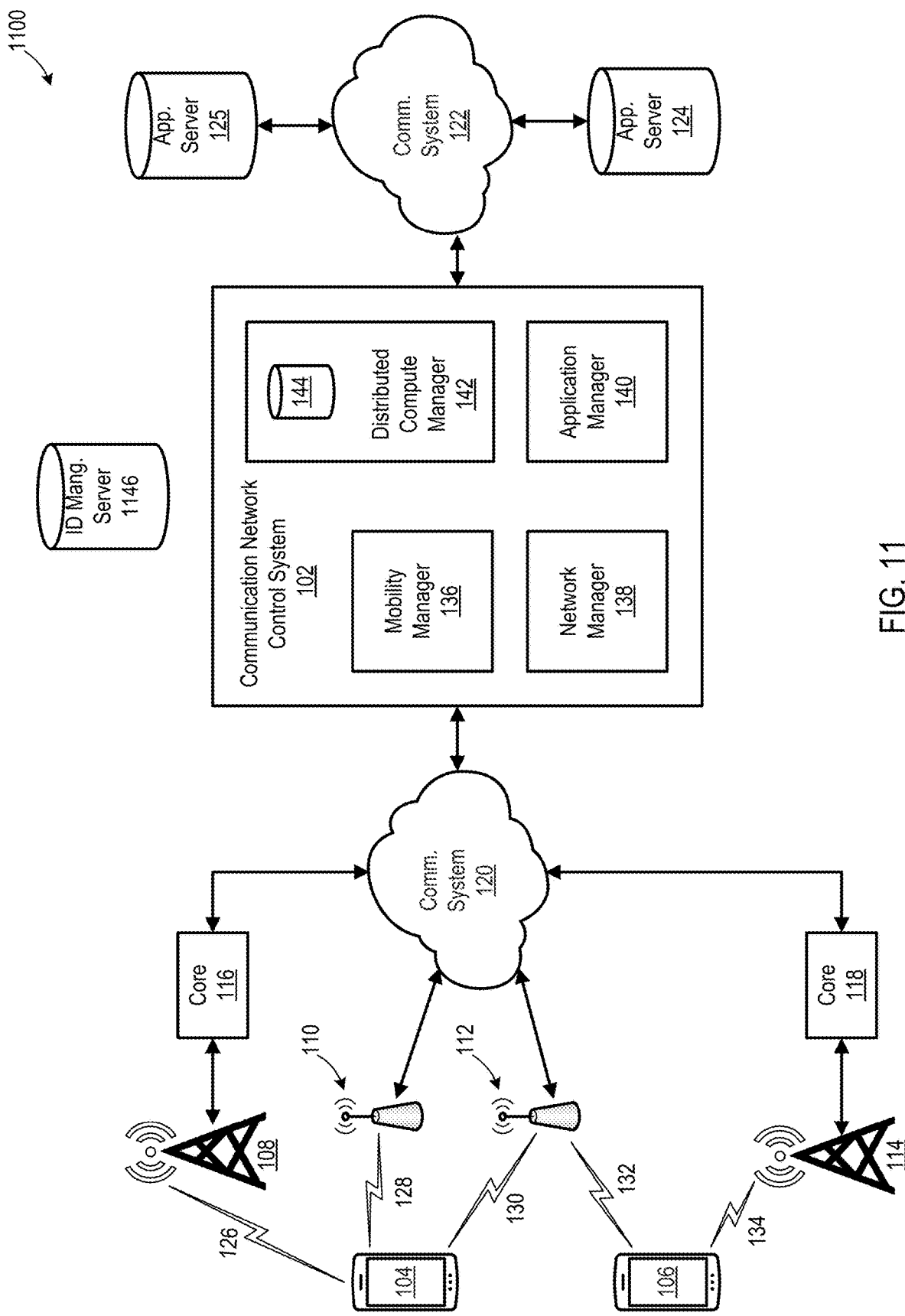
FIG. 11 is a block diagram of an embodiment of the FIG. 1 communication network further including an identification management server.

FIG. 11 is a block diagram of a communication network 1100, which is an embodiment of communication network 100 (FIG. 1) further including an identification (ID) management server 1146. ID management server 1146 implements the aforementioned user-centric security by providing user authentication to elements of communication network 1100. For example, in some embodiments, ID management server 1146 is configured to authenticate a user of IT device 104 to one or more of wireless access points 108-112, control system 102, application server 124, and application server 125. Connections between ID management server 1146 and other elements communication network 1100 are not shown for illustrative clarity. ID management server 1146 could be replaced with a plurality of servers collectively implementing user-centric security. Additionally, although ID management server 1146 is depicted as being a discrete element, in some embodiments, ID management server 1146 is integrated in one or more other elements of communication network 1100, such as in control system 102.

Figure 12:
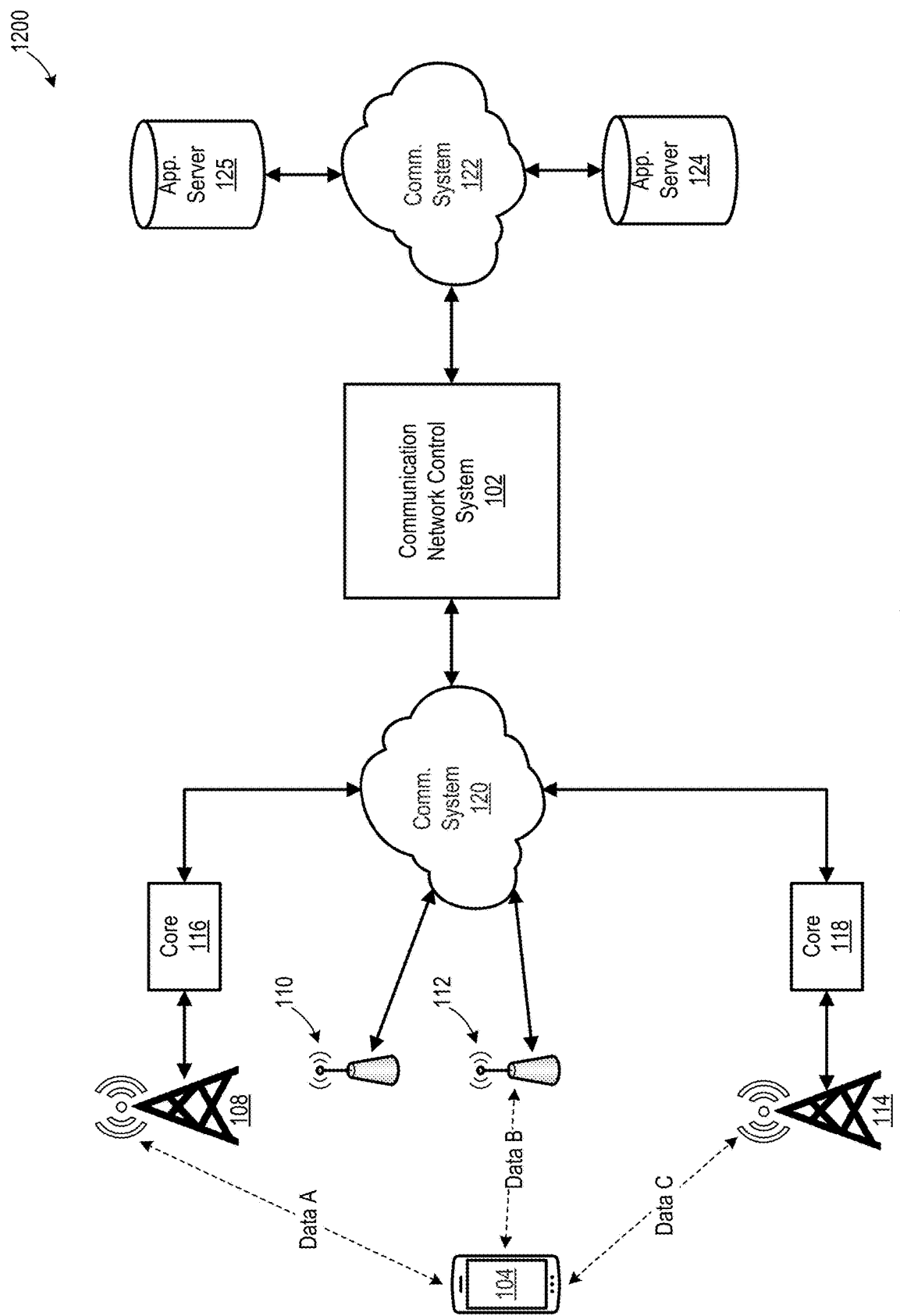
FIG. 12 is a block diagram of an embodiment of the FIG. 1 communication network where the communication network control system is configured to use a Wi-Fi wireless communication link as a bridge while an IT device transitions between cellular wireless communication networks.

Some embodiments of control system 102 are configured to use a Wi-Fi wireless communication link as a bridge while an IT device transitions from one cellular wireless communication link to another cellular wireless communication link, to reduce or even eliminate communication disruption during the transition. For example, FIG. 12 is a block diagram of a communication network 1200, which is an embodiment of communication network 100 where control system 102 is configured to use a Wi-Fi wireless communication link as a bridge. In the FIG. 12 example, IT device 104 is initially connected to cellular wireless access point 108, and data A is transmitted between IT device 104 and control system 102 using cellular wireless communication link 202 (FIG. 2). As discussed above with respect to FIG. 2, cellular wireless communication link 202 is implemented by cellular wireless access point 108, wireless core network 116, and communication system 120. IT device 104 is also connected to control system 102 via Wi-Fi wireless communication link 206, although Wi-Fi wireless communication link 206 is not necessarily active, in this example. As discussed above with respect to FIG. 2, Wi-Fi wireless communication link 206 is implemented by wireless access point 112 and communication system 120.

IT device 104 then moves toward cellular wireless access point 114, and IT device 104 consequently transitions (roams) from cellular wireless communication link 202 to cellular wireless communication link 210. Wireless communication links 202 and 210 may be operated by a common network operator, or wireless communication links 202 and 210 may be operated by different respective network operators. Wi-Fi wireless communication link 206 serves as bridge by transmitting data B between IT device 104 and control system 102 while cellular wireless communication link 210 is being established, thereby reducing or even eliminating disruption of communication between IT device 104 and control system 102 during the transition. Data C is subsequently transmitted between IT device 104 and control system 102 via cellular wireless communication link 210, once cellular wireless communication link 210 is established. Each of data A, B, and C includes one or more of uplink data and downlink data.

Additionally, some embodiments of communication system 100 are configured to use a cellular wireless communication link as a bridge while an IT device transitions from one Wi-Fi wireless communication link to another Wi-Fi wireless communication link, to reduce or even eliminate communication disruption during the transition. Such bridging may be performed, for example, in a manner similar to that discussed above with respect to FIG. 12, but where wireless access points 108 and 114 are replaced with respective Wi-Fi wireless access points and wireless access point 112 is replaced with a cellular wireless access point.

Figure 13:
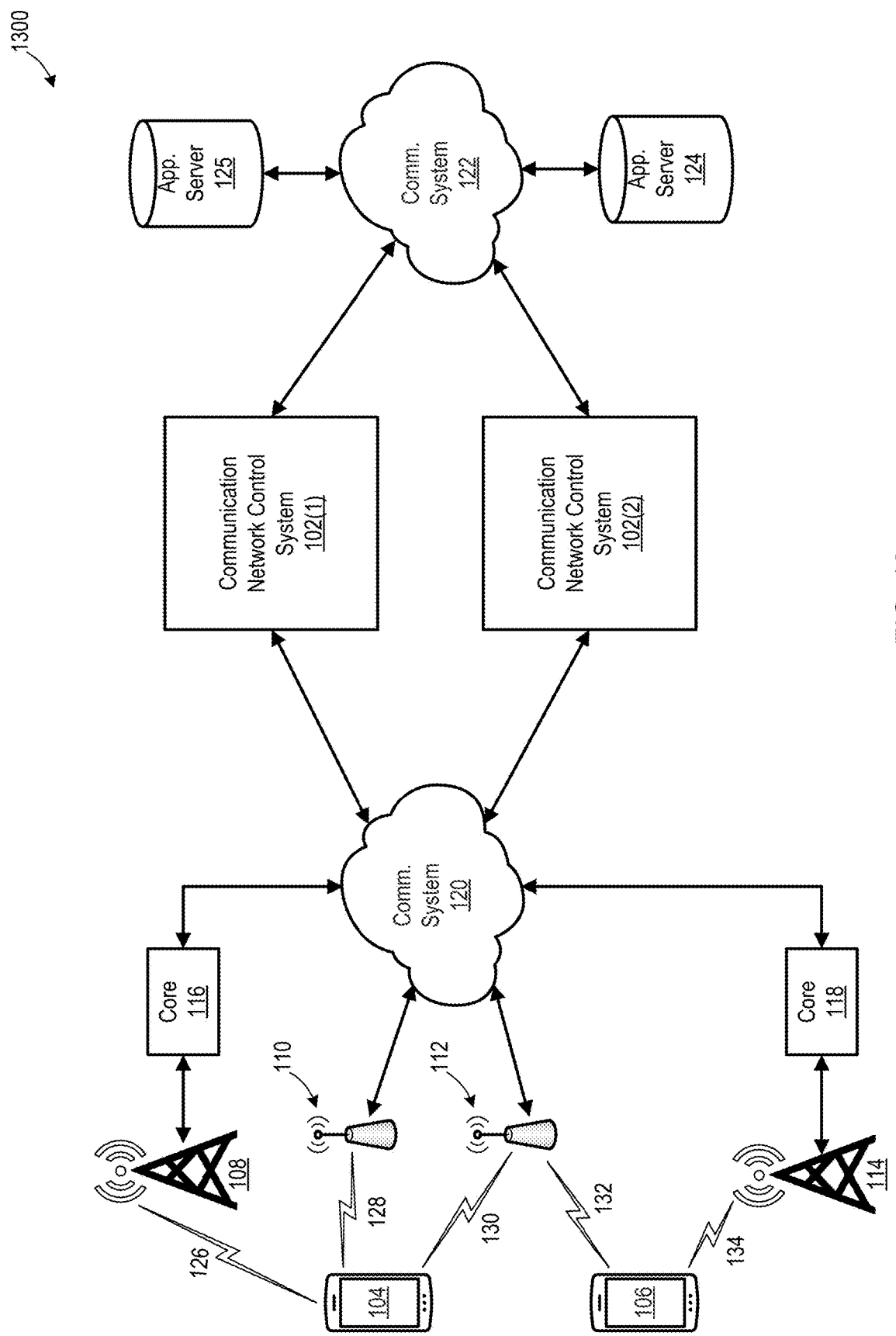
FIG. 13 is block diagram of an embodiment of the FIG. 1 communication network including a plurality of communication network control systems.

A communication network could include a plurality of control systems 102, such as for redundancy and/or load balancing. For example, FIG. 13 is a block diagram of a communication network 1300 which is an embodiment of communication network 100 and includes two instances of control system 102, i.e. control system 102(1) and 102(2). In this document, specific instances of an item may be referred to by use of a numeral in parentheses (e.g., control system 102(1)) while numerals without parentheses refer to any such item (e.g., control systems 102). Details of control systems 102 are not shown in FIG. 13 for illustrative clarity. Some embodiments of communication network 1300 are configured such that (1) control system 102(1) is a primary control system and (2) control system 102(2) is a backup control system that is used in case of failure or overload of control system 102(1). In some other embodiments, communication network 1300 is configured such that control systems 102(1) and 102(2) operate in parallel, e.g. control system 102(1) handles a first portion of the traffic in network 1300 and control system 102(2) handles a remaining second portion of traffic in communication network 1300, to achieve load balancing. In some embodiments, each of control systems 102(1) and 102(2) are supported by common computing hardware executing instructions in the form of software and/or firmware stored in a memory. Communication network 1300 could be modified to include additional control system 102 instances without departing from the scope hereof.

Figure 14:
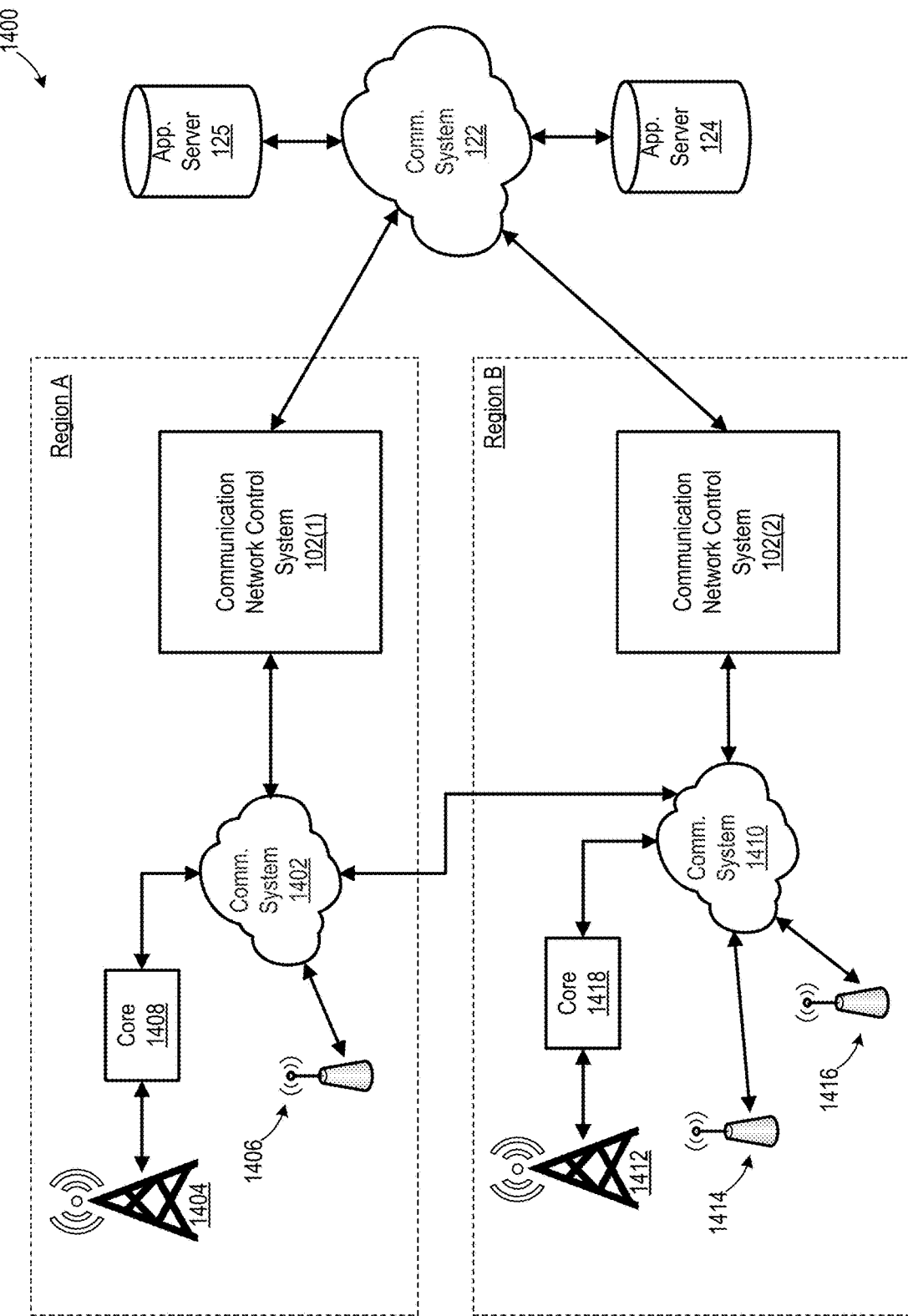
FIG. 14 is block diagram of an embodiment of the FIG. 1 communication network including two regions, where each region includes a respective communication network control system.

FIG. 14 is a block diagram of a communication network 1400 which is an embodiment of communication network 100 including two regions, i.e. region A and region B, along with instances of communication system 122, application server 124, and application server 125. In some embodiments, regions A and B correspond to different geographic areas, and in some other embodiments, regions A and B correspond to different logical portions of a common geographic area. Region A includes a control system 102(1), a communication system 1402, wireless access points 1404 and 1406, and a wireless core network 1408. Region B includes a control system 102(2), a communication system 1410, wireless access points 1412-1416, and a wireless core network 1418. Details of control systems 102 are not shown in FIG. 14 for illustrative clarity. Wireless access points 1404 and 1412 are cellular wireless access points analogous to wireless access points 108 and 114 of FIG. 1, and wireless access points 1406, 1414, and 1416 are Wi-Fi wireless access points analogous to wireless access points 110 and 112 of FIG. 1. Wireless core networks 1408 and 1418 are analogous to wireless core networks 116 and 118 of FIG. 1.

Communication systems 1402 and 1410 are each analogous to communication system 120 of FIG. 1. Although communication systems 1402 and 1410 are illustrated as being separate systems, in some embodiments, the two communication systems are partially or fully integrated. Additionally, communication systems 1402 and 1410 are optionally interconnected to enable data transfer between regions A and B. Communication system 1402 communicatively couples wireless access point 1406 to control system 102(1), and communication system 1402 communicatively couples wireless access point 1404 to control system 102(1) via core controller 1408. Similarly, communication system 1410 communicatively couples wireless access points 1414 and 1416 to control system 102(2), and communication system 1410 communicatively couples wireless access point 1412 to control system 102(2) via core controller 1418. Control system 102(1) primarily supports region A, and control system 102(2) primarily supports region B. However, control system 102(1) is capable of supporting region B in case of failure or overload of control system 102(2), and control system 102(2) is capable of supporting region A in case of failure or overload of control system 102(1). In certain embodiments, each of control systems 102(1) and 102(2) are supported by common computing hardware executing instructions in the form of software and/or firmware stored in a memory. Communication network 1400 could be modified to include additional regions without departing from the scope hereof.

Figure 16:
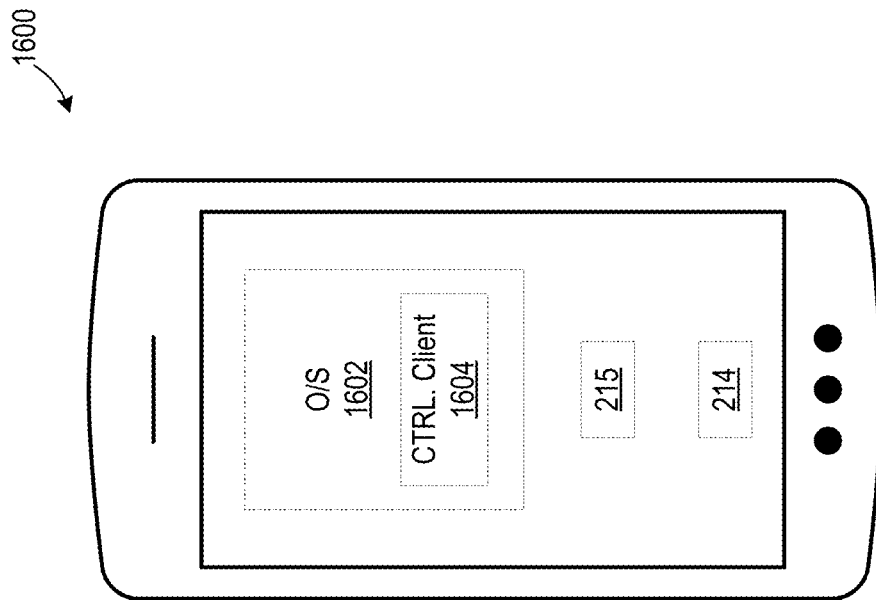
FIG. 16 is a block diagram of another embodiment of an IT device of the FIG. 1 communication network.
Figure 15:
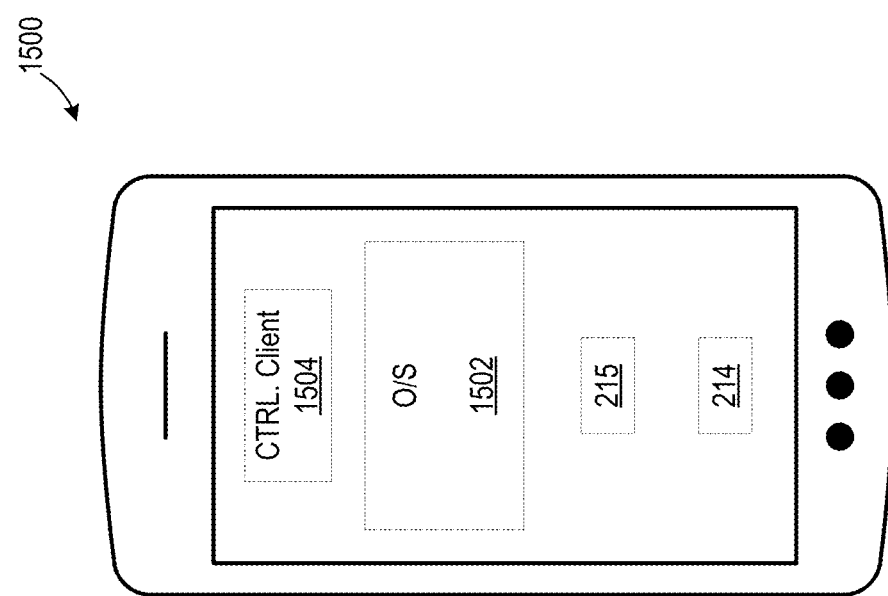
FIG. 15 is a block diagram of one embodiment of an IT device of the FIG. 1 communication network.

Discussed below with respect to FIGS. 15 and 16 are examples of IT devices that may be used with the control systems disclosed herein. However, the control systems disclosed herein are not limited to use with the IT devices of FIGS. 15 and 16.

FIG. 15 is a block diagram of an IT device 1500, which is one possible embodiment of IT device 104 of FIGS. 1 and 2. IT device 1500 includes an operating system (O/S) 1502 and a control client 1504, along with aforementioned application clients 214 and 215. O/S 1502 manages hardware and software of IT device 1500, and O/S 1502 provides services for applications, e.g. application clients 214 and 215, installed on IT device 1500.

Control client 1504 interfaces IT device 1500 with mobility manager 136. In some embodiments, control client 1504 is configured to cooperate with mobility manager 136 to support wireless communication links 202-206. Control client 1504 is also configured to steer uplink data according to a steering policy received from application manager 140. For example, if a steering policy evenly allocates uplink data from application client 214 among cellular wireless communication link 202 and Wi-Fi wireless communication link 204, control client 1504 will evenly split uplink data from application client 214 among cellular wireless communication link 202 and Wi-Fi wireless communication link 204. Control client 1504 is additionally configured to steer downlink data from multiple wireless communication links to an appropriate application client on IT device 1500. For example, if a steering policy allocates downlink data for application client 215 among Wi-Fi wireless communication links 204 and 206, control client 1504 will steer this downlink data from each of Wi-Fi wireless communication links 204 and 206 to application client 215. In some embodiments, control client 1504 is further configured to request a steering policy from application manager 140.

Control client 1504 is optionally configured to generate application performance metrics, e.g. indicating an application client 214's and 215's perception of communication network 100's performance. For example, in some embodiments, control client 1504 is configured to determine latency and throughput by sending data packets to a client data gateway 1718 of a control system 1700 of FIG. 17 (discussed below), such that client data gateway 1718 loops back the packets to control client 1504, thereby enabling control client 1504 to determine round-trip time for the data packets and estimate current network latency therefrom.

An application client may influence how often control client 1504 determines latency and throughput. For example, if an application client requires low latency but not much throughput, control client 1504 may perform round-trip-time measurements more frequently than for an application client that is not sensitive to latency. Latency and throughput measurements may also be performed on a per-application client basis, in a manner which does not affect throughput of the application client. Control client 1504 can be configured to perform latency and throughput measurements in the background when application clients are not being actively used, such that control client 1504 knows latest characteristics of each wireless communication link when an application client starts. Control client 1504 may send estimated throughput and latency performance metrics to network manager 138, thereby enabling application manager 140 adapt steering policies to current network conditions.

FIG. 16 is a block diagram of an IT device 1600, which is another possible embodiment of IT device 104 of FIGS. 1 and 2. IT device 1600 includes an O/S 1602 as well as application clients 214 and 215. O/S 1602 includes a control client 1604 embedded therein. Control client 1604 performs some or all of the functions performed by control client 1504 of FIG. 15. Embedding control client 1604 in O/S 1602 may advantageously improve performance of communication system 100, e.g. by reducing latency of data transmission between IT device 1600 and mobility manager 136.

Figure 17:
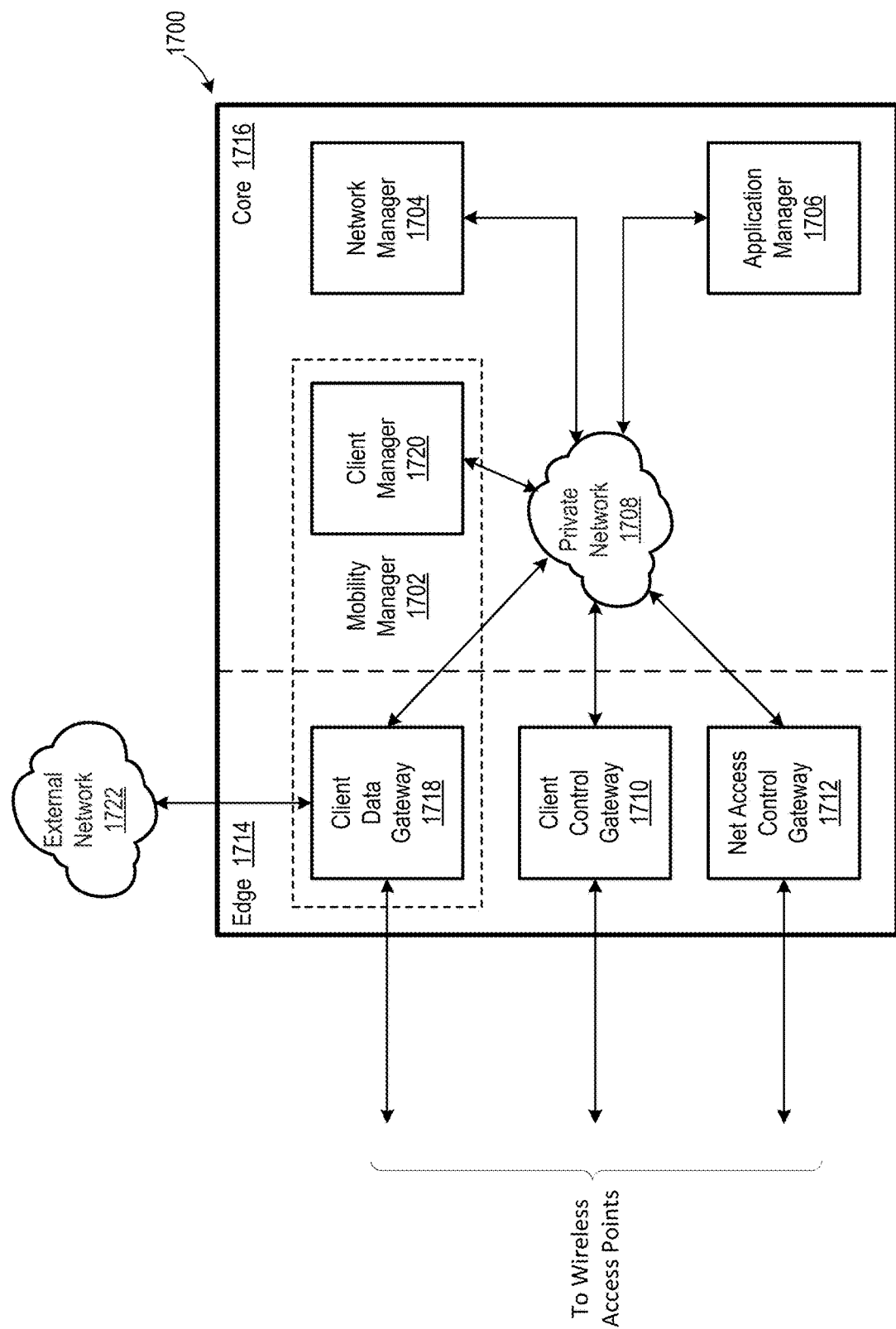
FIG. 17 is a block diagram of one embodiment of the communication network control system of FIG. 1.

FIG. 17 is a block diagram of a control system 1700, which is one possible embodiment of control system 102 of FIG. 1 without a distributed compute manager. It is understood, however, that control system 102 could be embodied in other manners without departing from scope hereof. Control system 1700 includes a mobility manager 1702, a network manager 1704, an application manager 1706, a private network 1708, a client control gateway 1710, and a net access control gateway 1712. Client control gateway 1710 and net access control gateway 1712 are part of an edge 1714 of control system 1700, and network manager 1704 and application manager 1706 are part of a core 1716 of control system 1700. Mobility manager 1702 logically spans edge 1714 and core 1716, and while private network 1708 is depicted as being part of core 1716 for illustrative simplicity, private network 1708 also logically spans both edge 1714 and core 1716.

Edge 1714 and core 1716 are logical portions of control system 1700, and edge 1714 and core 1716 accordingly need not be physically separated. Although the various elements of control system 1700 are shown as being discrete elements, two or more of these elements could be combined. The elements of control system 1700 need not be in a common physical location. For example, edge 1714 could be physically located near end users, while core 1716 is physically located in a central data center. In some embodiments, one or more elements of control system 1700 are implemented by a processing subsystem executing instructions in the form of software and/or hardware, such as by a processing subsystem of one or more computer servers. In certain embodiments, one or more elements of control system 1700 are implemented by a distributed computing system, e.g. by a cloud computing system. Control system 1700 could include additional elements without departing from the scope hereof. For example, some alternate embodiments of control system 1700 further include a distributed compute manager.

Mobility manager 1702 is an embodiment of mobility manager 136 of FIG. 1, and mobility manager 1702 includes a client data gateway 1718 and a client manager 1720, which are part of edge 1714 and core 1716, respectively. Client data gateway 1718 is a gateway between IT devices, e.g. IT devices 104 and 106, and an external network 1722. External network 1722 includes, for example, the Internet, and in some embodiments external network 1722 includes application servers such as application servers 124 and 125. All data packets transferred between an IT device and control system 1700 flow between a control client of the IT device, e.g. control client 1504 or 1604, and client data gateway 1718. In some embodiments, client data gateway 1718 is configured to perform one or more of the following functions: (a) anchor data tunnels between IT devices and control system 1700, (b) send downlink data to IT devices according to steering policies, (c) serve as a proxy for uplink data packets between IT devices and external network 1722, and (d) serve as a proxy for authorization requests from IT devices to client manager 1720.

In certain embodiments, client data gateway 1718 is configured to estimate downlink throughput by determining round-trip-time of data packets sent to a control client (e.g. 1504 or 1604) of an IT device, which the control client loops back to client data gateway 1718. Client data gateway 1718 provides performance characteristics, such as downlink throughput, to network manager 1704. Client data gateway 1718 is optionally configured to estimate downlink throughput only when requested by the control client, to prevent such estimates from interfering with the control client's operation.

Figure 18:
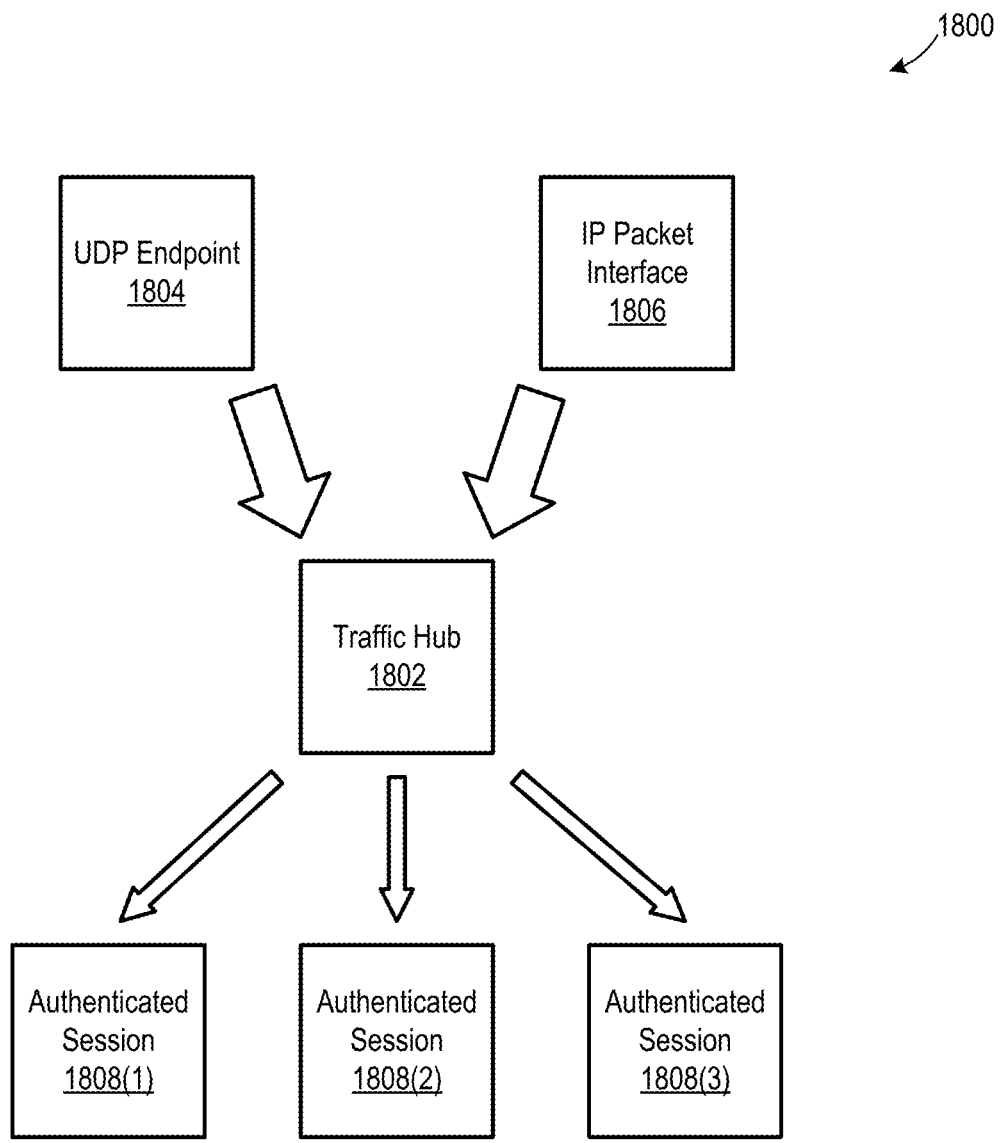
FIG. 18 illustrates a logical structure of some embodiments of the FIG. 17 communication network control system.

Some embodiments of client data gateway 1718 are configured to implement a logical structure 1800, as illustrated in FIG. 18, which includes a traffic hub object 1802, a UDP endpoint object 1804, an IP packet interface object 1806, and authenticated session objects 1808. While FIG. 18 illustrates three authenticated session objects 1808, the number of authenticated session objects 1808 will vary with number of active application clients on IT devices.

Traffic hub object 1802 manages all inbound data (uplink and downlink) routed through client data gateway 1718 by routing the data to appropriate authenticated sessions 1808. UDP endpoint object 1804 is a threaded wrapper around a Java UDP socket. UDP endpoint object 1804 includes a blocking thread which pumps received UDP packets to a subscriber, as well as a public function for transmitting UDP messages out. IP packet interface object 1806 is a threaded wrapper around a Linux TUN device. A JNI wrapper class is used to bring the Linux TUN device functionality into the Java world. IP packet interface object 1806 includes a blocking thread which pumps received IP packets to a subscriber, as well as a public function for transmitting IP packets out.

Figure 19:
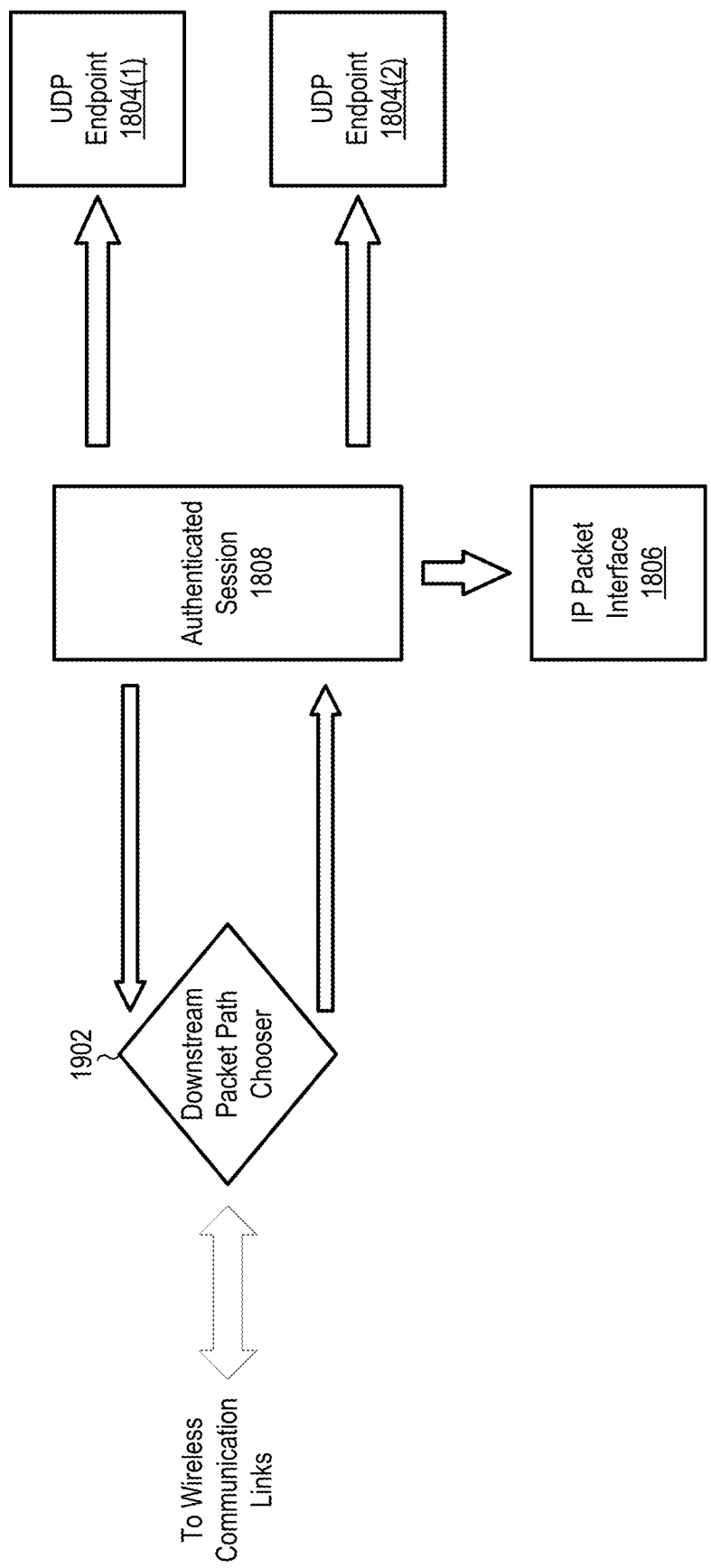
FIG. 19 is a block diagram illustrating one example of operation of an authenticated session object instance of FIG. 18.

Each authenticated session 1808 represents a single application client's authenticated session. The authenticated session 1808 "owns" all resources related to the session, such as associated UDP endpoint objects 1804, IP addresses and ports for each UDP channel/path to an IT device, as well as the IP Packet Interface object 1806 and associated IP addresses for the IT device to use on the network. FIG. 19 is a block diagram illustrating one example of operation of an authenticated session object 1808 instance. The authenticated session object 1808 of FIG. 19 has an updateable reference to a downstream packet path chooser object 1902 instance, which enables packet switching logic to be highly customizable and seamlessly hot swapped during live operation. For example, if a wireless communication link being used by the session becomes unavailable, downstream packet path chooser object 1902 can select a different wireless communication link, thereby minimizing or even eliminating disruption to the authenticated session.

Referring again to FIG. 17, client manager 1720 is configured to maintain respective session information for each IT device, e.g. session information for IT device 104 and session information for IT device 106. In some alternate embodiments, client manager 1720 is configured to maintain respective session information for each connected client, e.g. respective session information for each of application clients 214, 215, and 216. Client manager 1720 is also configured to authenticate clients for access to a communication network including control system 1700.

Network manager 1704 is an embodiment of network manager 138 of FIG. 1. Network manager 1704 is responsible for determining status and performance of networks connected to a client's interfaces. In some embodiments, network manager 1704 is configured to gathers statistics from control clients on IT devices, such as control clients 1504 and 1604 of FIGS. 15 and 16, respectively. Network manager 1704 is optionally further configured to receive statistics from one or more of wireless core networks, such as wireless core networks 116 and 118 of FIG. 1, and wireless access points, such as wireless access points 108-114 of FIG. 1. In some embodiments, network manager 1704 is configured to run an optimization algorithm over the received statistics to determine the performance of a wireless access point, where performance can include throughput rate, latency, jitter, and/or packet loss. Application manager 1706 is optionally configured to use this information in determining per dataflow steering policies. Additionally, when an IT device control client is part of an OS, such as in the case of control client 1604 of FIG. 16, the OS can be configured to use this information to help choose to which wireless access point to connect to, for example. Furthermore, in some embodiments, a cellular core controller, e.g. core controllers 116 and 118 of FIG. 1, can use this information from network manager 1704 to influence handover of an IT device between wireless access points. For example, in embodiments where a cellular core controller includes a Mobility Management Entity (MME) and the cellular core controller controls wireless access points in the form of Evolved Node Bs (eNBs), the MME can use the information from network manager 1704 to influence handovers between eNBs.

In some embodiments, network manager 1704 has knowledge of one or more settings for wireless access points, such as how frequently a given wireless access point sends performance information to network manager 1704, and/or what is included in the performance information. Additionally, network manager 1704 is optionally configured to push new settings to wireless access points, such as to change frequency and/or content of performance information sent from wireless access points to network manager 1704.

Application manager 1706 is an embodiment of application manager 140 of FIG. 1. In certain embodiments, application manager 1706 is configured to use pre-provisioned steering policies along with data from network manager 1704 to determine what steering policy to send back to a control client on an IT device, e.g. control clients 1504 and 1604, when the control client connects to control system 1700. Application manager 1706 is configured, for example, to send a provisioned steering policy to a connecting control client. In some embodiments, there are a plurality of provisioned policies that vary by network condition. For example, a default steering policy for an application may be to load balance across Wi-Fi and cellular wireless communication links with 80% of data being transmitted over a Wi-Fi wireless communication link, with the remaining 20% of data being transmitted over a cellular wireless communication link. However, a current Wi-Fi wireless access point to which the applicable IT device is connected may be nearly out of capacity. Therefore, application manager 1706 may alter the steering policy, such as to transmit 80% of data over the cellular wireless communication link and 20% of data over the Wi-Fi wireless communication link.

Client control gateway 1710 is a gateway for control messages between IT devices, e.g. IT devices 104 and 106, and other elements of control system 1700. In some embodiments, client control gateway 1710 is configured to perform one or more of the following functions: (a) serve as a proxy for REpresentational State Transfer (REST) calls between IT devices and client manager 1720, (b) serve as a proxy for steering policy REST calls between IT devices and application manager 1706, and (c) serve as a proxy for network performance metrics calls between IT devices and network manager 1704.

Net access control gateway 1712 is a gateway for control messages between wireless access points and network manager 1704. For example, in some embodiments, net access control gateway 1712 is configured to serve as a proxy from configuration REST calls between a wireless access point and network manager 1704.

Private network 1708 communicatively couples the elements of control system 1700. In some embodiments, private network 1708 includes physical interconnections (e.g. in the form of electrical or optical cables, or in the form of radio or optical transceivers) and/or virtual interconnections (e.g. in the form of an API that allows for communication among elements of control system 1700).

Tables 4-7 below list examples of message flows associated with control system 1700. However, control system 1700 could be configured to support alternative and/or additional message flows without departing from the scope hereof.

TABLE 4

Control Client (e.g. 1504 or 1604) Startup

The control client sends a connect request to client control gateway 1710
Client control gateway 1710 forwards the request to client manager 1720
Client manager 1720 returns a connect response to client control gateway 1710, containing:
    Tunnel information
    Interval for sending performance metrics
    Default steering policies
Client control gateway 1710 forwards the response to the control client
The control client sends a UDP Link Auth request to client data gateway 1718
Client data gateway 1718 forwards the request to client manager 1720
Client manager 1720 returns a UDP Link Auth request to client data gateway 1718
Client data gateway 1718 forwards the response to the control client
Client data gateway 1718 requests a steering policy from application manager 1706
Application manager 1706 returns a steering policy to client data gateway 1718

TABLE 5

Steering Policy Retrieval

The control client (e.g. 1504 or 1604) sends a steering policy request to client control gateway 1710 with client information, such as the following:
    Connected Wi-Fi wireless access point ID
    Connected cellular wireless access point ID
Client control gateway 1710 sends the steering policy request to application manager 1706
Application manager 1706 returns a steering policy to client control gateway 1710, and client data gateway 1718 stores the steering policy for applying to data packets returning to the control client. The steering policy includes, for example, some or all of the following, for downlink data:
    Steering policy rules, e.g. matching data packet identity with handling instructions for the data packet
    Steering policy identification, e.g. Active-Standby
    Steering policy thresholds, e.g. performance metric thresholds which cause a change in allocation of data among wireless communication links
Client data gateway 1718 sends the steering policy response to the control client on the IT device. The control client applies the steering policy to data flows started by an application client (e.g. 214). The steering policy includes, for example, some or all of the following, for uplink data:
    Steering policy rules
    Steering policy identification
    Steering policy thresholds
    Interval for sending performance metrics to network manager 1704

TABLE 6

Control client performance metrics

The control client (e.g. 1504 or 1604) sends performance metrics to client control gateway 1710. The performance metrics may include one or more of the following:
    IT device ID
    Wi-Fi wireless access point ID (Basic Service Set Identifier - BSSID) for both a connected Wi-Fi wireless access point and other Wi-Fi wireless access points in range, including:
        Service Set Identifier (SSID)
        Capabilities
        Center frequency 0
        Center frequency 1
        Channel width
        Frequency TABLE 6-continued Control client performance metrics Level
Operator friendly name
Timestamp
Venue name
Cellular wireless access point ID for both a connected cellular wireless access point and other cellular wireless access points in range
   Roaming flag
   Whether registered
   Public Land Mobile Network (PLMN)
   Mobile Country Code (MCC)
   Mobile Network Code (MNC)
   Tracking area code (TAC)
   Physical cell identity (PCI)
   eNB
   Reference Signal Received Power (RSRP)
   Reference Signal Received Quality (RSRQ)
   Arbitrary strength unit (ASU) level
   Reference Signal to Noise Ratio (RSSNR)
   dBm
   Channel Quality Indicator (CQI)
Client control gateway 1710 forwards performance metrics to network manager 1704

TABLE 7

Network Statistics

Figure 20:
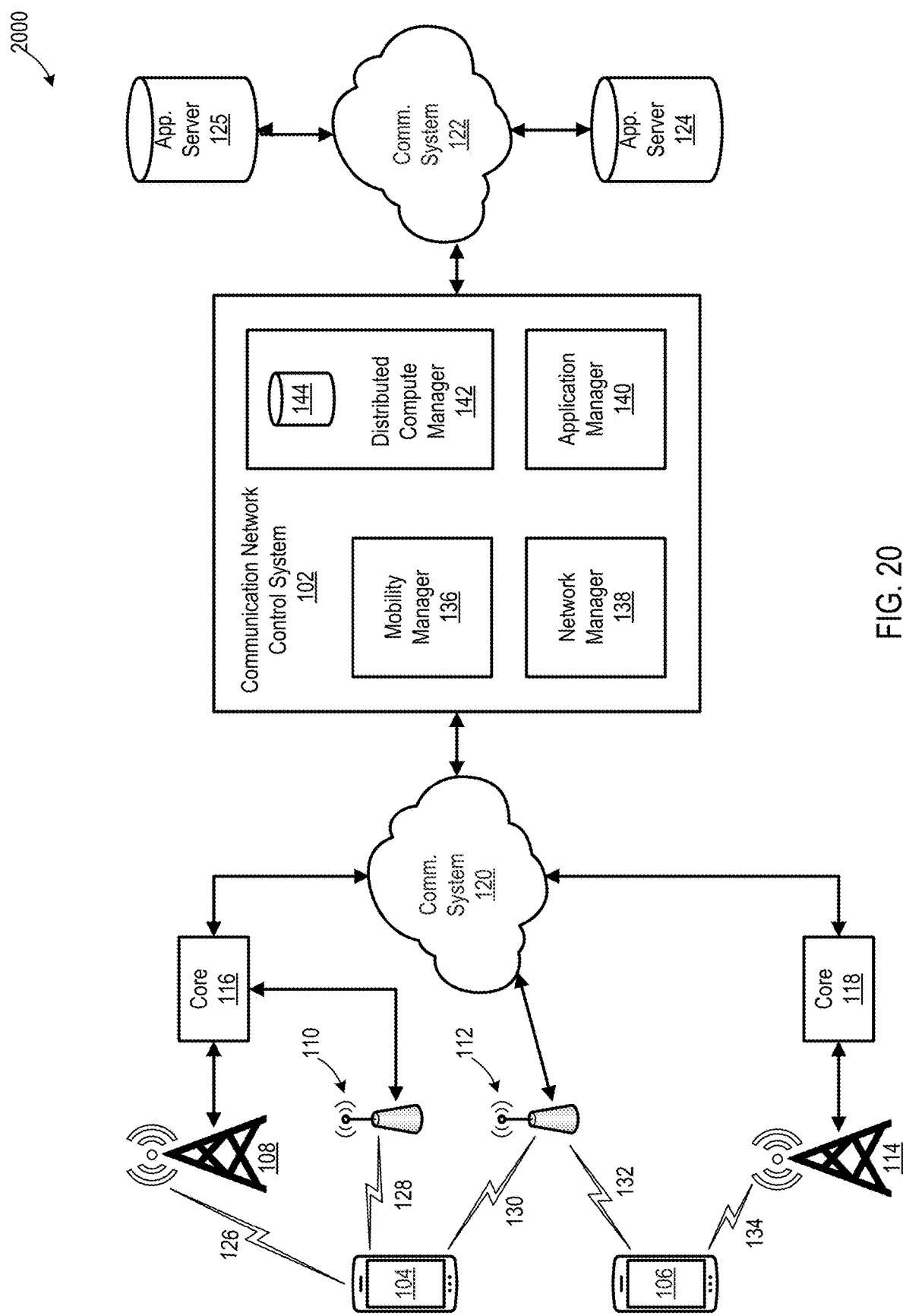
FIG. 20 is a block diagram of an alternate embodiment of the FIG. 1 communication network where a non-cellular wireless access point is communicatively coupled to a core controller.

A Wi-Fi wireless access point may push one or more of the following statistics to network manager 1704:
   Total Wi-Fi bandwidth
   Available Wi-Fi bandwidth
   Number of connected endpoints
   Total backhaul bandwidth
   Available backhaul bandwidth
A cellular wireless access point may push one or more of the following statistics to network manager 1704:
   Total cellular bandwidth
   Available cellular bandwidth
   Number of connected endpoints
   Total backhaul bandwidth
   Available backhaul bandwidth Referring again to FIG. 1, in some alternate embodiments, one or more of wireless access points 110 and 112 are communicatively coupled to control system 102 via communication system 120 and one or more of core controllers 116 and 118. For example, FIG. 20 is a block diagram of a communication network 2000, which is an alternate embodiment of communication network 100 where wireless access point 110 is communicatively coupled to control system 102 via communication system 120 and core controller 116. In particular embodiments, core controller 116 at least partially complies with cellular standards, such as $3^{rd}$ Generation Partnership Project (3GPP) standards, and wireless access point 110 is supported by one or more or more modules (not shown) of core controller 116 configured to interface core controller 116 with devices that do not comply with the cellular standards.

Figure 21:
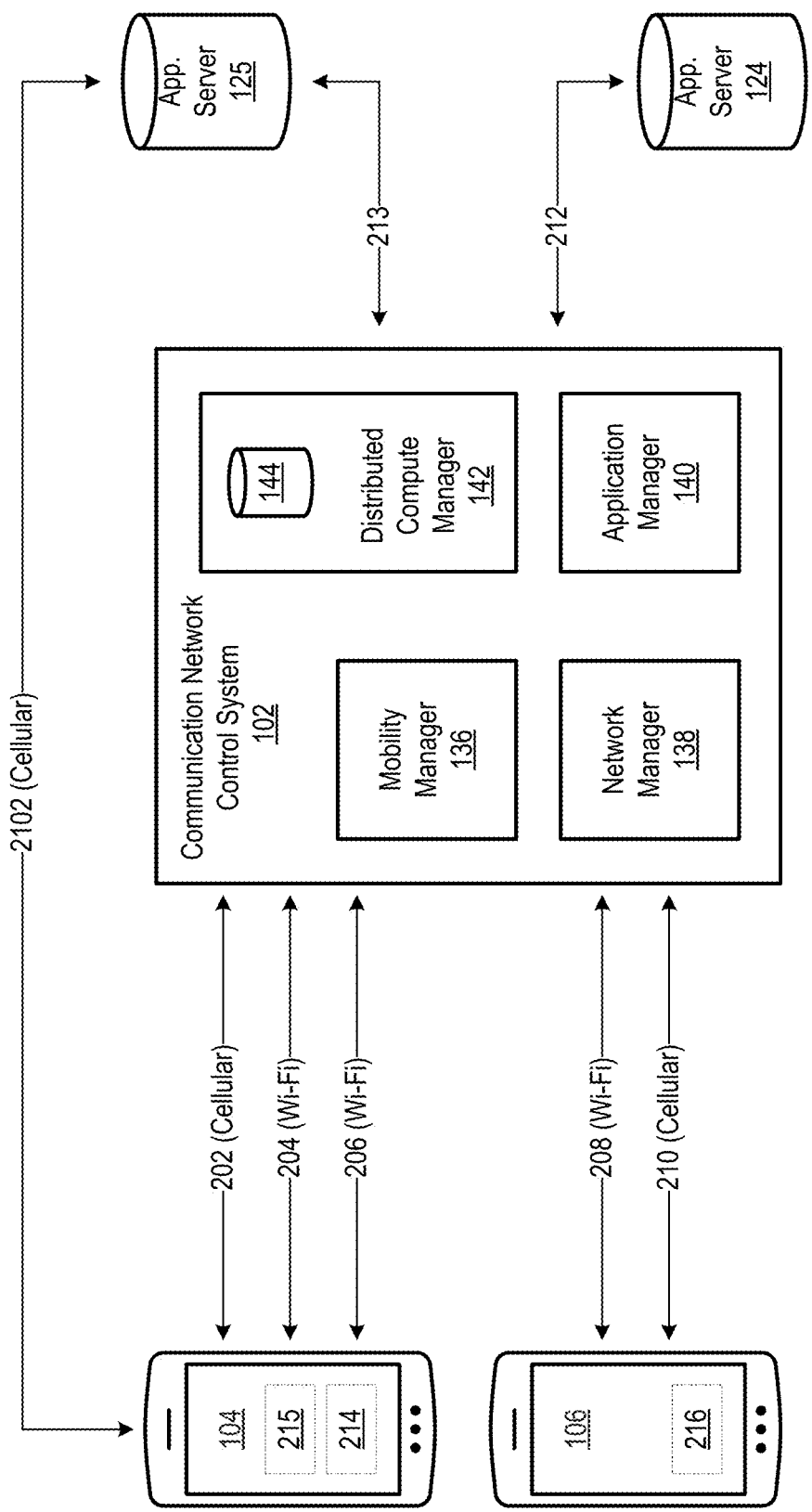
FIG. 21 is a block diagram illustrating one example of logical communication links in an embodiment of the FIG. 1 communication network supporting local breakout.

As discussed above with respect to FIGS. 1 and 2, mobility manager 136 is configured to relay data between IT devices and external resources. However, some embodiments of control system 102 are further configured to support local breakout sessions where data at least partially bypasses control system 102 and instead directly flows between an application client and an application server. For example, FIG. 21 is a block diagram of one example of logical communication links in an embodiment of communication network 100 supporting local breakout sessions. The FIG. 21 example is like the FIG. 2 example, but FIG. 21 further depicts a local breakout session between IT device 104 an application server 125 via a logical local breakout communication link 2102 directly between IT device 104 and application server 125. Local breakout communication link 2102 is implemented by wireless access point 108, core controller 116, and communication systems 120 and 122 (shown in FIG. 1). In this example, at least some data flowing between IT device 104 and application server 125 flows via local breakout communication link 2102 and thereby bypasses control system 102. Local breakout reduces load on control system 102, and local breakout may reduce data transfer latency. However, control system 102 cannot manage data and applications handled by a local breakout session.

In some embodiments, an IT device control client (e.g., control client 1504 or 1604) and/or control system 102 determines whether to route data via control system 102 or via a local breakout session, such as based on type of data being transferred, identity or type of application client participating in data exchange, identity or type of application server participating in data exchange, operating conditions of control system 102 (e.g., current load on control system 102), communication link performance, current communication link utilization, current communication link spare capacity, user preference, operator preference, etc. For example, control clients 1504 and 1604 could be configured to route high priority data, such as a voice or video data, via control system 102, while routing low priority data, such as web browsing data or file transfer data, via a local breakout session. As another example, control clients 1504 and 1604 could be configured to (a) route all data via control system 102 when load on control system 102 does not exceed a threshold value, and (b) route some data, such as low priority data, via a local breakout session when load on control system 102 exceeds the threshold value.

Figure 22:
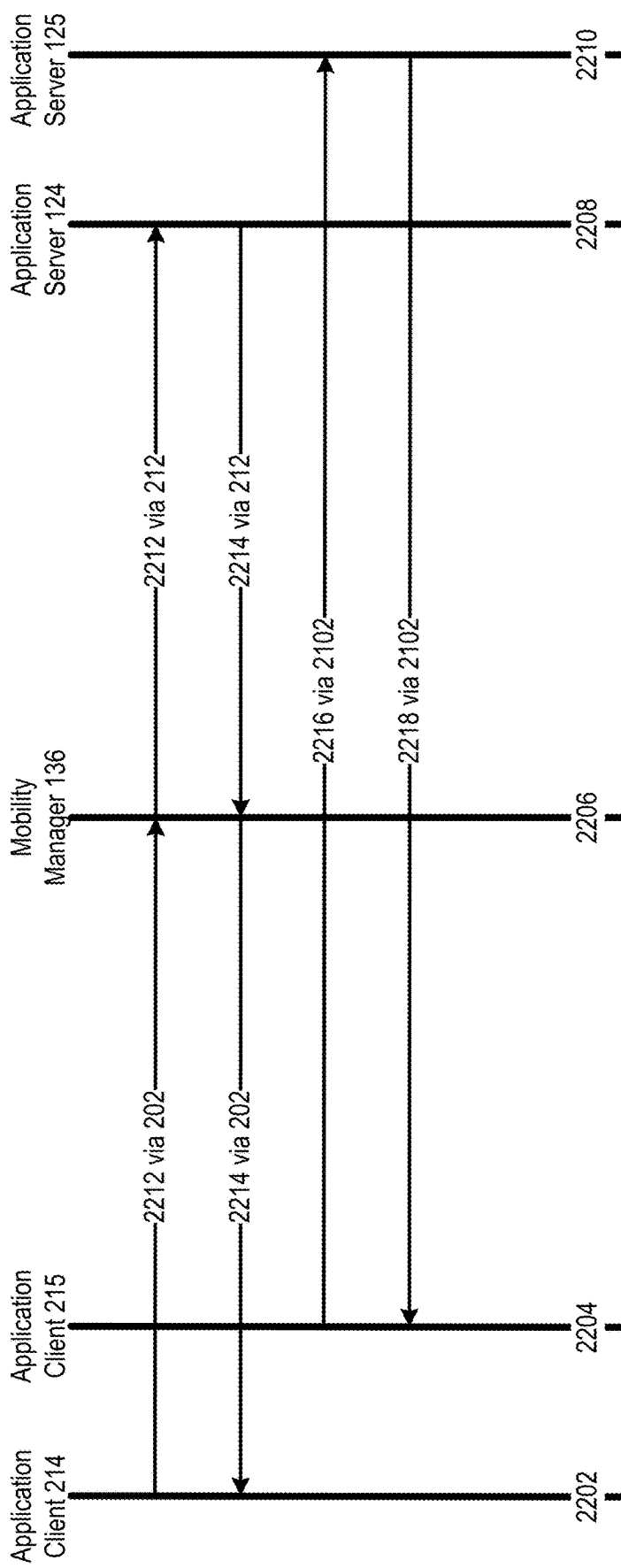
FIG. 22 is a dataflow diagram illustrating one example of operation of an embodiment of the FIG. 1 communication network configured to determine whether to route data via a control system or via a local breakout session on an application basis.

FIG. 22 is a dataflow diagram illustrating one example of an embodiment of communication network 100 configured to determine, on an application basis, whether to route data via control system 102 or via a local breakout section. The FIG. 22 diagram includes vertical lines 2202, 2204, 2206, 2208, and 2210, which logically correspond to application client 214, application client 215, mobility manager 136, application server 124, and application server 125, respectively. Application client 214 sends uplink data 2212 to mobility manager 136 via cellular wireless communication link 202, and mobility manager 136, in turn, sends the received uplink data 2212 to application server 124 via communication link 212. Mobility manager 136 also receives downlink data 2214 from application server 124 via communication link 212, and mobility manager 136 sends received downlink data 2214 to application client 214 via cellular wireless communication link 202.

Application client 215, in contrast, communicates directly with application server 125 via a local breakout session, in the FIG. 22 example. Specifically, application client 215 sends uplink data 2216 to application server 125 via local breakout communication link 2102, and application server 125 sends downlink data 2218 to application client 215 via local breakout communication link 2102.

Referring again to FIGS. 1 and 2, some embodiments of communication network 100 are further configured to at least partially control communication link establishment. For example, some embodiments of communication network 100 are configured to at least partially control establishment of one or more of communication links 202-210, such as based on predetermined rules. For instance, assume that IT device 104 moves within range of wireless access point 112. Control system 102 and/or control client 1504 or 1604 could be configured to determine whether to enable communication link 206 to be established based on one or more criteria, such as whether data transfer between IT device 104 and control system 102 is above a minimum threshold value justifying establishing another communication link, whether communication link 206 has previously exhibited acceptable performance, whether spare capacity of communication link 206 exceeds a threshold value, whether communication link 206 is secure, etc. Additionally, some embodiments of communication network 100 are further configured to at least partially control communication link termination. For example, particular embodiments of communication network 100 are configured to at least partially control termination of one or more of communication links 202-210, such as based on predetermined rules. For example, control system 102 and/or control client 1504 or 1604 could be configured to determine to terminate communication link 206 based on one or more criteria, such as performance of the communication link falling below a threshold value.

Figure 23:
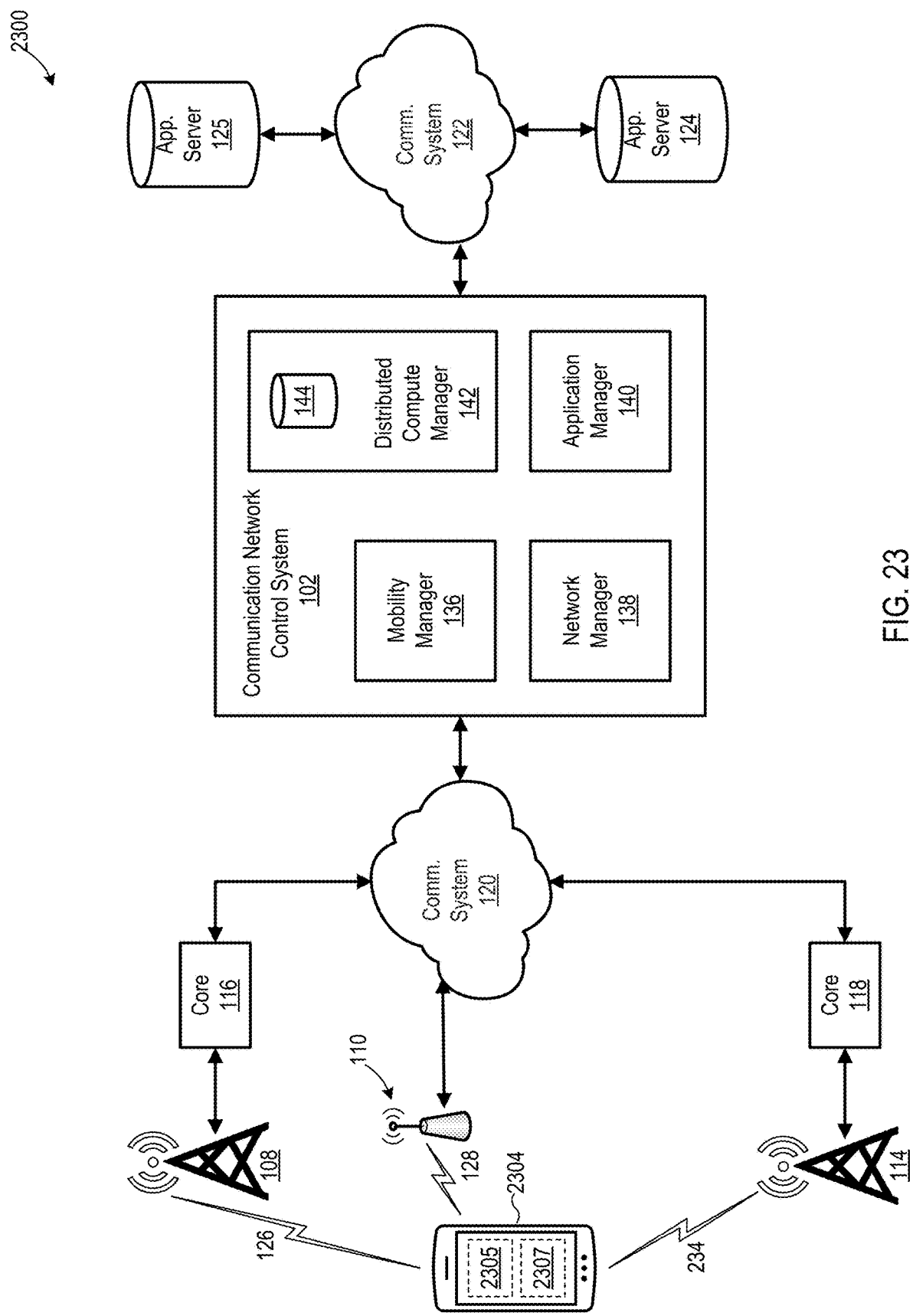
FIG. 23 is a block diagram of an alternate embodiment of the FIG. 1 communication network including an IT device with dual subscriber identity module cards.

FIG. 23 is a block diagram of a communication network 2300, which is an alternate embodiment of communication network 100 of FIG. 1 where IT device 104 is replaced with an IT device 2304. Wireless access point 112 and IT device 106 are not shown in FIG. 23 for illustrative clarity. IT device 2304 is a "dual SIM" IT device, and IT device 2304 accordingly includes two subscriber identity module (SIM) cards 2305 and 2307. Each SIM card 2305 and 2307 is associated with a different respective cellular wireless account. For example, SIM card 2305 could be associated with a personal cellular wireless account and SIM card 2307 could be associated with a business cellular wireless account. As another example, SIM card 2305 could be associated with a cellular wireless account at a first cellular network operator and SIM card 2307 could be associated with a cellular wireless account at a second cellular network operator. As yet another example, SIM card 2305 could be associated with a cellular wireless account at a cellular network operating in licensed radio frequency (RF) spectrum, and SIM card 2307 could be associated with a cellular wireless account at a cellular network operating in unlicensed RF spectrum (e.g., CBRS RF spectrum or Wi-Fi RF spectrum). In the FIG. 23 example, SIM card 2305 is associated with a cellular network including wireless access point 108, and SIM card 2307 is associated with a cellular network including wireless access point 114. These two cellular networks could be owned by either different respective cellular network operators or by a common cellular network operator. FIG. 23 depicts IT device 2304 being in range of each of wireless access points 108, 110, and 114, and IT device 2304 can therefore connect to these wireless access points via wireless communication signals 126, 128, and 234, respectively.

Figure 24:
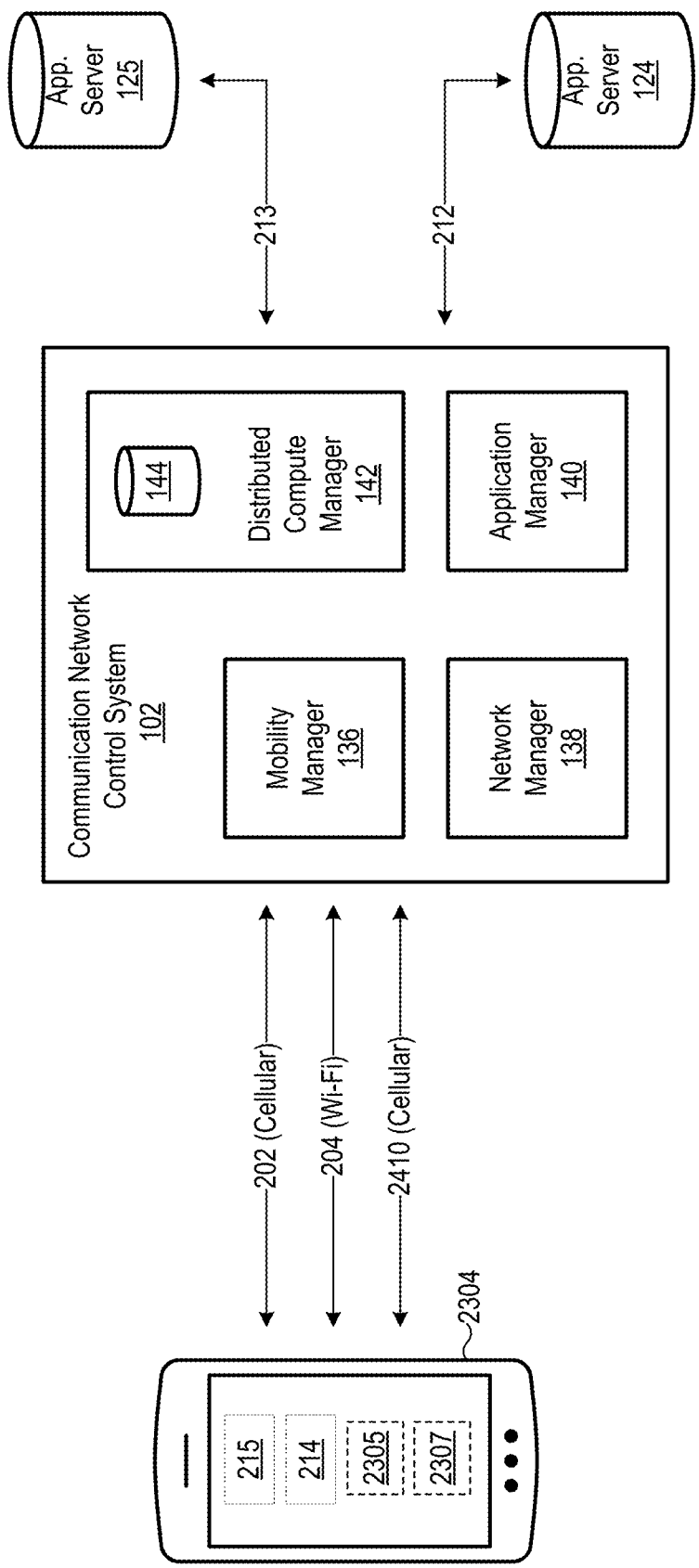
FIG. 24 is a block diagram illustrating one example of logical communication links in the FIG. 23 communication network.

FIG. 24 is a block diagram illustrating one example of logical communication links in communication network 2300 of FIG. 23. FIG. 24 depicts wireless communication link 202, wireless communication link 204, communication link 212, and communication link 213, as discussed above with respect to FIG. 2. FIG. 24 additionally depicts a wireless communication link 2410, where wireless communication 2410 is a cellular wireless communication link implemented by wireless access point 114, core controller 118, and communication system 120. FIG. 24 illustrates application clients 214 and 215 being installed on IT device 2304. IT device 2304 and control system 102 are collectively configured to steer and/or split data between communication links 202, 204, and 2410 in a manner similar to that discussed above with respect to control system 102 and IT devices 104 and 106. Although FIG. 24 depicts cellular wireless communication links 202 and 2410 being simultaneously available to IT device 2304, some alternate embodiments of IT device 2304 are configured to support only one of cellular wireless communication links 202 and 2410 at a given time.

Figure 25:
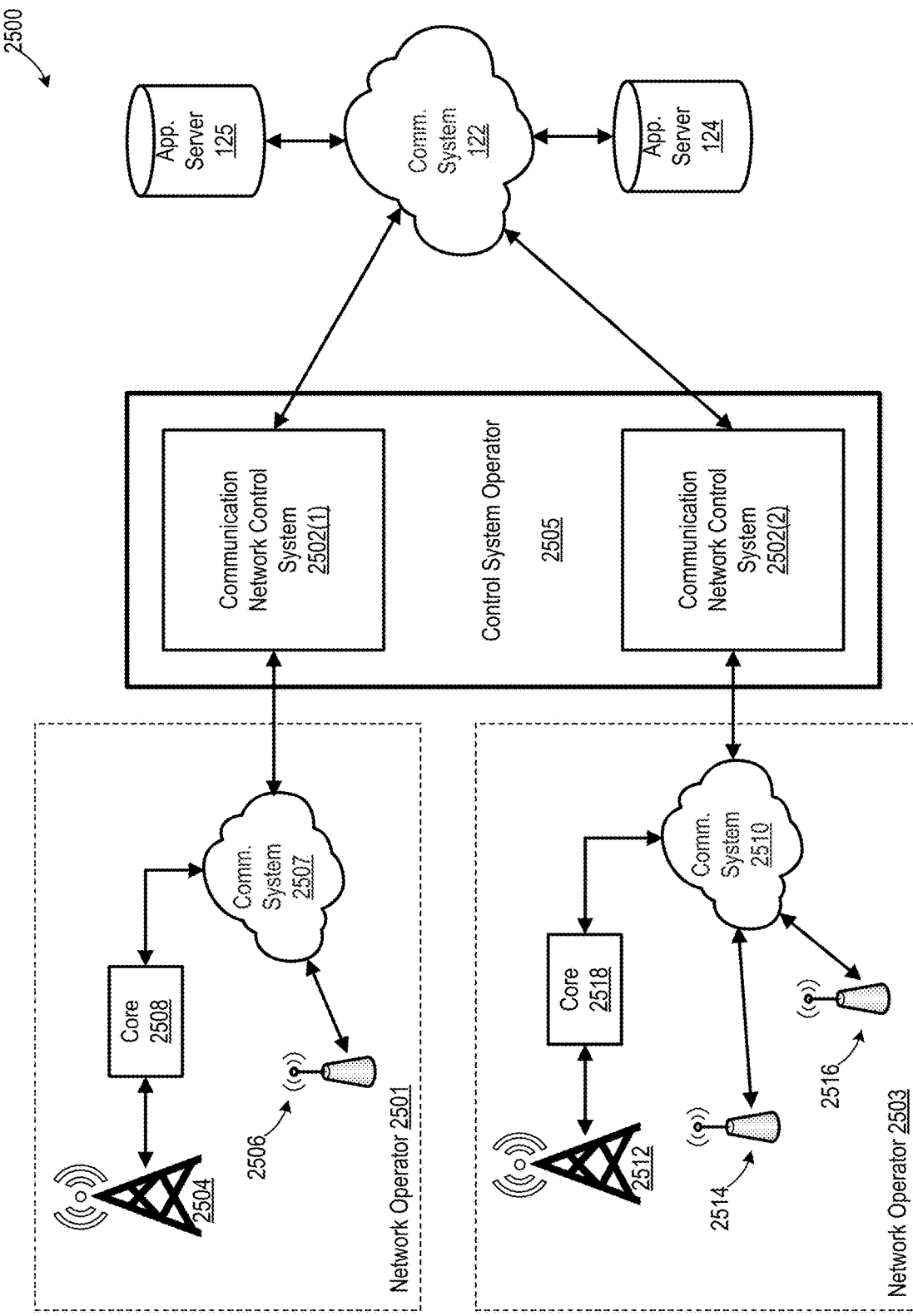
FIG. 25 is a block diagram of an alternate embodiment of the FIG. 1 communication network where a third party provides control system functions to two different network operators.

The functions of control system 102 could be provided as a service to multiple network operators by a party other than the network operators. For example, FIG. 25 is a block diagram of a communication network 2500 which is an alternate embodiment of communication network 100 including (a) a portion operated by a network operator 2501, (b) a portion operated by a network operator 2503, (c) a portion operated by a control system operator 2505, (d) an instance of communication system 122, (e) an instance of application server 124, and (f) an instance of application server 125. The portion of communication network 2500 operated by network operator 2501 includes a communication system 2507, wireless access points 2504 and 2506, and a wireless core network 2508. The portion of communication network 2500 operated by network operator 2503 includes a communication system 2510, wireless access points 2512-2516, and a wireless core network 2518. Wireless access points 2504 and 2512 are cellular wireless access points analogous to wireless access points 108 and 114 of FIG. 1, and wireless access points 2506, 2514, and 2516 are Wi-Fi wireless access points analogous to wireless access points 110 and 112 of FIG. 1. Wireless core networks 2508 and 2518 are analogous to wireless core networks 116 and 118 of FIG. 1, respectively. Communication systems 2507 and 2510 are each analogous to communication system 120 of FIG. 1.

The portion of communication network 2500 operated by control system operator 2505 includes control systems 2502(1) and 2502(2), each of which is an embodiment of control system 102 of FIG. 1. Details of control systems 2502 are not shown in FIG. 25 for illustrative clarity. Although control systems 2502(1) and 2502(1) are logically separate, the two control systems are optionally at least partially implemented by common hardware. Control system operator 2505 provides control system 2502(1) to network operator 2501, and control system operator 2505 provides control system 2502(2) to network operator 2503. Accordingly, each of network operators 2501 and 2503 realizes the advantages of using a control system 2502 without having to maintain a control system 2502. Communication system 2507 communicatively couples wireless access point 2506 to control system 2502(1), and communication system 2507 communicatively couples wireless access point 2504 to control system 2502(1) via core controller 2508. Similarly, communication system 2510 communicatively couples wireless access points 2514 and 2516 to control system 2502(2), and communication system 2510 communicatively couples wireless access point 2512 to control system 2502(2) via core controller 2518. Control system operator 2505 could provide additional control system 2502 instances to network operators without departing from the scope hereof.

Figure 26:
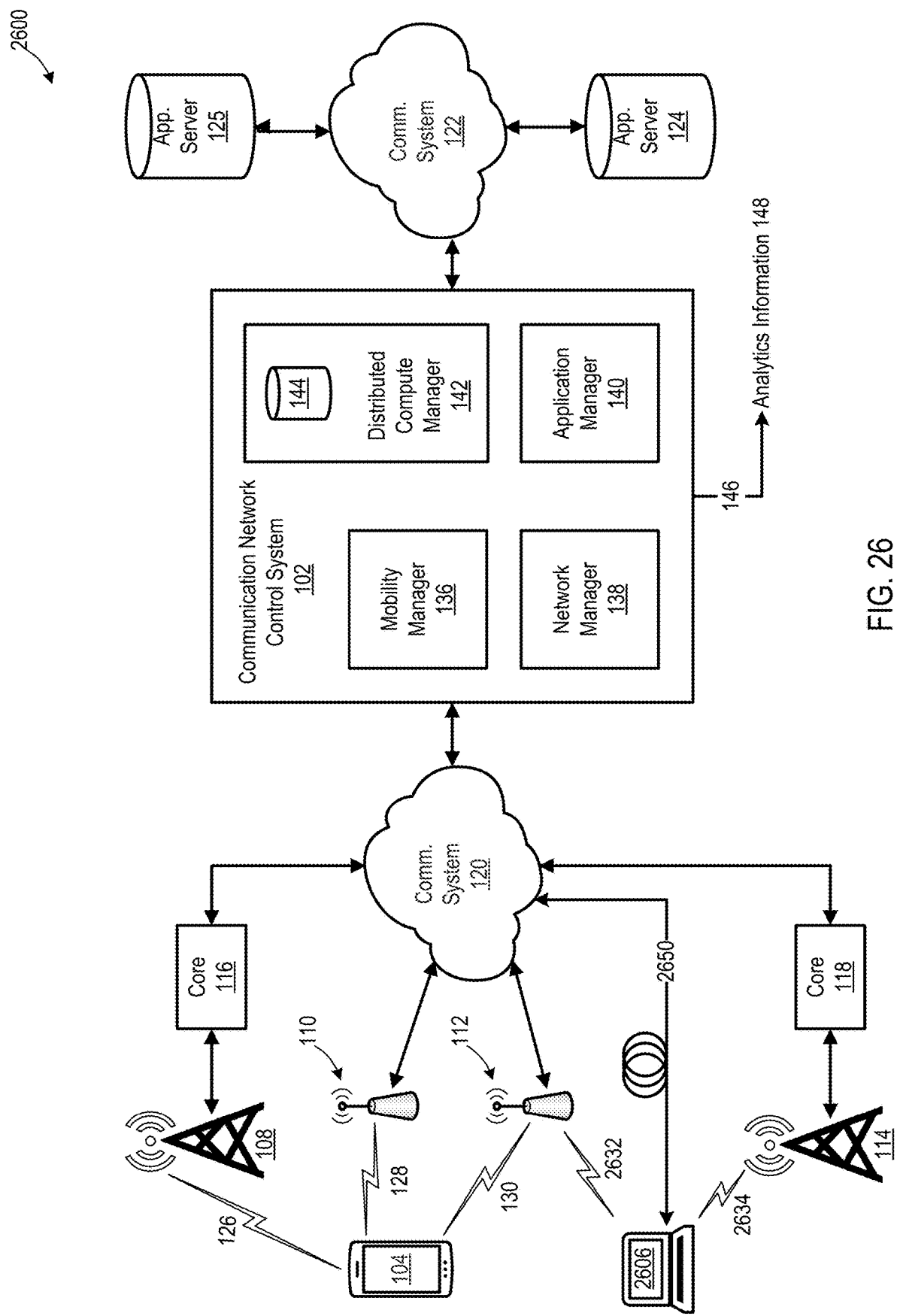
FIG. 26 is a block diagram of an alternate embodiment of the FIG. 1 communication network including a wireline communication medium.

The control systems disclosed herein could be configured to support one or more wireline communication links, in addition to, or in place of, wireless communication links. For example, FIG. 26 is a block diagram of a communication network 2600, which is an alternate embodiment of communication network 100 of FIG. 1 where IT device 106 is replaced with an IT device 2606. Although IT device 2606 is depicted as being a computer, IT device 2606 could take alternative forms without departing from the scope hereof. IT device 2606 is in range of wireless access points 112 and 114, and IT device 2606 includes wireless transceivers capable of communicating with each of wireless access points 112 and 114. Consequently, IT device 2606 can connect to wireless access points 112 and 114 via respective wireless communication signals 2632 and 2634.

Additionally, IT device is communicatively coupled to communication system 120 via a wireline communication medium 2650. Wireline communication medium 2650 includes, for example, an optical cable or an electrical cable (e.g., a coaxial electrical cable, an Ethernet electrical cable, a telephone electrical cable, or a power line electrical cable). Wireline communication medium 2650 may also include two or more wireline communication mediums of same or different types. For example, wireline communication medium 2650 may be a hybrid optical cable and electrical cable. In some embodiments, wireline communication medium 2650 may operate according to one or more of the following data transmission protocols: (a) an Ethernet electrical data transmission protocol, (b) a data over cable service interface specification (DOCSIS) data transmission protocol, (c) a digital subscriber line (DSL) data transmission protocol, (d) an Ethernet passive optical network (EPON) data transmission protocol, (e) a radio frequency over glass (RFOG) data transmission protocol, (f) an gigabit passive optical network (GPON) data transmission protocol, (g) a Multi-Media over Coax (MoCA) data transmission protocol, (h) a HomePNA (G.hn) data transmission protocol, and (i) any variations, improvements, and/or evolutions thereof.

Figure 27:
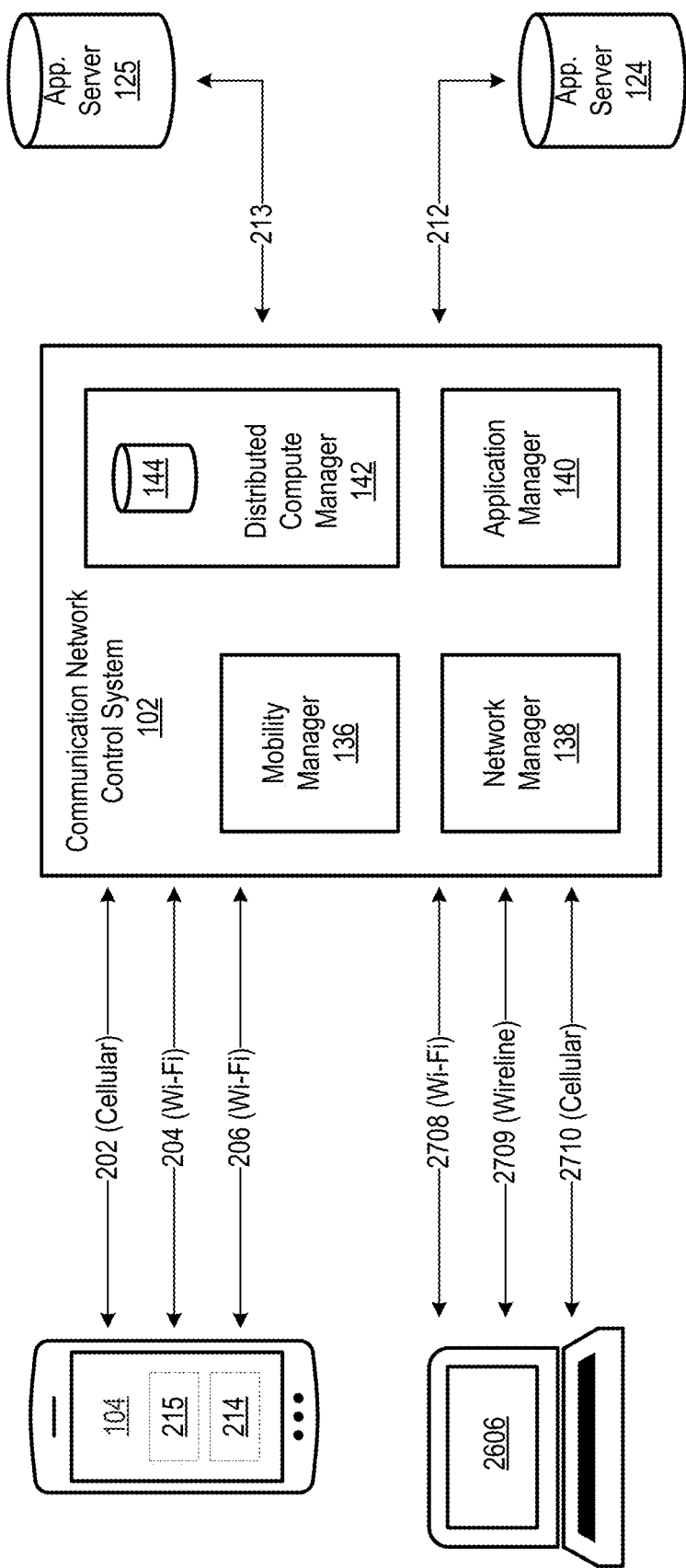
FIG. 27 is a block diagram illustrating one example of logical communication links in the FIG. 26 communication network.

FIG. 27 is a block diagram illustrating one example of logical communication links in communication network 2600. FIG. 27 depicts communication links 202, 204, and 206, 212, and 213, as discussed above with respect to FIG. 2. FIG. 27 additionally depicts communication links 2708, 2709, and 2710, each of which is a logical communication link between IT device 2606 and control system 102. Communication link 2708 is a Wi-Fi wireless communication link implemented by wireless access point 112 and communication system 120. Communication link 2709 is a wireline communication link implemented by wireline communication medium 2650. Communication link 2710 is a cellular wireless communication link implemented by wireless access point 114, core controller 118, and communication system 120. IT device 2606 and control system 102 are collectively configured to steer and/or split data between communication links 2708, 2709, and 2710 in a manner similar to that discussed above with respect to control system 102 and IT devices 104 and 106.

The control systems and control clients discussed above could be modified to manage additional communication links and/or alternative communication links. For example, a control client could be implemented in a gateway, such that the gateway and control system collectively manage multiple backhaul communication links to the gateway. As another example, a control client could be implemented in an IT device and a control system could be implemented in a gateway, such that the IT device client and the gateway collectively manage multiple communication links between the IT device and the gateway. Discussed below with respect to FIGS. 28-37 are examples of how control clients and control systems could be configured to manage additional communication links. It is understood, though, that the systems and methods for network control disclosed herein are not limited to the illustrated example configurations. To the contrary, the present systems and methods can be configured to manage essentially any group of parallel communication links.

Figure 28:
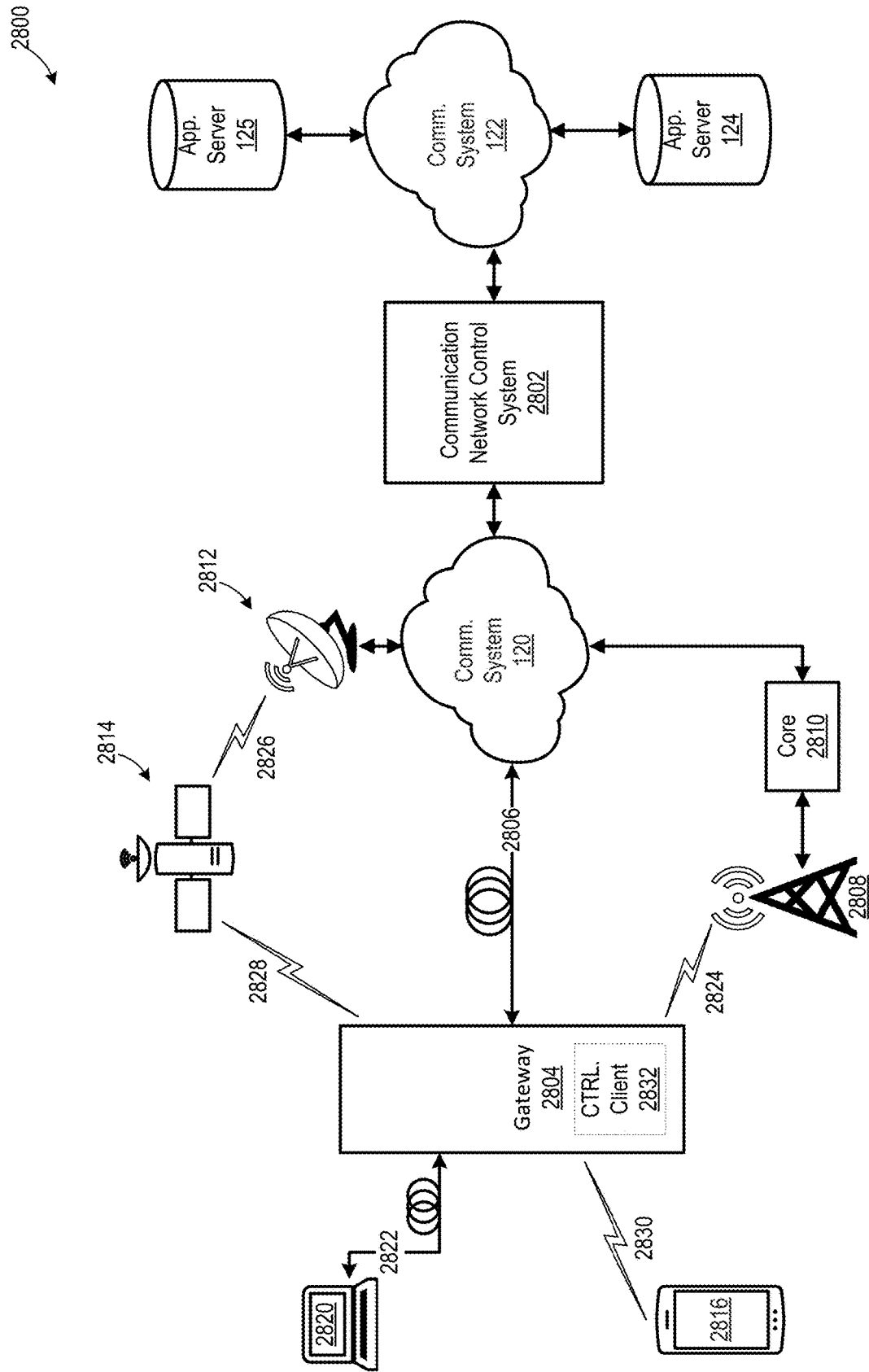
FIG. 28 is a block diagram of a communication network configured to split and/or steer data between multiple backhaul communication links, according to an embodiment.

FIG. 28 is a block diagram of a communication network 2800 including a control system 2802, a gateway 2804, a wireline communication medium 2806, a wireless access point 2808, a wireless core network 2810, a satellite ground station 2812, a satellite 2814, an IT device 2816, an IT device 2820, and a wireline communication medium 2822. Communication network 2800 additionally includes an instance of each of communication system 120, communication system 122, application server 124, and application server 125. Gateway 2804 has multiple parallel backhaul communication links to communication system 120. A first backhaul communication link between gateway 2804 and communication system 120 is embodied by wireline communication medium 2806 which is, for example, an optical cable or an electrical cable (e.g., a coaxial electrical cable, an Ethernet electrical cable, a telephone electrical cable, or a power line electrical cable). Wireline communication medium 2806 may also include two or more wireline communication mediums of same or different types. For example, wireline communication medium 2806 may be a hybrid optical cable and electrical cable. In some embodiments, wireline communication medium 2806 may operate according to one or more of the data transmission protocols discussed above with respect to wireline communication medium 2650 of FIG. 26.

A second backhaul communication link between gateway 2804 and communication system 120 is embodied by wireless access point 2808 and wireless core network 2810. Wireless access point 2808 is analogous to each of wireless access points 108 and 114 of FIG. 1, and wireless core network 2810 is analogous to each of wireless core networks 116 and 118 of FIG. 1. Gateway 2804 is configured to communicate with wireless access point 2808 via wireless communication signals 2824.

A third backhaul communication link between gateway 2804 and communication system 120 is embodied by satellite ground station 2812 and satellite 2814. Satellite 2814 is, for example, a low earth orbit (LEO) satellite, a medium each orbit (MEO) satellite, or a geostationary equatorial orbit (GEO) satellite. Satellite ground station 2812 is configured to communicate with satellite 2814 via wireless communication signals 2826, and gateway 2804 is configured to communicate with satellite 2814 via wireless communication signals 2828. Accordingly, satellite 2814 relays data between satellite ground station 2812 and gateway 2804.

The number, type, and configuration of parallel backhaul communication links between gateway 2804 and communication system 120 may vary without departing from the scope hereof. For example, in an alternate embodiment, the backhaul communication link embodied by satellite ground station 2812 and satellite 2814 is omitted. As another example, in another alternate embodiment, a second wireless access point (not shown) and a second wireless core network (not shown) embody a fourth backhaul communication link between gateway 2804 and communication system 120.

Gateway 2804 is configured to communicatively interface one or more IT devices, e.g., IT devices 2816 and 2820, with the backhaul communication links between gateway 2804 and communication system 120, such that the IT devices share the backhaul communication links. In some embodiments, gateway 2804 is configured perform network address translation and/or other functions to route data between the backhaul communication links and IT devices 2816 and

2820. Gateway 2804 may also be configured to perform additional functions. For example, gateway 2804 may be configured to assign IP addresses to IT devices 2816 and 2820.

IT device 2816 is communicatively coupled to gateway 2804 via a wireless communication link, e.g., a Wi-Fi wireless communication link, a cellular wireless communication link, or a Bluetooth wireless communication link, as symbolically shown by wireless communication signals 2830. IT device 2820 is communicatively coupled to gateway 2804 via wireline communication medium 2822, where wireline communication medium 2822 is analogous to wireline communication medium 2650 of FIG. 26. The number, type, and configuration of IT devices communicatively coupled to gateway 2804 may vary without departing from the scope hereof. Additionally, the number and type of communication links between each IT device and gateway 2804 may vary. For example, in an alternate embodiment, IT device 2816 is communicatively coupled to gateway 2804 via two wireless communication links (not shown), such as a Wi-Fi wireless communication link and a cellular wireless communication link.

Control system 2802 is an embodiment of control system 102 of FIG. 1, although details of control system 102 are not shown in FIG. 28 for illustrative clarity. For example, control system 2802 includes a mobility manager (not shown), a network manager (not shown), and an application manager (not shown), which are embodiments of mobility manger 136, network manager 138, and application manager 140, respectively. As another example, control system 2802 optionally includes an embodiment (not shown) of distributed computer manager 142. Gateway 2808 includes a control client 2832 which is analogous to control clients 1504 and 1604 of FIGS. 15 and 16, respectively.

Figure 29:
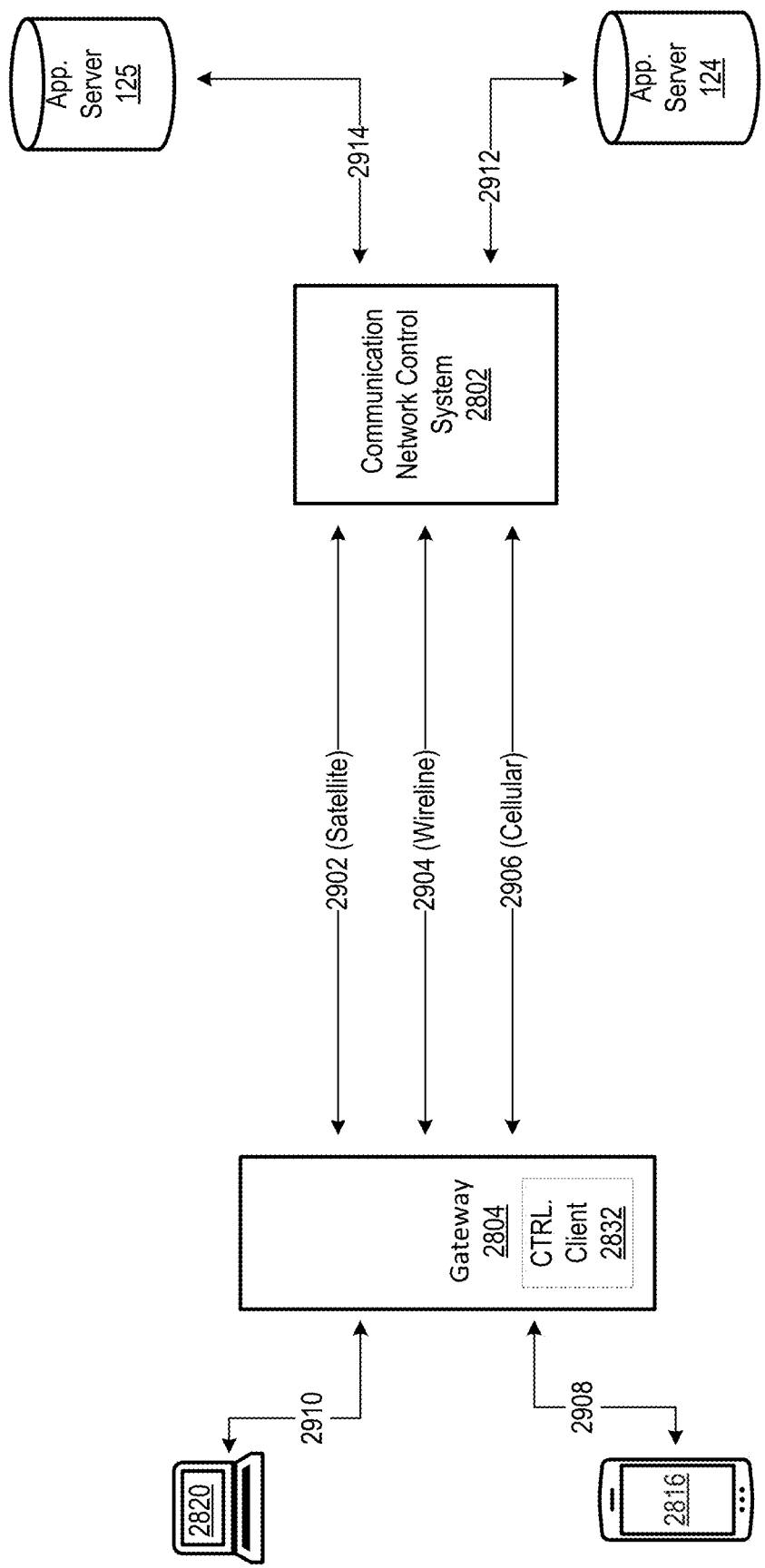
FIG. 29 is a block diagram illustrating one example of logical communication links in the FIG. 28 communication network.

FIG. 29 is a block diagram illustrating one example of logical communication links in communication network 2800. In the FIG. 29 example, three parallel backhaul communication links 2902, 2904, and 2906 are available to gateway 2804, and each of these backhaul communication links is a logical communication link between gateway 2804 and control system 2802. Backhaul communication link 2902 is a satellite wireless communication link implemented by satellite 2814, satellite ground station 2812, and communication system 120. Backhaul communication link 2904 is a wireline communication link implemented by wireline communication medium 2806. Backhaul communication link 2906 is a cellular wireless communication link implemented by wireless access point 2808, wireless core network 2810, and communication system 120. FIG. 29 also depicts logical communication links 2908, 2910, 2912, and 2914. Logical communication link 2908 is a wireless communication link between IT device 2816 and gateway 2804, and logical communication link 2910 is a wireline communication link between IT device 2820 and gateway 2804 which is implemented by wireline communication medium 2822. Communication system 122 implements a logical communication link 2912 between control system 2802 and application server 124, where logical communication link 2912 is analogous to logical communication link 212 of FIG. 2. Communication system 122 additionally implements a logical communication link 2914 between control system 2802 and application server 125, where logical communication link 2914 is analogous to logical communication link 213 of FIG. 2.

Gateway 2804 and control system 2802 are collectively configured to steer and/or split data between backhaul communication links 2902, 2904, and 2906 in a manner analogous to how IT devices 104 and 106 and control system 102 are collectively configured to steer and split data between communication links 202-210. For example, in some embodiments, control client 2832 is configured to implement a steering policy to split and steer uplink data among backhaul communication links 2906-2906, such as to implement one or more of the steering policies of Table 2 above. As another example, some embodiments of a mobility manager (not shown) of control system 2802 are configured to split and steer downlink data among backhaul communication links 2902-2906, such as to implement one or more of the steering policies of Table 2. Data steering and splitting among backhaul communication links 2902-2906 may vary according to data direction (i.e., uplink or downlink) and/or other factors, such type of data session, type or identity of IT device participating in data exchange, type or identity of application participating in data exchange, etc.

Additionally, some embodiments of control system 2802 are configured to support at least some features of a cellular core controller, e.g., an EPC core, a 5G core, an IMS core, and/or a 6G core, to enable non-cellular wireless access points (not shown) to provide wireless communication service that is comparable to that provided by a cellular wireless access point. Furthermore, in certain embodiments, a mobility manager (not shown) of control system 2802 is configured to serve as a proxy for an application client of gateway 2804, IT device 2816, or IT device 2802, in a manger similar to that discussed above with respect to mobility manager 136. Moreover, in particular embodiments, a network manager (not shown) of control system 2802 is configured to operate in a manner analogous to network manager 138, such as by collecting network and/or application performance metrics, as well as by determining that a steering policy should change. Additionally, in some embodiments of control system 2802, an application manager (not shown) performs functions similar to application manager 140. For example, some embodiments of the application manager of control system 2802 are configured to obtain application resource requirements and/or provide steering policies. Control system 2802 optionally further includes a distribute compute manager (not shown) analogous to distributed compute manager 142, and control system 2802 optionally additionally includes an analytics interface similar to analytics interface 146.

Figure 30:
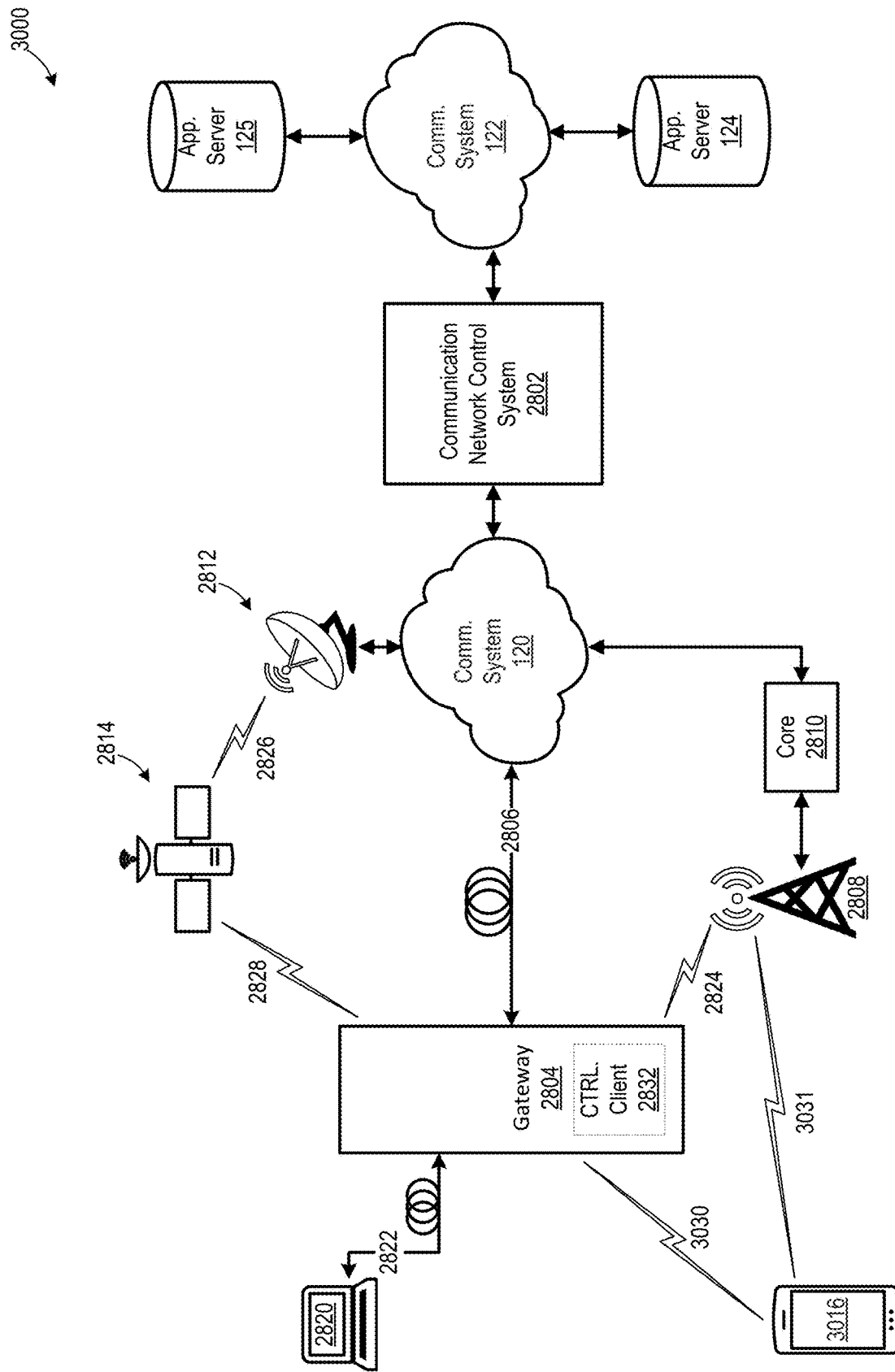
FIG. 30 is a block diagram of an alternate embodiment of the FIG. 28 communication network configured to implement two levels of communication link management.

FIG. 30 is a block diagram of a communication network 3000, which is an alternate embodiment of communication network 2800 of FIG. 28 where IT device 2816 is replaced with an IT device 3016. IT device 3016 is configured to communicate with gateway 2804 via a wireless communication link, e.g., Wi-Fi wireless communication link, a cellular wireless communication link (using licensed or unlicensed RF spectrum), or a Bluetooth wireless communication link, as symbolically shown by wireless communication signals 3030. IT device 3016 is also in range of wireless access point 2808, and IT device 3106 is accordingly capable of communicating with wireless access point 2808 via wireless communication signals 3031.

Figure 31:
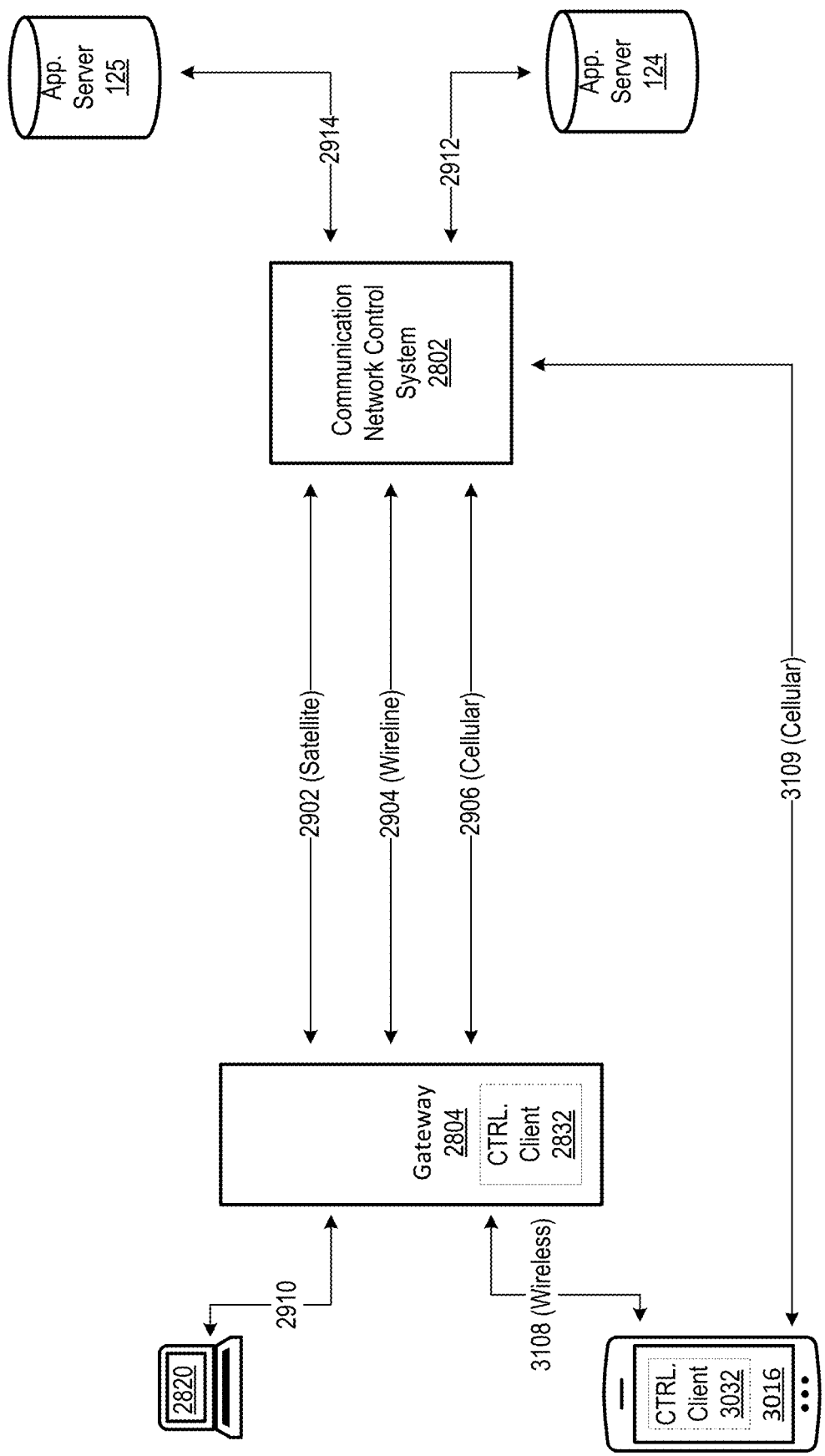
FIG. 31 is a block diagram illustrating one example of logical communication links in the FIG. 30 communication network.

FIG. 31 is a block diagram illustrating one example of logical communication links in communication network 3000. FIG. 31 depicts communication links 2902, 2904, 2906, 2910, 2912, and 2914, as discussed above with respect to FIG. 29. Additionally, FIG. 31 depicts logical communication links 3108 and 3109. Communication link 3108 is a wireless communication link between IT device 3016 and gateway 2804, corresponding to wireless signals 3030 of FIG. 30. Communication link 3109 is a cellular wireless communication link implemented by wireless access point 2808, wireless core network 2810, and communication system 120.

Gateway 2804 and control system 2802 are collectively configured to steer and/or split data among backhaul communication links 2902, 2904, and 2906, as discussed above with respect to FIGS. 28 and 29. Additionally, IT device 3016 and control system 2802 are collectively configured to steer and/or split data between wireless communication link 3108 and cellular wireless communication link 3109. For example, in some embodiments, a control client 3032 of IT device 3016 is configured to implement a steering policy to split and steer uplink data among wireless communication link 3108 and cellular wireless communication link 3109, such as to implement one or more of the steering policies of Table 2 above. As another example, some embodiments of a mobility manager (not shown) of control system 2802 are configured to split and steer downlink data among (a) one or more backhaul communication links 2902-2906 and wireless communication link 3108, and (b) cellular wireless communication link 3109, such as to implement one or more of the steering policies of Table 2.

Accordingly, communication network 3000 implements two levels of communication link management. The first level includes steering and/or splitting data flowing between gateway 2804 and control system 2802 among back backhaul communication links 2902, 2904, and 2906, and the second level includes steering and/or splitting data flowing between IT device 3016 and control system 2802 among wireless communication link 3108 and cellular wireless communication link 3109.

Figure 32:
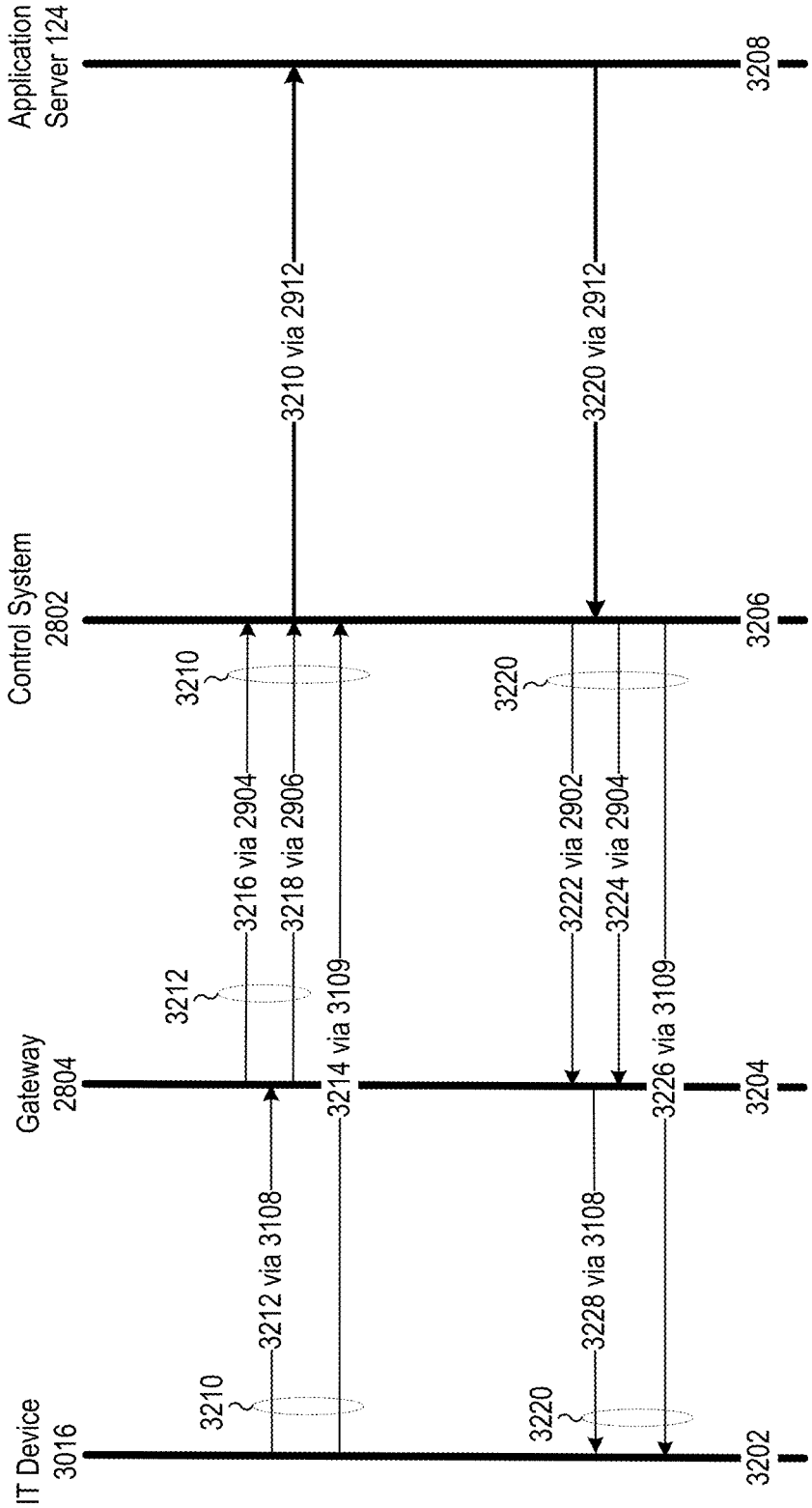
FIG. 32 is a dataflow diagram illustrating one example of operation of the FIG. 30 communication network.

FIG. 32 is a dataflow diagram illustrating one example of operation of communication network 3000 where data is simultaneously transmitted between IT device 3016 and application server 124 using multiple communication links. The FIG. 32 diagram includes vertical lines 3202, 3204, 3206, and 3208, which logically correspond to IT device 3016, gateway 2804, control system 2802, and application server 124, respectively. Control client 3032 of IT device 3016 splits uplink data 3210 into a first subset 3212 and a second subset 3214. IT device 3016 sends first subset 3212 to gateway 2804 via wireless communication link 3108, and IT device 3016 sends second subset 3214 to control system 2802 via cellular communication link 3109. Gateway 2804 splits first subset 3212 into additional subsets 3216 and 3218, and gateway 2804 sends additional subsets 3216 and 3218 upstream to control system 2802 via wireline communication link 2904 and cellular communication link 2906, respectively. Control system 2802 combines subsets 3216, 3218, and 3214 to re-establish uplink data 3210, and control system 2802 sends uplink data 3210 to application server 124 via communication link 2912. Packets of subsets 3216, 3218, and 3214 are not necessarily received by control system 2802 in corrector order, and control system 2802 is optionally configured to reorder packets of subsets 3216, 3218, and 3214 into a correct order before sending uplink data 3210 to application server 124. However, other embodiments of control system 2802 do not have reordering capability, and these embodiments of control system 2802 forward packets of subsets 3216, 3218, and 3214 to application server 124 in order that the packets are received.

Control system 2802 receives downlink data 3220 from application server 124 via communication link 2912, and control system 2802 splits downlink data 3220 into a first subset 3222, a second subset 3224, and a third subset 3226. Control system 2802 sends first and second subsets 3222 and 3224 to gateway 2804 via satellite communication link 2902 and wireline communication link 2904, respectively, and control system 2802 sends third subset 3226 directly to IT device 3016 via cellular wireless communication link 3109. Gateway 2804 combines first and second subsets 3222 and 3224 into a combined subset 3228, and gateway 2804 sends combined subset 3228 downstream to IT device 3016 via wireless communication link 3108. Control client 3032 of IT device 3016 combines subsets 3226 and 3228 to obtain complete downlink data 3220.

It should be appreciated that data could be transmitted in communication network 3000 in many other manners than that illustrated in FIG. 32. For example, data could be transmitted between gateway 2804 and control system 2802 using three communication links or using only a single communication link, instead of using two communication links. As another example, IT device 3016 could send or receive data using only one of wireless communication link 3108 or cellular wireless communication link 3109, instead of using both of these communication links.

Figure 33:
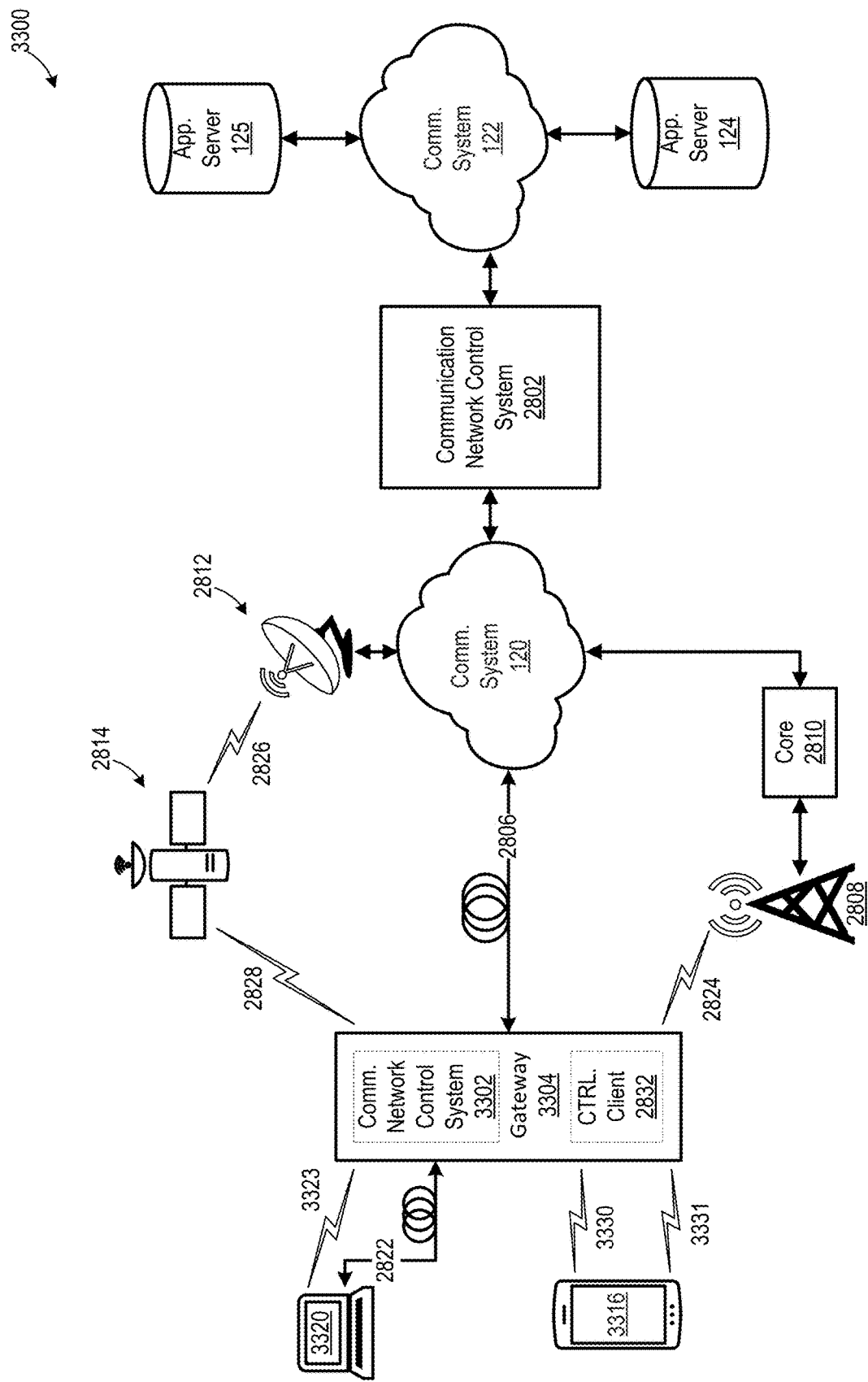
FIG. 33 is a block diagram of another alternate embodiment of the FIG. 28 communication network.

FIG. 33 is a block diagram of a communication network 3300, which is another alternate embodiment of communication network 2800 of FIG. 28. Gateway 2804 of FIG. 28 is replaced with a gateway 3304 in communication network 3300. Gateway 3304 is the same as gateway 2804 except that gateway 3304 further includes a control system 3302, which is an embodiment of control system 102 of FIG. 1, although details of control system 3302 are not shown for illustrative clarity. For example, control system 3302 includes (a) a mobility manager (not shown) which is an embodiment of mobility manager 136, (b) a network manager (not shown) which is an embodiment of network manager 138, and (c) an application manager (not shown) which is an embodiment of application manager 140. Control system 3302 optionally further includes a distributed compute manager (not shown) that is an embodiment of distributed compute manager 142.

IT devices 2820 and 2816 of communication network 2800 are replaced with IT devices 3320 and 3316 in communication network 3300. IT device 3320 is the same as IT device 2820 except that IT device 3300 is further capable of communicating with gateway 3304 via a wireless communication link, e.g., a Wi-Fi wireless communication link, a cellular wireless communication link operating in license or unlicensed RF spectrum, or a Bluetooth wireless communication link, as represented by wireless signals 3323. IT device 3316 is the same as IT device 2816 except that IT device 3316 is capable of communicating with gateway 3304 via two different wireless communication links, as represented by respective wireless communication signals 3330 and 3331. In some embodiments, wireless communication signals 3330 represent a Wi-Fi wireless communication link, and wireless communication signals 3331 represent a cellular wireless communication link operating in licensed or unlicensed RF spectrum. However, wireless communication signals 3330 and 3331 can represent different types of wireless communication links without departing from the scope hereof.

Figure 34:
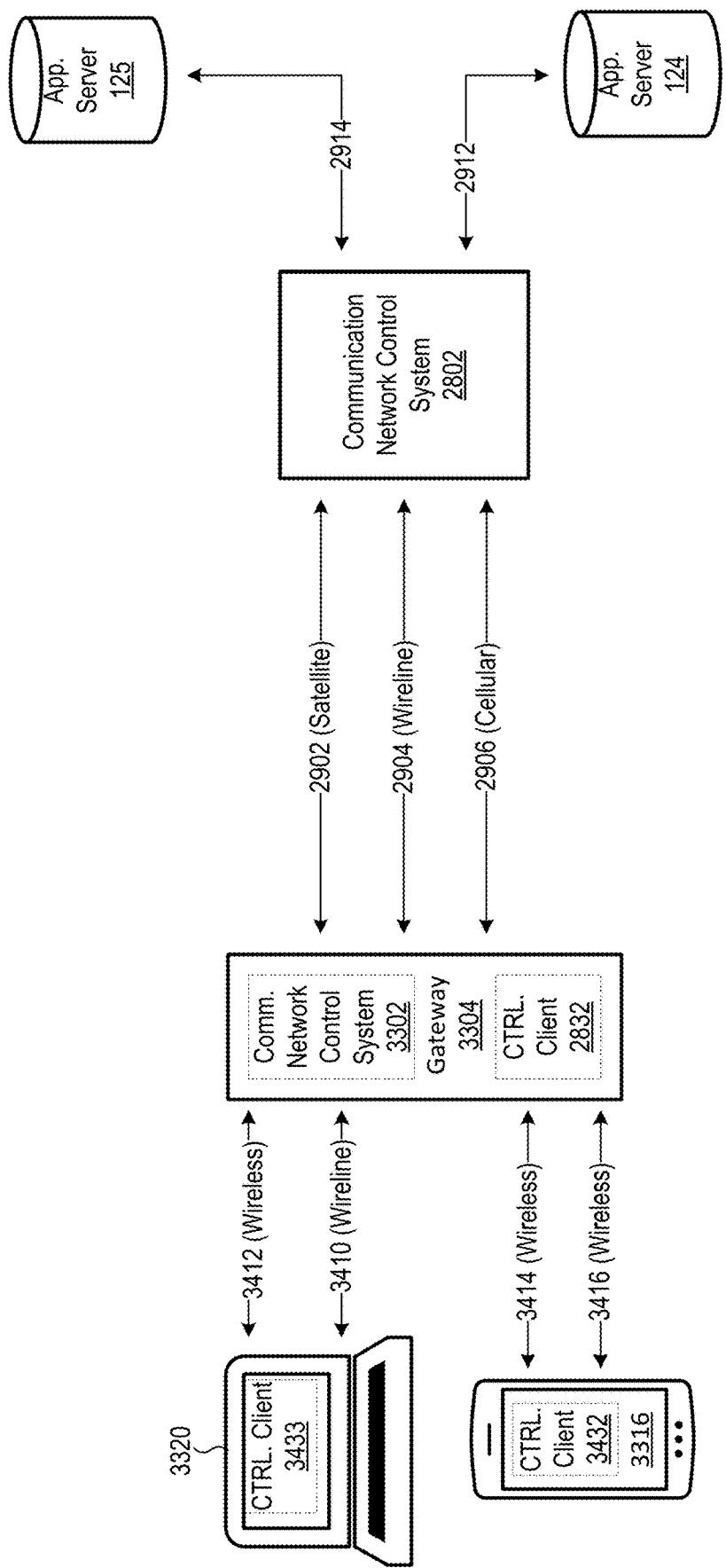
FIG. 34 is a block diagram illustrating one example of logical communication links in the FIG. 33 communication network.

FIG. 34 is a block diagram illustrating one example of logical communication links in communication network 3300. FIG. 34 depicts communication links 2902, 2904, 2906, 2912, and 2914, as discussed above with respect to FIG. 29. Additionally, FIG. 34 depicts logical communication links 3410, 3412, 3414, and 3416. Communication link 3410 is a wireline communication link between IT device 3320 and gateway 3304 corresponding to wireline communication medium 2822. Communication link 3412 is a wireless communication link between IT device 3320 and gateway 3304 corresponding to wireless communication signals 3323 of FIG. 33. Communication link 3414 is a wireless communication link between IT device 3316 and gateway 3304 corresponding to wireless communication signals 3330 of FIG. 33, and communication link 3416 is a wireless communication link between IT device 3316 and gateway 3304 corresponding to wireless communication signals 3331 of FIG. 33.

IT device 3316 includes a control client 3432, and IT device 3320 includes a control client 3433. Each of control clients 3432 and 3433 is analogous to either control client 1504 of FIG. 15 or control client 1604 of FIG. 16. Gateway 3304 and control system 2802 are collectively configured to steer and/or split data among backhaul communication links 2902, 2904, and 2906 in the manner discussed above with respect to FIGS. 28 and 29. Additionally, IT device 3316 and control system 3302 are collectively configured to steer and/or split data among wireless communication links 3414 and 3416. For example, in some embodiments, control client 3432 of IT device 3316 is configured to implement a steering policy to split and steer uplink data among wireless communication links 3414 and 3416, such as to implement one or more of the steering policies of Table 2 above. As another example, some embodiments of a mobility manager (not shown) of control system 3302 are configured to split and steer downlink data among wireless communication links 3414 and 3416, such as to implement one or more of the steering policies of Table 2.

Furthermore, IT device 3320 and control system 3302 are collectively configured to steer and/or split data among wireline communication link 3410 and wireless communication link 3412. For example, in some embodiments, control client 3433 of IT device 3320 is configured to implement a steering policy to split and steer uplink data among wireless communication links 3410 and 3412, such as to implement one or more of the steering policies of Table 2 above. As another example, some embodiments of a mobility manager (not shown) of control system 3302 are configured to split and steer downlink data among wireline communication link 3410 and wireless communication link 3412, such as to implement one or more of the steering policies of Table 2.

Accordingly, communication network 3300 implements three levels of communication link management. The first level includes steering and/or splitting data flowing between gateway 3304 and control system 2802 among backhaul communication links 2902, 2904, and 2906, and the second level includes steering and/or splitting data flowing between gateway 3304 and IT device 3316 among wireless communication links 3414 and 3416. The third level includes steering and/or splitting data flowing between gateway 3304 and IT device 3320 among wireline communication link 3410 and wireless communication link 3412. Communication network 3300 could implement one or more additional levels of communication link management by adding one or more IT devices communicatively coupled with gateway 3304, where each IT device includes a respective control client to interact with control system 3302 of gateway 3304. Additionally, IT devices without control clients could be communicatively coupled to gateway 3304, although control system 3302 would not be able to manage communication links with these IT devices.

Figure 35:
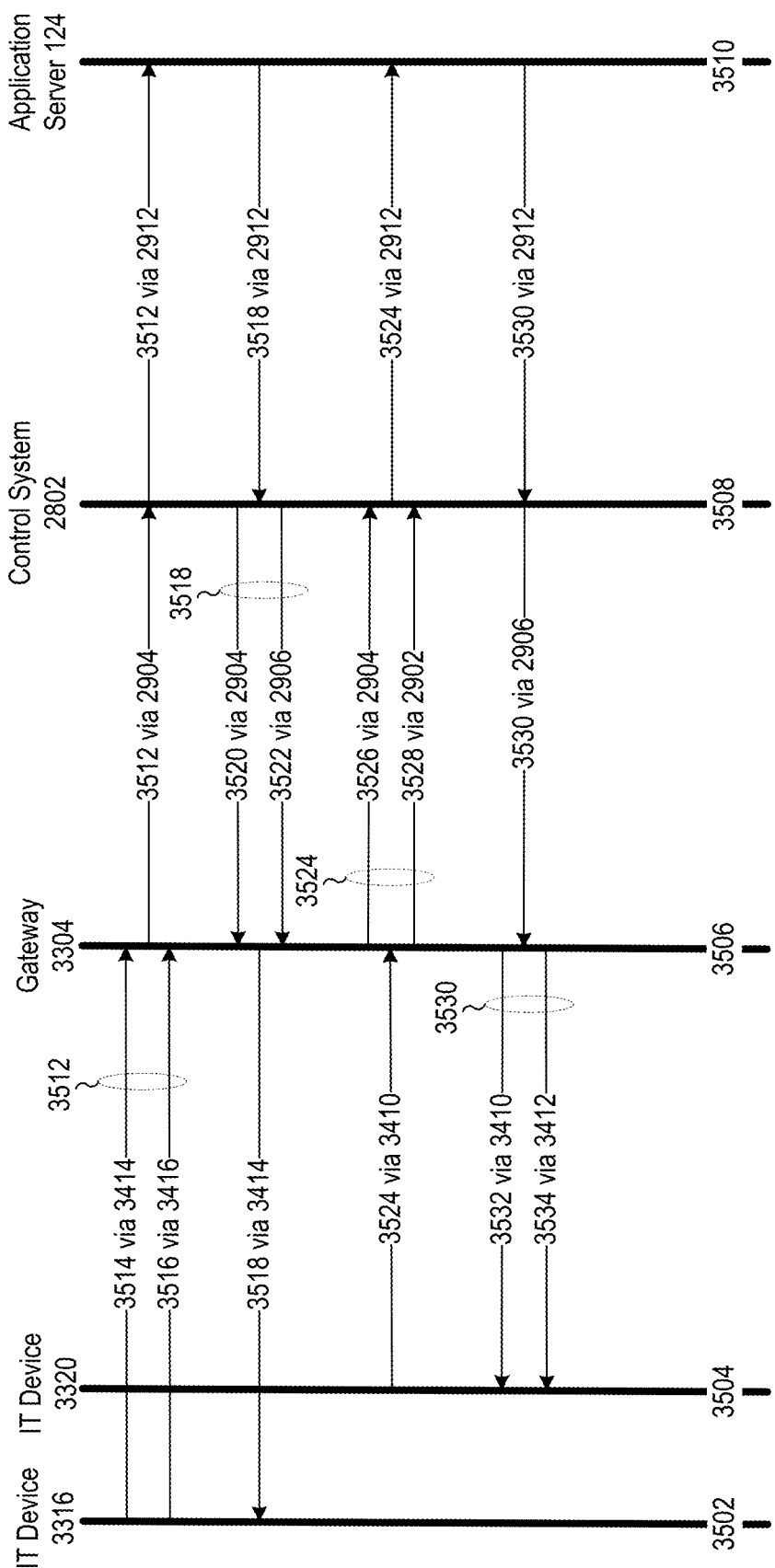
FIG. 35 is a dataflow diagram illustrating one example of operation of the FIG. 33 communication network.

FIG. 35 is a dataflow diagram illustrating one example of operation of communication network 3300 where data is simultaneously transmitted between IT device 3316 and application server 124. The FIG. 35 diagram includes vertical lines 3502, 3504, 3506, and 3508, which logically correspond to IT device 3316, IT device 3320, gateway 3304, control system 3302, and application server 124, respectively. Control client 3432 of IT device 3316 splits uplink data 3512 into a first subset 3514 and a second subset 3516. IT device 3316 sends first subset 3514 to gateway 3304 via wireless communication link 3414, and IT device 3316 sends second subset 3516 to gateway 3304 via wireless communication link 3416. Gateway 3304 combines first and subsets 3514 and 3516 back into uplink data 3512, and gateway 3304 sends uplink data 3512 upstream to control system 2802 via wireline communication link 2904. Control system 2802 sends uplink data 3512 to application server via communication link 2912. Control system 2802 receives downlink data 3518 via communication link 2912, and control system 2802 splits downlink data 3518 into a first subset 3520 and a second subset 3522. Control system 2802 sends first and second subsets 3520 and 3522 to gateway 3304 via wireline communication link 2904 and cellular wireless link 2906, respectively. Gateway 3304 combines first and second subsets 3520 and 3522 back into downlink data 3518, and gateway 3304 sends downlink data 3518 to IT device 3316 via wireless communication link 3414.

Additionally, in the FIG. 35 example, IT device 3320 sends uplink data 3524 to gateway 3304 via wireline communication link 3410. Control client 2832 of gateway 3304 splits uplink data 3524 into first and second subsets 3526 and 3528, and control client 2832 sends the first and subsets upstream to control system 2802 via wireline communication link 2904 and satellite communication link 2902, respectively. Control system 2802 combines first and second subsets 3526 and 3528 back into uplink data 3524, and control system 2802 sends uplink data 3524 to application server 124 via communication link 2912. Control system 2802 receives downlink data 3530 from application server 124 via communication link 2912, and control system 2802 sends downlink data 3530 to gateway 3304 via cellular wireless communication link 2906. Controls system 3302 of gateway 3304 splits downlink data 3530 into first and second subsets 3532 and 3534, and gateway 3304 sends the first and subsets to IT device 3320 via wireline communication link 3410 and wireless communication link 3412, respectively. Control client 3433 of IT device 3320 combines first and second subsets 3532 and 3534 back into downlink data 3530.

It should be appreciated that data could be transmitted in communication network 3300 in many other manners than that illustrated in FIG. 35. For example, uplink data could be transmitted between IT device 3316 and gateway 3304 using only a single communication link, instead of using two communication links. As another example, uplink data could be transmitted between gateway 3304 and control system 2802 using two or three communication links, instead of using only a single communication link.

Figure 36:
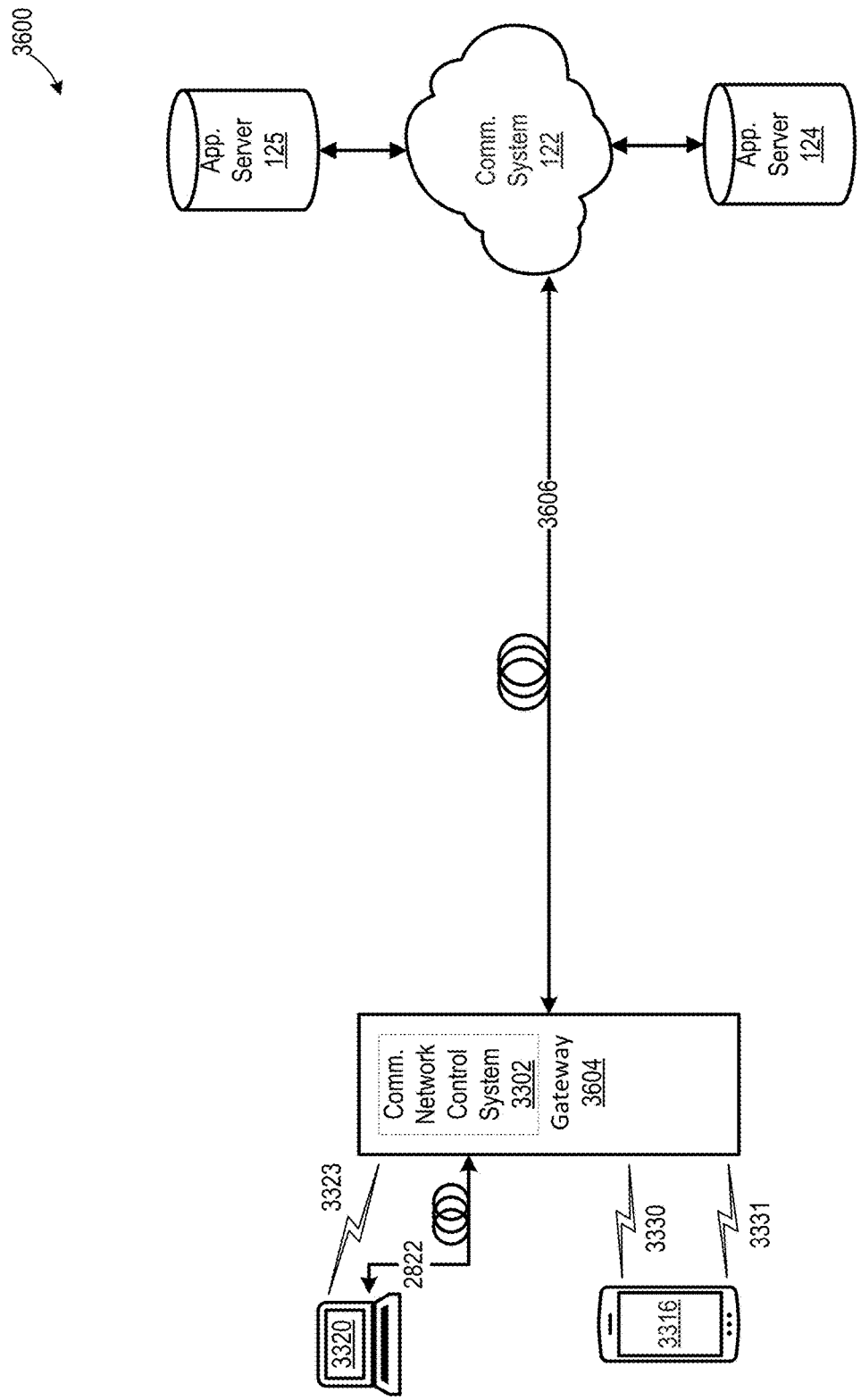
FIG. 36 is a block diagram of an alternate embodiment of the FIG. 33 communication network where a gateway has only one backhaul communication link.

FIG. 36 is a block diagram of a communication network 3600, which is an alternate embodiment of communication network 3300 including only a single gateway backhaul communication link. Gateway 3304 of FIG. 33 is replaced with a gateway 3604, and gateway 3604 is the same as gateway 3304 except that gateway 3604 does not include control client 2832. Gateway 3604 is also communicatively coupled to communication system 122 via a single backhaul communication link 3606. Backhaul communication link 3606 is wireline communication link including, for example, an electrical cable, an optical cable, or a hybrid electrical cable and optical cable. In some embodiments, backhaul communication link 3606 operates according to one or more of the following data transmission protocols: (a) an Ethernet electrical data transmission protocol, (b) a DOCSIS data transmission protocol, (c) a DSL data transmission protocol, (d) an EPON data transmission protocol, (e) a RFOG data transmission protocol, (f) a GPON data transmission protocol, (g) a MoCA data transmission protocol, (h) a HomePNA (G.hn) data transmission protocol, and (i) any variations, improvements, and/or evolutions thereof. Backhaul communication link 3606 could be replaced with, or supplemented by, a wireless communication link, including but not limited to a cellular wireless communication link, a Wi-Fi wireless communication link, and/or a satellite wireless communication link, without departing from the scope hereof.

Figure 37:
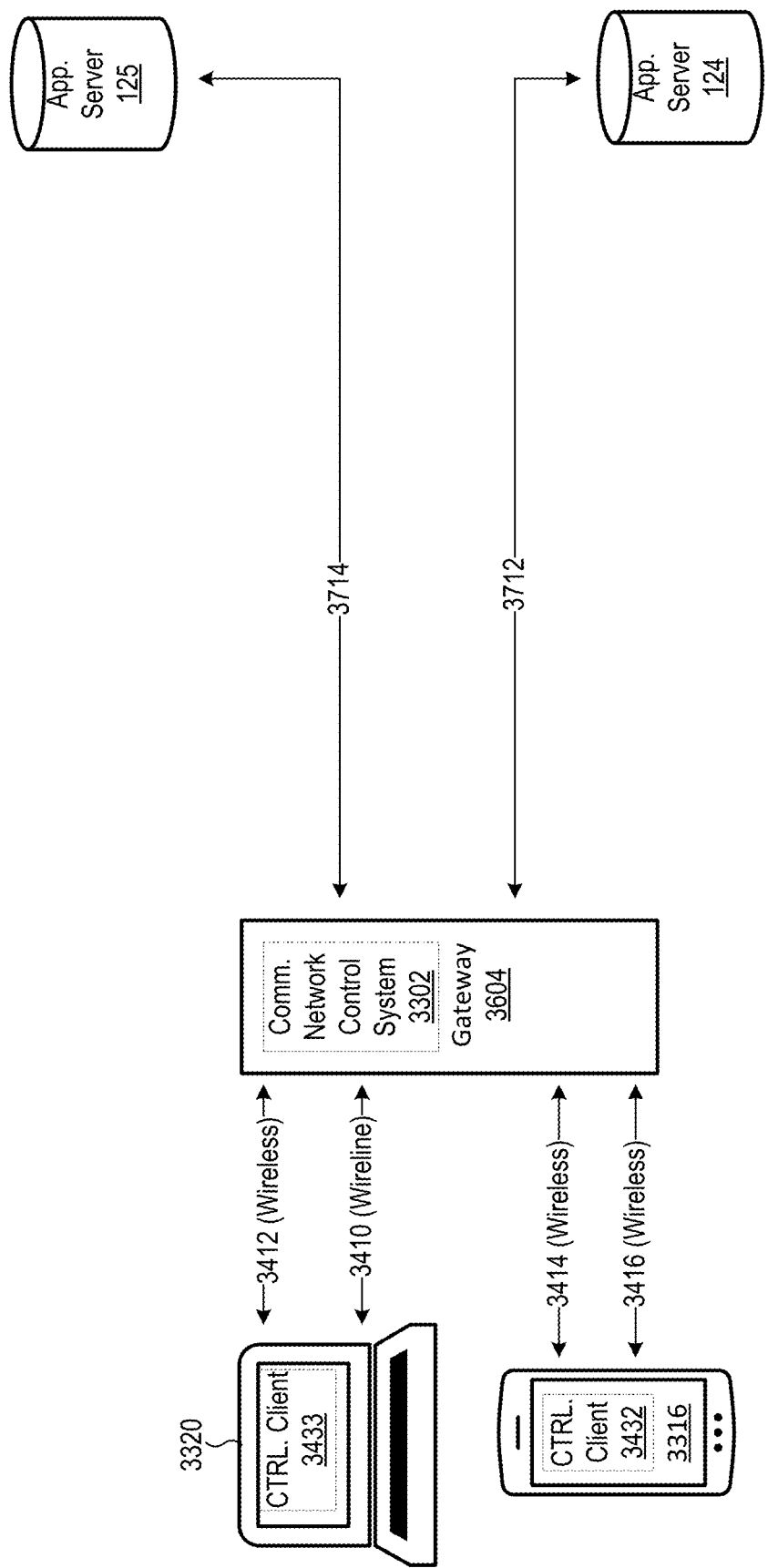
FIG. 37 block diagram illustrating one example of logical communication links in the FIG. 36 communication network.

FIG. 37 is a block diagram illustrating one example of logical communication links in communication network 3600. FIG. 37 depicts communication links 3410, 3412, 3414, and 3416, as discussed above with respect to FIG. 34. Additionally, FIG. 37 depicts logical communication links 3712 and 3714. Communication link 3712 is a communication link between gateway 3604 and application server 124 that is implemented by communication system 122. Communication link 3714 is a logical communication link between gateway 3604 and application server 125 that is implemented by communication system 122.

Communication network 3600 implements data link management between gateway 3604 and IT devices, e.g., IT devices 3316 and 3320, in the manner discussed above with respect to FIGS. 33-35. However, in contrast to communication network 3300 of FIG. 33, all gateway backhaul data necessarily flows through a single communication link, i.e., communication link 3606, in communication network 3600.

Combinations of Features

Features described above may be combined in various ways without departing from the scope hereof. The following examples illustrate some possible combinations:

(A1) A method for wireless communication network control may include (1) receiving, at an information technology (IT) device, a first steering policy from an application manager remote from the IT device, the first steering policy specifying a first allocation of data among a plurality of wireless communication links available to the IT device, and (2) sending uplink data from a first application client on the IT device to a mobility manager remote from the IT device over at least one of the plurality of wireless communication links available to the IT device, according to the first allocation of data.

(A2) The method denoted as (A1) may further include simultaneously receiving, at the IT device, downlink data from the mobility manager via at least two of the plurality of wireless communication links available to the IT device.

(A3) Any one of the methods denoted as (A1) and (A2) may further include simultaneously sending uplink data from the IT device to the mobility manager via at least two of the plurality of wireless communication links available to the IT device.

(A4) Any one of the methods denoted as (A1) through (A4) may further include sending application performance metrics from the IT device to the application manager, the application performance metrics indicating communication link performance experienced by at least the first application client.

(A5) Any one of the methods denoted as (A1) through (A4) may further include (1) receiving, at the IT device, a second steering policy from the application manager, the second steering policy specifying a second allocation of data among the plurality of wireless communication links available to the IT device, the second allocation being different from the first allocation, and (2) sending additional uplink data from the first application client to the mobility manager over at least one of the plurality of wireless communication links available to the IT device, according to the second allocation of data.

(A6) In any one of the methods denoted as (A1) through (A5), the plurality of wireless communication links available to the IT device may include a first cellular wireless communication link, a second cellular wireless communication link, and a Wi-Fi wireless communication link, and the method may further include (1) sending the uplink data from the first application client to the mobility manager at least partially using the first cellular wireless communication link and (2) sending additional uplink data from the first application client to the mobility manager at least partially using the Wi-Fi wireless communication link, while the second cellular wireless communication link is being established with the IT device.

(B1) A method for wireless communication network control may include (1) receiving, at a mobility manager remote from an information technology (IT) device, uplink data from a first application client on the IT device, via at least one of a plurality of wireless communication links available to the IT device, (2) sending the uplink data from the mobility manager to an application server, (3) receiving, at the mobility manager, downlink data from the application server, and (4) sending the downlink data from the mobility manager to the first application client on the IT device, via at least one of the plurality of wireless communication links available to the IT device.

(B2) The method denoted as (B1) may further include simultaneously receiving, at the mobility manager, (1) a first subset of the uplink data via a first one of the plurality of wireless communication links available to the IT device, and (2) a second subset of the uplink data via a second one of the plurality of wireless communication links available to the IT device.

(B3) Any one of the methods denoted as (B1) and (B2) may further include simultaneously sending (1) a first subset of the downlink data from the mobility manager to the first application client on the IT device via a first one of the plurality of wireless communication links available to the IT device, and (2) a second subset of the downlink data from the mobility manager to the first application client on the IT device via a second one of the plurality of wireless communication links available to the IT device.

(B4) Any one of the methods denoted as (B1) through (B3) may further include using the mobility manager to serve as a proxy for the first application, with respect to the application server.

(B5) Any one of the methods denoted as (B1) through (B4) may further include (1) determining network performance metrics, (2) determining a first steering policy at least partially based on the network performance metrics, the first steering policy specifying a first allocation of data among the plurality of wireless communication links available to the IT device, and (3) sending the first steering policy to at least one of the IT device and the mobility manager.

(B6) The method denoted as (B5) may further include (1) receiving, at an application manager, application performance metrics from at least one of the IT device and the application server, the application performance metrics indicating communication link performance experienced by at least the first application client, and (2) determining the first steering policy partially based on the application performance metrics.

(B7) In any one of the methods denoted as (B5) and (B6), the network performance metrics may include one or more of number of unconnected devices in range of a wireless access point, bandwidth capacity of a wireless access point, bandwidth throughput available at a wireless access point, and wireless communication link utilization.

(B8) Any one of the methods denoted as (B1) through (B4) may further include (1) receiving, at an application manager, application performance metrics from at least one of the IT device and the application server, the application performance metrics identifying communication link performance experienced by at least the first application client, (2) determining a first steering policy at least partially based on the application performance metrics, the first steering policy specifying a first allocation of data among the plurality of wireless communication links available to the IT device, and (3) sending the first steering policy from the application manager to at least one of the IT device and the mobility manager.

(B9) Any one of the methods denoted as (B1) through (B8) may further include sending distributed compute information from the mobility manager to the application server, the distributed compute information notifying the application server of availability of distributed computing resources at a distributed compute manager.

(B10) The method denoted as (B9) may further include (1) receiving, at the distributed compute manager, first instructions from the application server to establish a distributed access server, and (2) establishing the distributed access server, in response to receiving the first instructions.

(B11) The method denoted as (B10) may further include receiving, at the distributed access server, additional downlink data from the application server.

(B12) The method denoted as (B11) may further include sending the additional downlink data from the distributed access server to the first application client on the IT device.

(B13) Any one of the methods denoted as (B10) through (B12) may further include (1) receiving, at the distributed compute manager, second instructions from the application server to tear-down the distributed access server, and (2) tearing down the distributed access server, in response to receiving the second instructions.

(B14) Any one of the methods denoted as (B1) through (B13) may further include (1) determining, at an application manager remote from the IT device, that the IT device is projected to move to an area including one or more congested wireless access points, and (2) in response to the determining that the IT device is projected to move to the area including one or more congested wireless access points, sending a first command from the application manager to the first application client on the IT device, the first command instructing the first application client to exchange data with the mobility manager before the IT device moves to the area including the one or more congested wireless access points.

(C1) A method for interfacing one or more information technology (IT) devices with an application server includes (1) receiving, at a control system, first downlink data from the application server, and (2) steering the first downlink data from the control system to a first IT device via at least one of a first plurality of parallel data communication links between the first IT device and the control system, according to a first steering policy.

(C2) The method denoted as (C1) may further include serving, at the control system, as a proxy for an application client of the first IT device, with respect to the application server.

(C3) In the method denoted as (C2), the proxy may at least partially implement a multipath transmission control protocol (MPTCP).

(C4) In the method denoted as (C2), the proxy may at least partially implement a multiplexed application substrate over quick user datagram protocol (UDP) Internet connections (QUIC) encryption (MASQUE) protocol.

(C5) In any one of the methods denoted as (C1) through (C4), the first plurality of parallel data communication links may include (1) a first wireless communication link using licensed radio frequency (RF) spectrum and (2) a second wireless communication link using unlicensed RF spectrum.

(C6) In any one of the methods denoted as (C1) through (C5), the first plurality of parallel data communication links may include (1) a cellular wireless communication link and (2) a Wi-Fi wireless communication link.

(C7) In the method denoted as (C6), the cellular wireless communication link may be selected from the group consisting of cellular wireless communication link operating using licensed radio frequency (RF) spectrum and a cellular wireless communication link using unlicensed RF spectrum.

(C8) In any one of the methods denoted as (C6) and (C7), the cellular wireless communication link may include (1) a wireless access point and (2) a core controller.

(C9) In the method denoted as (C8), the Wi-Fi wireless communication link may include a Wi-Fi access point communicatively coupled to the core controller.

(C10) In any one of the methods denoted as (C8) and (C9), the core controller may be selected from the group consisting of an evolved packet core (EPC), a fifth generation (5G) cellular wireless communication core, and a sixth generation (6G) cellular wireless communication core.

(C11) In any one of the methods denoted as (C1) through (C10), the first plurality of parallel data communication links may include a wireline communication link.

(C12) Any one of the methods denoted as (C1) through (C11) may further include (1) receiving, at the control system, second downlink data from the application server, and (2) steering the second downlink data from the control system to a second IT device via at least one of a second plurality of parallel data communication links between the second IT device and the control system, according to a second steering policy. At least one data communication link of the first plurality of parallel data communication links and at least one data communication link of the second plurality of parallel data communication links may be operated by different respective network operators.

(D1) A method for information technology (IT) device control includes (1) receiving, at the IT device, a first steering policy from a control system remote from the IT device, the first steering policy specifying a first allocation of data among a plurality of parallel data communication links between the IT device and the control system, and (2) sending first uplink data from a first application client on the IT device to the control system over at least one of the plurality of parallel data communication links, according to the first allocation data.

(D2) In the method denoted as (D1), the plurality of parallel data communication links between the IT device and the control system may include a first wireless communication link and a second wireless communication link.

(D3) In the method denoted as (D2), the first wireless communication link may include a first cellular wireless communication link, and the second wireless communication link may include a second cellular wireless communication link.

(D4) In the method denoted as (D3), the first cellular wireless communication link may be associated with a first subscriber identity module (SIM) card of the IT device, and the second cellular wireless communication link may be associated with a second SIM card of the IT device.

(D5) In the method denoted as (D1), the plurality of parallel data communication links may include (1) a cellular wireless communication link and (2) a Wi-Fi wireless communication link.

(D6) In the method denoted as (D5), the Wi-Fi wireless communication link may be routed through a core controller associated with the cellular wireless communication link.

(D7) In any one of the methods denoted as (D1) through (D6), the plurality of parallel data communication links may include a wireline communication link.

(D8) Any one of the methods denoted as (D1) through (D7) may further include sending second uplink data from the IT device to an application server via an additional communication link which bypasses the control system.

(E1) A method for interfacing a gateway with an application server includes (1) receiving, at a control system, first downlink data from the application server, and (2) steering the first downlink data from the control system to the gateway via at least one of a plurality of parallel data communication links between the gateway and the control system, according to a first steering policy.

(E2) In the method denoted as (E1), the first steering policy may specify a first allocation of downlink data among the plurality of parallel data communication links.

(E3) In the method denoted as (E2), the first allocation of downlink data among the plurality of parallel data communication links may include (1) an allocation of a first portion of the first downlink data to a first communication link of the plurality of parallel data communication links and (2) an allocation of a second portion of the first downlink data to a second communication link of the plurality of parallel data communication links.

(E4) Any one of the methods denoted as (E1) through (E3) may further include (1) receiving, at the control system, uplink data from the gateway via at least one of the plurality of parallel data communication links between the gateway and the control system, and (2) sending the uplink data to the application server.

(E5) Any one of the methods denoted as (E1) through (E3) may further include (1) receiving, at the control system, uplink data from the gateway via at least two of the plurality of parallel data communication links between the gateway and the control system, (2) combining the uplink data received via the at least two of the plurality of parallel data communication links to obtain combined uplink data, and (3) sending the combined uplink data to the application server.

(E6) Any one of the methods denoted as (E1) through (E5) may further include (1) receiving uplink data from an IT device via a communication link between the IT device and the control system that bypasses the gateway and (2) sending the uplink data to the application server.

(E7) In any one of the methods denoted as (E1) through (E6), the plurality of parallel data communication links between the gateway and the control system may include at least one of a wireline communication link, a cellular wireless communication link operating in licensed radio frequency (RF) spectrum, a cellular wireless communication link operating in unlicensed RF spectrum, a Wi-Fi wireless communication link, and a Satellite wireless communication link.

(F1) A method for interfacing a gateway with an application server includes (1) receiving, at the gateway, first downlink data from a control system via at least one of a plurality of parallel data communication links between the gateway and the control system, and (2) sending the first downlink data from the gateway to an information technology (IT) device communicatively coupled to the gateway.

(F2) In the method denoted as (F1), receiving first downlink data from the control system via at least one of the plurality of parallel data communication links may include simultaneously receiving the first downlink data via at least two of the plurality of parallel data communication links.

(F3) Any one of the methods denoted as (F1) and (F2) may further include (1) receiving, at the gateway, first uplink data from the IT device, and (2) sending the first uplink data to the control system via at least one of the plurality of parallel data communication links between the gateway and the control system.

(F4) In the method denoted as (F3), sending the first uplink data to the control system via at least one of the plurality of parallel data communication links may include sending the first uplink data to the control system according to a first steering policy.

(F5) In the method denoted as (F4), the first steering policy may specify a first allocation of uplink data among the plurality of parallel data communication links.

(F6) In the method denoted as (F5), the first allocation of uplink data among the plurality of parallel data communication links may include (1) an allocation of a first portion of the first uplink data to a first communication link of the plurality of parallel data communication links and (2) an allocation of a second portion of the first uplink data to a second communication link of the plurality of parallel data communication links.

(F7) Any one of the methods denoted as (F1) through (F6) may further include interfacing the IT device with the plurality of parallel data communication links between the gateway and the control system.

(F8) In any one of the methods denoted as (F1) through (F7), the plurality of parallel data communication links between the gateway and the control system may include at least one of a wireline communication link, a cellular wireless communication link operating in licensed radio frequency (RF) spectrum, a cellular wireless communication link operating in unlicensed RF spectrum, a Wi-Fi wireless communication link, and a Satellite wireless communication link.

(F9) Any one of the methods denoted as (F1) through (F8), sending the first downlink data from the gateway to IT device communicatively coupled to the gateway may further include sending the first downlink data to the IT device via at least one of a plurality of parallel data communication links between the gateway and the IT device.

(F10) In the method denoted as (F9), sending the first downlink data to the IT device via at least one of the plurality of parallel data communication links between the gateway and the IT device may include sending the first downlink data to the IT device according to a second steering policy.

(F11) In the method denoted as (F10), the second steering policy may specify a first allocation of downlink data among the plurality of parallel data communication links between the gateway and the IT device (F12) Any one of the methods denoted as (F9) through (F11) may further include (1) receiving first uplink data at the gateway from the IT device via at least one of the plurality of parallel data communication links between the gateway and the IT device and (2) sending the first uplink data to the control system via at least one of the plurality of parallel data communication links between the gateway and the control system.

(F13) In any one of the methods denoted as (F9) through (F12), the plurality of parallel data communication links between the gateway and the IT device may include at least one of a wireline communication link, a cellular wireless communication link operating in licensed radio frequency (RF) spectrum, a cellular wireless communication link operating in unlicensed RF spectrum, a Wi-Fi wireless communication link, and a Bluetooth wireless communication link.

(G1) A method for interfacing an information technology device with a gateway may include (1) receiving, at the gateway, first downlink data, and (2) steering the first downlink data from the gateway to a first information technology (IT) device via at least one of a first plurality of parallel data communication links between the first IT device and the gateway, according to a first steering policy.

(G2) In the method denoted as (G1), the first steering policy may specify an allocation of the first downlink data among the first plurality of parallel data communication links.

(G3) In the method denoted as (G2), the allocation of the first downlink data among the first plurality of parallel data communication links may include (1) an allocation of a first portion of the first downlink data to a first communication link of the first plurality of parallel data communication links and (2) an allocation of a second portion of the first downlink data to a second communication link of the first plurality of parallel data communication links.

(G4) Any one of the methods denoted as (G1) through (G3) may further include (1) receiving, at the gateway, second downlink data, and (2) steering the second downlink data from the gateway to a second IT device via at least one of a second plurality of parallel data communication links between the second IT device and the gateway, according to a second steering policy.

(G5) In the method denoted as (G4), the first steering policy may specify an allocation of the first downlink data among the first plurality of parallel data communication links, and the second steering policy may specify an allocation of the second downlink data among the second plurality of parallel data communication links.

(G6) Any one of the methods denoted as (G1) through (G5) may further include (1) receiving, at the gateway, uplink data from the first IT device via at least one of the plurality of parallel data communication links between the first IT device and the gateway, and (2) sending the uplink data upstream.

(G7) Any one of the methods denoted as (G1) through (G5) may further include (1) receiving, at the gateway, uplink data from the first IT device via at least two of the first plurality of parallel data communication links between the first IT device and the gateway, (2) combining the uplink data received via the at least two of the first plurality of parallel data communication links to obtain combined uplink data, and (3) sending the combined uplink data upstream.

(G8) In any one of the methods denoted as (G1) through (G7), the first plurality of parallel data communication links between the first IT device and the gateway may include at least one of a wireline communication link, a cellular wireless communication link operating in licensed radio frequency (RF) spectrum, a cellular wireless communication link operating in unlicensed RF spectrum, a Wi-Fi wireless communication link, and a Bluetooth wireless communication link.

(G9) Any one of the methods denoted as (G1) through (G8) may further include interfacing the first IT device with at least one backhaul communication link communicatively coupled to the gateway.

(H1) A method for interfacing an information technology (IT) device with a gateway may include (1) receiving, at the IT device, a first steering policy from the gateway, the first steering policy specifying a first allocation of data among a plurality of parallel data communication links between the IT device and the gateway, and (2) sending first uplink data from the IT device to the gateway via at least one of the plurality of parallel data communication links between the IT device and the gateway, according to the first allocation of data.

(H2) In the method denoted as (H1), the gateway may interface the IT device with at least one backhaul communication link (H3) In any one of the methods denoted as (H1) and (H2), sending the first uplink data from the IT device to the gateway via at least one of the plurality of plurality of parallel data communication links between the IT device and the gateway may include simultaneously sending the uplink data to the gateway via at least two of the plurality of plurality of parallel data communication links.

(H4) Any one of the methods denoted as (H1) through (H3) may further include sending second uplink data from the IT device to an application server via a communication link bypassing the gateway.

(H5) Any one of the methods denoted as (H1) through (H4) may further include receiving, at the IT device, downlink data from the gateway via at least one of the plurality of parallel data communication links between the IT device and the gateway.

(H6) Any one of the methods denoted as (H1) through (H4) may further include simultaneously receiving, at the IT device, downlink data from the gateway via at least two of the plurality of parallel data communication links between the IT device and the gateway.

(H7) The method denoted as (H6) may further include, at the IT device, combining the downlink data received via the at least two of the plurality of parallel data communication links between the IT device and the gateway.

(H8) In any one of the methods denoted as (H1) through (H7), the plurality of parallel data communication links between the IT device and the gateway may include at least one of a wireline communication link, a cellular wireless communication link operating in licensed radio frequency (RF) spectrum, a cellular wireless communication link operating in unlicensed RF spectrum, a Wi-Fi wireless communication link, and a Bluetooth wireless communication link.

(I1) A method for interfacing an information technology device with a gateway may include (1) sending first uplink data from the IT device to the gateway via at least one of a plurality of parallel data communication links between the IT device and the gateway and (2) sending second uplink data from the IT device to an application server via a communication link bypassing the gateway.

(I2) In the method denoted as (I1), sending first uplink data from the IT device to the gateway via at least one of the plurality of parallel data communication links between the IT device and the gateway may include sending the first uplink data to the gateway according to a steering policy specifying a first allocation of data among the plurality of parallel data communication links between the IT device and the gateway.

(I3) In any one of the methods denoted as (I1) and (I2), the plurality of parallel data communication links between the IT device and the gateway may include at least one of a wireline communication link, a cellular wireless communication link operating in licensed radio frequency (RF) spectrum, a cellular wireless communication link operating in unlicensed RF spectrum, a Wi-Fi wireless communication link, and a Bluetooth wireless communication link.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for interfacing one or more information technology (IT) devices with an application server, the method comprising:
    receiving, at a control system, first downlink data from the application server; and
    steering the first downlink data from the control system to a first IT device via at least one of a first plurality of parallel data communication links between the first IT device and the control system, according to a first steering policy, the control system being logically upstream of a first core controller of a first wireless communication link of the first plurality of parallel data communication links, with respect to the application server.

2. The method of claim 1, further comprising serving, at the control system, as a proxy for an application client of the first IT device, with respect to the application server.

3. The method of claim 2, wherein the proxy at least partially implements a multipath transmission control protocol (MPTCP).

4. The method of claim 2, wherein the proxy at least partially implements a multiplexed application substrate over quick user datagram protocol (UDP) Internet connections (QUIC) encryption (MASQUE) protocol.

5. The method of claim 1, wherein the first plurality of parallel data communication links comprises:
    a first wireless communication link using licensed radio frequency (RF) spectrum; and
    a second wireless communication link using unlicensed RF spectrum.

6. The method of claim 1, wherein the first plurality of parallel data communication links comprises:
    a cellular wireless communication link; and
    a Wireless Fidelity (Wi-Fi) wireless communication link.

7. The method of claim 6, wherein the cellular wireless communication link is selected from the group consisting of cellular wireless communication link operating using licensed radio frequency (RF) spectrum and a cellular wireless communication link using unlicensed RF spectrum.

8. The method of claim 6, wherein the first wireless communication link is the cellular wireless communication link, and the cellular wireless communication link comprises:
    a wireless access point; and
    the first core controller.

9. The method of claim 8, wherein the Wi-Fi wireless communication link comprises a Wi-Fi access point communicatively coupled to the first core controller.

10. The method of claim 8, wherein the first core controller is selected from the group consisting of an evolved packet core (EPC), a fifth generation (5G) cellular wireless communication core, and a sixth generation (6G) cellular wireless communication core.

11. The method of claim 1, wherein the first plurality of parallel data communication links comprises a wireline communication link.

12. A method for interfacing one or more information technology (IT) devices with an application server, the method comprising
    receiving, at a control system, first downlink data from the application server;
    steering the first downlink data from the control system to a first IT device via at least one of a first plurality of parallel data communication links between the first IT device and the control system, according to a first steering policy;
    receiving, at the control system, second downlink data from the application server; and
    steering the second downlink data from the control system to a second IT device via at least one of a second plurality of parallel data communication links between the second IT device and the control system, according to a second steering policy,
    wherein at least one data communication link of the first plurality of parallel data communication links and at least one data communication link of the second plurality of parallel data communication links are operated by different respective network operators.

13. A method for information technology (IT) device control, the method comprising:
    receiving, at the IT device, a first steering policy from a control system remote from the IT device, the first steering policy specifying a first allocation of data among a plurality of parallel data communication links between the IT device and the control system, the control system being logically upstream of a first core controller of a first wireless communication link of the plurality of parallel data communication links, with respect to an application server configured to provide downlink data to the IT device; and
    sending first uplink data from a first application client on the IT device to the control system over at least one of the plurality of parallel data communication links, according to the first allocation data.

14. The method of claim 13, wherein the plurality of parallel data communication links between the IT device and the control system comprise a first wireless communication link and a second wireless communication link.

15. The method of claim 14, wherein:
    the first wireless communication link comprises a first cellular wireless communication link; and
    the second wireless communication link comprises a second cellular wireless communication link.

16. The method of claim 15, wherein:
    the first cellular wireless communication link is associated with a first subscriber identity module (SIM) card of the IT device; and
    the second cellular wireless communication link is associated with a second SIM card of the IT device.

17. The method of claim 13, wherein the plurality of parallel data communication links comprises a wireline communication link.

18. The method of claim 13, further comprising sending second uplink data from the IT device to the application server via an additional communication link which bypasses the control system.

19. The method of claim 13, wherein the plurality of parallel data communication links comprises:
    a cellular wireless communication link; and
    a Wireless Fidelity (Wi-Fi) wireless communication link.

20. The method of claim 19, wherein:

the first wireless communication link is the cellular wireless communication link; and the Wi-Fi wireless communication link is routed through the first core controller, the first core controller being associated with the cellular wireless communication link.

* * * * *